US007199897B2

(12) United States Patent
Nomizu

(10) Patent No.: US 7,199,897 B2
(45) Date of Patent: Apr. 3, 2007

(54) IMAGE DATA PROCESSING APPARATUS FOR AND IMAGE DATA PROCESSING METHOD OF PATTERN MATCHING

(75) Inventor: Yasuyuki Nomizu, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 930 days.

(21) Appl. No.: 10/372,479

(22) Filed: Feb. 21, 2003

(65) Prior Publication Data

US 2004/0234135 A1 Nov. 25, 2004

(30) Foreign Application Priority Data

Feb. 22, 2002 (JP) ............................ 2002-046822

(51) Int. Cl.
*G06K 15/00* (2006.01)
*G06K 1/00* (2006.01)

(52) U.S. Cl. ...................................... 358/1.18; 358/1.9

(58) Field of Classification Search ............... 358/1.18, 358/1.9, 1.14, 1.15, 1.13, 1.8, 1.6
See application file for complete search history.

(56) References Cited

U.S. PATENT DOCUMENTS 6,850,995 B1 * 2/2005 Shishizuka et al. ........... 710/20
2005/0280852 A1 * 12/2005 Namizuka

* cited by examiner

*Primary Examiner*—Douglas Q. Tran
(74) *Attorney, Agent, or Firm*—Knoble Yoshida & Dunleavy, LLC

(57) ABSTRACT

A pattern matching technique provides a small number of circuits for flexibly performing a pattern match on image data in various two-dimensional matrix formats at a high speed. The pattern matching technique also provides a high-speed image area separation and to promote the stability in the image area determination.

28 Claims, 28 Drawing Sheets

Fig.9A PARALLEL INPUT / SERIAL OUTPUT

Fig.9B SERIAL INPUT / PARALLEL OUTPUT

Fig.9C PARALLEL INPUT / SERIAL OUTPUT

Fig.9D PARALLEL INPUT / SERIAL OUTPUT

Fig.9E ODD-EVEN NUMBER SEPARATION / COLLECTION

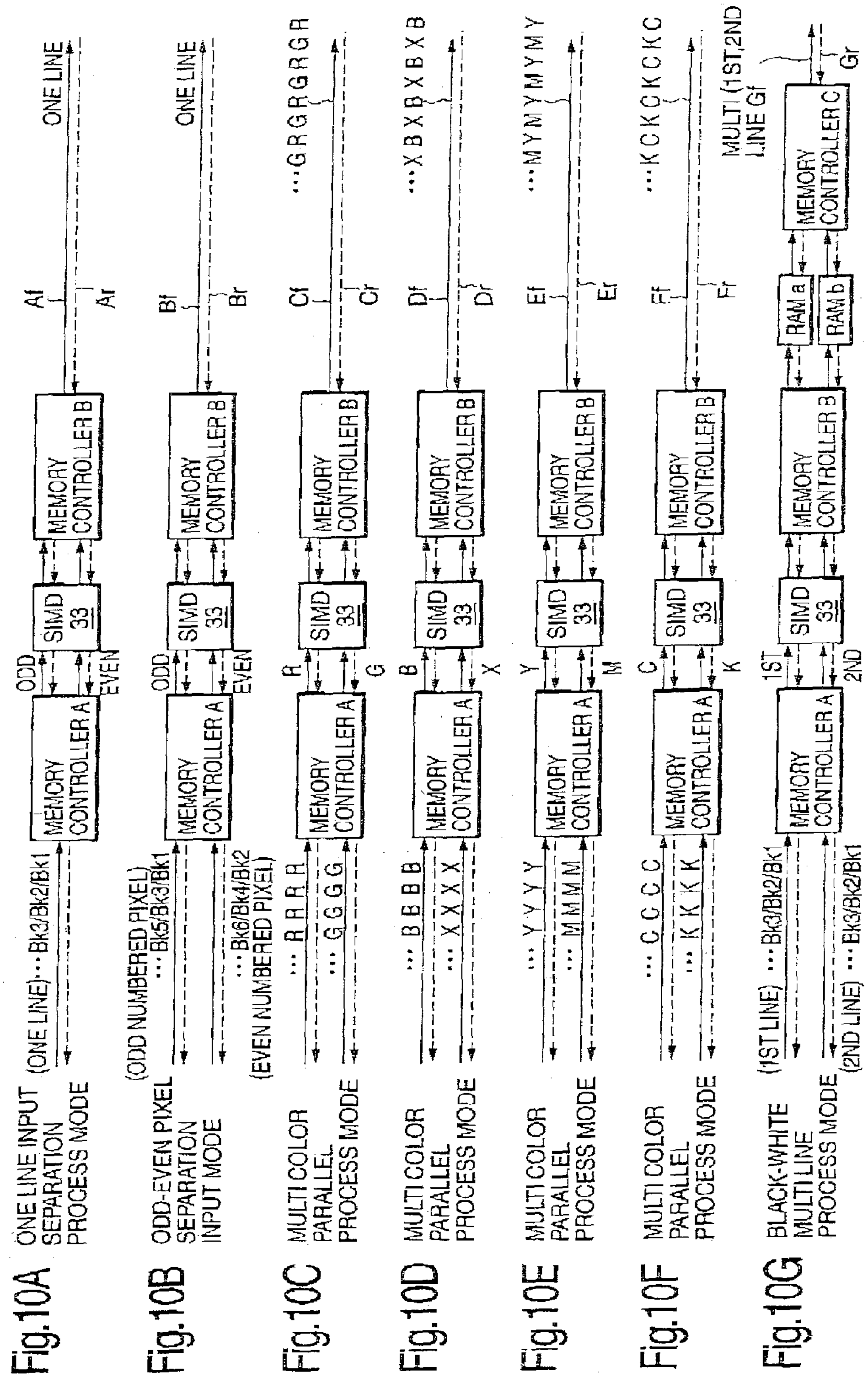
Fig.10A
ONE LINE INPUT SEPARATION PROCESS MODE
(ONE LINE) ···Bk3/Bk2/Bk1
MEMORY CONTROLLER A
ODD
EVEN
SIMD 33
MEMORY CONTROLLER B
Af
Ar
ONE LINE
Fig.10B
ODD-EVEN PIXEL SEPARATION INPUT MODE
(ODD NUMBERED PIXEL) ···Bk5/Bk3/Bk1
(EVEN NUMBERED PIXEL) ···Bk6/Bk4/Bk2
Bf
Br
Fig.10C
MULTI COLOR PARALLEL PROCESS MODE
··· R R R R
··· G G G G
R
G
Cf
Cr
···G R G R G R G R
Fig.10D
MULTI COLOR PARALLEL PROCESS MODE
··· B B B B
··· X X X X
B
X
Df
Dr
···X B X B X B X B
Fig.10E
MULTI COLOR PARALLEL PROCESS MODE
··· Y Y Y Y
··· M M M M
Y
M
Ef
Er
···M Y M Y M Y M Y
Fig.10F
MULTI COLOR PARALLEL PROCESS MODE
··· C C C C
··· K K K K
C
K
Ff
Fr
···K C K C K C K C
Fig.10G
BLACK-WHITE MULTI LINE PROCESS MODE
(1ST LINE) ···Bk3/Bk2/Bk1
(2ND LINE) ···Bk3/Bk2/Bk1
1ST
2ND
RAM a
RAM b
MEMORY CONTROLLER C
MULTI (1ST,2ND LINE Gf
Gr

Fig.16A

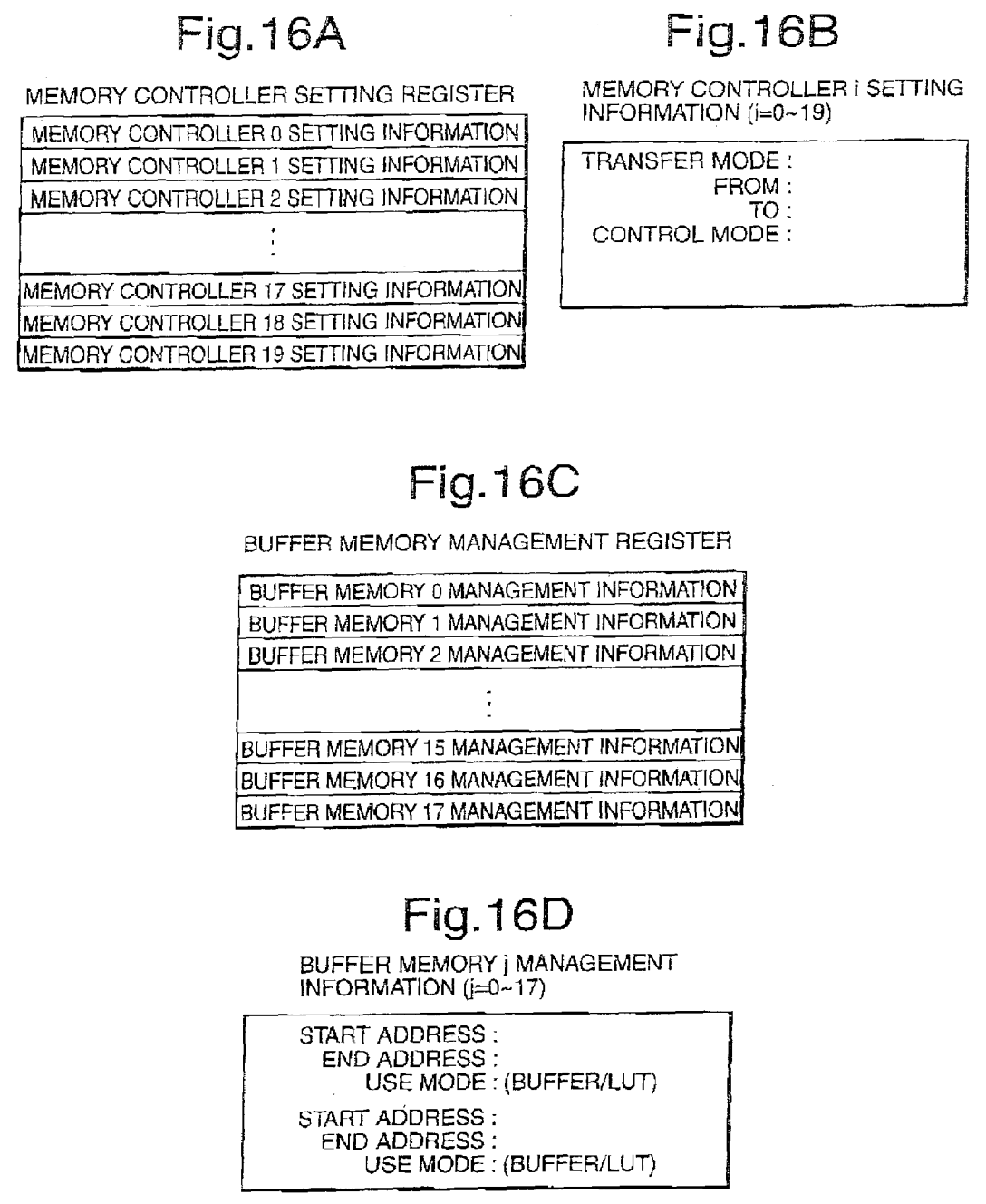

MEMORY CONTROLLER SETTING REGISTER

| |
|---|
| MEMORY CONTROLLER 0 SETTING INFORMATION |
| MEMORY CONTROLLER 1 SETTING INFORMATION |
| MEMORY CONTROLLER 2 SETTING INFORMATION |
| ⋮ |
| MEMORY CONTROLLER 17 SETTING INFORMATION |
| MEMORY CONTROLLER 18 SETTING INFORMATION |
| MEMORY CONTROLLER 19 SETTING INFORMATION |

Fig.16B

MEMORY CONTROLLER i SETTING INFORMATION (i=0~19)

TRANSFER MODE :
FROM :
TO :
CONTROL MODE :

Fig.16C

BUFFER MEMORY MANAGEMENT REGISTER

| |
|---|
| BUFFER MEMORY 0 MANAGEMENT INFORMATION |
| BUFFER MEMORY 1 MANAGEMENT INFORMATION |
| BUFFER MEMORY 2 MANAGEMENT INFORMATION |
| ⋮ |
| BUFFER MEMORY 15 MANAGEMENT INFORMATION |
| BUFFER MEMORY 16 MANAGEMENT INFORMATION |
| BUFFER MEMORY 17 MANAGEMENT INFORMATION |

Fig.16D

BUFFER MEMORY j MANAGEMENT INFORMATION (j=0~17)

START ADDRESS :
END ADDRESS :
USE MODE : (BUFFER/LUT)
START ADDRESS :
END ADDRESS :
USE MODE : (BUFFER/LUT)

Fig.17A RAM No.i
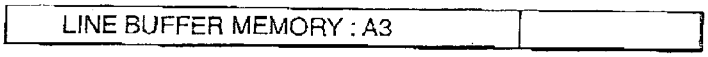
Fig.17B RAM No.j
Fig.17C RAM No.k
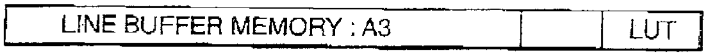
Fig.17D RAM No.l
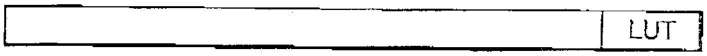
Fig.17E RAM No.m
Fig.17F RAM No.n

MULTI VALUE DATA GROUP OF CHECK MATRIX

BINARIZED DATA SET OF CHECK MATRIX

MULTI VALUE DATA GROUP OF CHECK MATRIX

BINARIZED DATA SET OF CHECK MATRIX

FIG. 24

| | | PE No. 0 | PE No. 1 | PE No. 2 | PE No. 3 | PE No. 4 | PE No. 5 | PE No. 6 | PE No. 7 | PE No. 8 | PE No. 9 | PE No. 10 | |
|---|---|---|---|---|---|---|---|---|---|---|---|---|---|
| IMAGE DATA STORAGE AREA | RAM-A0 | a0 | a1 | A a2 | B a3 | C a4 | a5 | a6 | a7 | a8 | a9 | a10 | ..... |
| | RAM-A1 | b0 | b1 | D b2 | E b3 | F b4 | b5 | b6 | b7 | b8 | b9 | b10 | ..... |
| | RAM-A2 | c0 | c1 | G c2 | H c3 | I c4 | c5 | c6 | c7 | c8 | c9 | c10 | ..... |
| | | | | | | | | | | | | | |
| THRESHOLD Th STORAGE AREA | RAM-A3 | th1 | th1 | th1 | th1 | th1 | th1 | th1 | th1 | th1 | th1 | th1 | ..... |
| | | | | | | | | | | | | | |
| DATA STORAGE AREA | RAM-A4 | th10 | th11 | th12 | th13 | th14 | th15 | th16 | th17 | th18 | th19 | th110 | ..... |
| | RAM-A5 | th20 | th21 | th22 | th23 | th24 | th25 | th26 | th27 | th28 | th29 | th210 | ..... |
| | | | | | | | | | | | | | |
| REFERENCE DATA STORAGE AREA | RAM-A6 | R1i | R1i | R1i | R1i | R1i | R1i | R1i | R1i | R1i | R1i | R1i | ..... |
| | RAM-A7 | R2i | R2i | R2i | R2i | R2i | R2i | R2i | R2i | R2i | R2i | R2i | ..... |
| | | | | | | | | | | | | | |
| MATCH DETERMINATION STORAGE AREA | Flag | 0 | 0 | 0 | 0 | 0 | 0 | 1 | 1 | 1 | 0 | 0 | ..... |
| | | | | | | | | | | | | | |

A–1 : IMAGE DATA FOR EACH PIXEL

TH1 : BINARIZATION THRESHOLD

T10–T110 : 1st DATA FOR PATTERN COMPARISON OF PIXEL MATRIX A–1

T20–T210 : 2nd DATA FOR PATTERN COMPARISON OF PIXEL MATRIX A–1

R1i : 1st DATA FOR PATTERN COMPARISON OF PIXEL MATRIX

R2i : 2nd DATA FOR PATTERN COMPARISON OF PIXEL MATRIX

IMAGE DATA PROCESSING APPARATUS FOR AND IMAGE DATA PROCESSING METHOD OF PATTERN MATCHING

FIELD OF THE INVENTION

The current invention is generally related to pattern matching in image processing, and more particularly related to pattern matching of pixel image data based upon the comparison to a set of predetermined reference pattern image data.

BACKGROUND OF THE INVENTION

In image data processing, pattern matching is often performed at various levels of processes. For example, when the RGB image data is converted into the YMCK recording image data and the YMCK image data is outputted to a printer for printing on a piece of paper, it is desirable to binarize the binary image such as characters and lines for clear image formation. On the other hand, for middle-level gradation images such as photographic images, dot presence or dot gradation is defined based upon binarization or a small number of gradations. It is desirable to express the smooth intensity change by a gradation process. A typical gradation process includes dithering, and the gradation process expresses area gradation by distributing and arranging a certain number of dots in a unit area. Of course, binary images such as characters and lines and bit-map images or middle-level gradation images such as photographs and pictures exist in the same original image. For this reason, based upon the RGB image data, an area separation unit automatically determines the binary image areas herein after referred to as character areas and middle-level gradation areas herein after referred to as picture areas. In the gradation process, the image data is automatically processed using a character area process or a picture area process based upon the above determination results.

In a pattern matching using conventional hardware, since the pixels to be matched are concurrently obtained and compared, a work memory area is necessary for the image data. In general, since images are raster scanned in an image device such as a copier and an input image data is based upon a raster unit, a work memory area is a line buffer. For example, for a 3×3 pixel matrix pattern matching, three lines of work memory are necessary. A determination window is generated for the matrix size, and the matching takes place on the window basis. Conceptually, from the three-line buffer memory, each pixel from a middle line is sequentially made as a current pixel. A 3×3 pixel matrix is defined with the current pixel that is located at the center of the matrix. For each pixel matrix, the contained image data for each pixel is compared to that of the reference patter to determine a match.

The above pattern comparison matching method generally includes two categories of approach. One category is that the circuits are arranged in parallel in order to generate the comparison results at a high speed. The other category is that a single circuit is repeatedly used in order to avoid a large circuit size. These two approaches have some setbacks. In the first approach, although the determination results are obtained at a high speed, it requires a number of circuits that corresponds to a number of pattern matching. As the number of matching patterns increases, the circuit becomes larger and complex. On the other hand, in the second approach, the processing speed is generally longer at the cost of a small size of the circuit. Even in the first approach, the comparison is sequential between the pixel matrix and the reference pattern, the processing time is still long for one of the image data. For this reason, it remains desirable to shorten the comparison process time.

Japanese Patent Publication 200-175043 discloses that each row of the image data in the M×N pixel matrix is latched in N units of row registers 113. By using a multiplexer 114, all of the latch outputs (M×N) from the N row registers 113 are arranged in a single row, and a determination unit 115 processes the single row of the reference data for a bit-to-bit comparison to obtain the match determination result. Furthermore, by latching two 5×5 pixel matrixes of image data that are odd-numbered and even-numbered pixels of the matrix register 713, the image data storage duplication is avoided. FIG. 7 of Japanese Patent Publication 200-175043 discloses that two determination units determine the pattern matching in parallel. Although the above method gains a high speed pattern matching, more hardware such as latch for matrix image data becomes necessary. As the pattern matching size increases, since the circuit size increases and the timing control becomes complex, the device becomes expensive. In addition, since the matching pattern size is fixed, the process is limited.

Japanese Patent Publications Hei 9-114967 and Hei 9-231356 disclose an image process method of distributed calculation for determining whether each row of the two-dimensional image data matches each row of the two-dimensional reference data using a parallel process DSP having a plurality of calculation units. By the above method, the circuit size is relative small, and it is flexible enough to deal with various sizes of pattern matching. However, in order to process the two-dimensional matrix data arrangement by the calculation unit of the processor, since it is necessary for the processor to rearrange the data, the pattern matching process takes an undesirable amount of time. One unit of the calculation unit processes only one bit of the binary data. For multi-bit multi-value image data in a photocopier, it is necessary to use a corresponding number of calculation units, and the processor control becomes complex. As a result, an undesirable long processing period of time is experienced. Furthermore, the multi-gradation image data to be processed by the image process potentially includes various gradation levels such as 64-gradataion, 128-gradation and 256-gradation. A processor that processes only 1-bit binarized data leaves the remaining gradations in the above multi-value data. It is difficult to flexibly perform the image data pattern matching of various gradations by changing a binarization threshold value.

To avoid the change in the range of the image separation signal, when the image area determination is corrected or smoothed for stably continuous results, in order to refer the image area determination of the preceding current pixel to that of the proceeding current pixel, an image process processor holds the image area determination result of the preceding current pixel. The result is combined with the image data of the current matrix, and the combined determination result is given to a look up table (LUT). The determination result data is read from the LUT. This slows down the image process speed of the image process processor. It is desirable to avoid the image process slow down.

In addition, the image data is read by a CCD and is converted to digital data by an A/D converter. The converted digital data is corrected for shading, and the shading correction data is determined in the following manner. One line of data is scanned by a scanner from a standard white board. A minimal value and a maximal value of the scanned image data are detected. Furthermore, a line of data is scanned without light, and a minimal value and a maximal value of the scanned image data are detected. A correction coefficient for each pixel on one line is determined based upon the scanned one-line standard white data and the above determined maximal and minimal values. The correction coefficient corrects the distortion in the scanning direction. The correction coefficient is stored in the shading correction memory and is read to apply to scanned image data. The determination of the above minimal and maximal values slows down the image process processor in handling the CCD scanned image data. The detection of the minimal and maximal values in an entire line or portions of the line of the image data is necessary for image processes other than the above shading correction coefficient. Obviously, it is desirable to avoid the image processor slow down in the determination of the minimal and maximal values.

One object of the current invention is to provide a small number of circuits for flexibly performing a pattern match on image data in various two-dimensional matrix formats at a high speed. Another object of the current invention is to provide a high-speed image area separation and to promote the stability in the image area determination.

SUMMARY OF THE INVENTION

In order to solve the above and other problems, according to a first aspect of the current invention, an image data processing apparatus, including: a buffer memory unit for storing multi-valued image data and for outputting the stored image data on a pixel basis, the image data having image data groups of pixel matrices, each of the pixel matrices becoming a current pixel matrix when a centrally located pixel in the pixel matrix becomes a current pixel; a processing unit connected to the buffer memory unit including a plurality of processor elements each processing the image data having a range of bit widths, the processor elements concurrently processing the image data; and a control information memory unit connected to the processing unit and the buffer memory unit for storing reference data for pattern matching and control data, each of the processor elements binarizing a corresponding one of the image data groups based upon a predetermined threshold value, the processing unit converting the binarized image data into a one-dimensional serial image data of a predetermined bit width, the processor elements comparing the converted imaged data to the reference data in the control information memory unit to generate a determination result.

According to a second aspect of the current invention, a color image forming apparatus, including: a color image scanning unit for scanning a color image to generate scanned color image data and for correcting the scanned color image data to generate color image data; a buffer memory unit connected to the color image scanning unit for storing the color image data and for outputting the stored color image data on a pixel basis, the color image data having image data groups of pixel matrices, each of the pixel matrices becoming a current pixel matrix when a centrally located pixel in the pixel matrix becomes a current pixel; a first processing unit connected to the buffer memory unit including a plurality of processor elements each processing the color image data having a range of bit widths, the processor elements concurrently processing the color image data; a control information memory unit connected to the first processing unit and the buffer memory unit for storing reference data for pattern matching and control data, each of the processor elements binarizing a corresponding one of the image data groups based upon a predetermined threshold value, the first processing unit converting the binarized image data into a one-dimensional serial image data of a predetermined bit width, the first processor elements comparing the converted imaged data to the reference data in the control information memory unit to generate a determination result; a buffer controller connected to the buffer memory unit and the control information memory unit for reading the reference data and the control data from the control information memory unit, the buffer controller providing the reference data to the first processing unit, the buffer controller further reading the image data from the buffer memory unit to the first processing unit for the pattern matching based upon the control data; and an image forming unit connected to the buffer memory and the buffer controller and further comprising a second processing unit and a third processing unit, the second processing unit converting RGB image data to YMCK image data via a RGB-YMCK conversion program, the third processing unit correcting the YMCK image data for printing via an output correction program, the second processing unit and the third processing unit each further including an image data input/output port, a program memory for a program, a data memory and a plurality of processor elements, the processor elements each processing the color image data having a range of bit widths, the processor elements concurrently processing the color image data, the buffer controller controlling the image data among the buffer memory, the image data input/output port, the second processing unit and the third processing unit according to the program and the image data, the second processing unit and the third processing unit each further including a program writing unit for writing in the program memory of the second processing unit the RGB-YMCK conversion program and for writing in the program memory of the third processing unit the output correction program.

According to a third aspect of the current invention, a method of pattern matching including the steps of: storing reference data for pattern matching and control data in a control information memory; storing a plurality of lines of multi-value image data in a buffer memory; outputting the image data to a data processing unit from the buffer memory unit; and simultaneously processing the image data in the data processing unit having a plurality of processor elements each processing the color image data having a range of bit widths, each of the simultaneous processing step further including additional steps of: binarizing a corresponding one of the image data groups based upon a predetermined threshold value; converting the binarized image data into a one-dimensional serial image data of a predetermined bit width; and comparing the converted imaged data to the reference data in the control information memory to generate a determination result.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 10A is an image data flow as indicated by an arrow and a solid line Af is for "one line input separation mode."

FIG. 10B is an image data flow as indicated by an arrow and a solid line Bf is for "odd-even pixel separation input mode."

FIG. 10C is an image data flow as indicated by an arrow and a solid line Cf is for "multi color concurrent process mode."

FIG. 10D is an image data flow as indicated by an arrow and a solid line Df or Dr corresponds the data flow as indicated by the direction Cf and Cr as described with respect to FIG. 10C.

FIGS. 10E and 10F are image data flows as indicated by an arrow and a solid line Ef or Ff is for "multi color concurrent process mode."

FIG. 10G is an image data flow as indicated by an arrow and a solid line Cf is for "black-and-white multiple line process mode."

FIG. 16A is a diagram illustrating exemplary memory allocation for the memory controller setting information in a memory controller setting register to be used in the current invention.

FIG. 16B is illustrating one major item of the memory controller setting information in the memory controller setting register.

FIG. 16C is illustrating exemplary memory allocation for buffer memory management to be used in the current invention.

FIG. 16D is illustrating the area and function specifications of each memory RAM 0 through 17 in the buffer memory BM.

FIG. 17A is illustrating a data read write area in one of the RAMs 0 through 17 when the one RAM is used as a line buffer for one line of image data for a short side of the A3 size output image.

FIG. 17B is illustrating a two-line buffer for one line of image data for a short side of the A4 size output. FIG. 17C illustrates a one-line buffer for the A3 size output and a LUT.

FIG. 17C is illustrating a one-line buffer for the A3 size output and a LUT.

FIG. 17D is illustrating a single LUT.

FIG. 17E is illustrating seven LUTs.

FIG. 17F is illustrating LUTs read from the HDD or the LUTs generated by the SIMD-type processors 33 in a part of the RAMs 0 through 17 that is used as a temporary storage.

FIG. 24 illustrates the image data distribution in the image data storage areas RAM-A0 through A2 in the RAMs of the processor element PE to be used for pattern matching of the 3×3 pixel matrixes.

DETAILED DESCRIPTION OF THE PREFERRED EMBODIMENT(S)

Based upon incorporation by external reference, the current application incorporates all disclosures in the corresponding foreign priority document (Japanese Patent Application No. 2002-046822) from which the current application claims priority.

Figure 1:
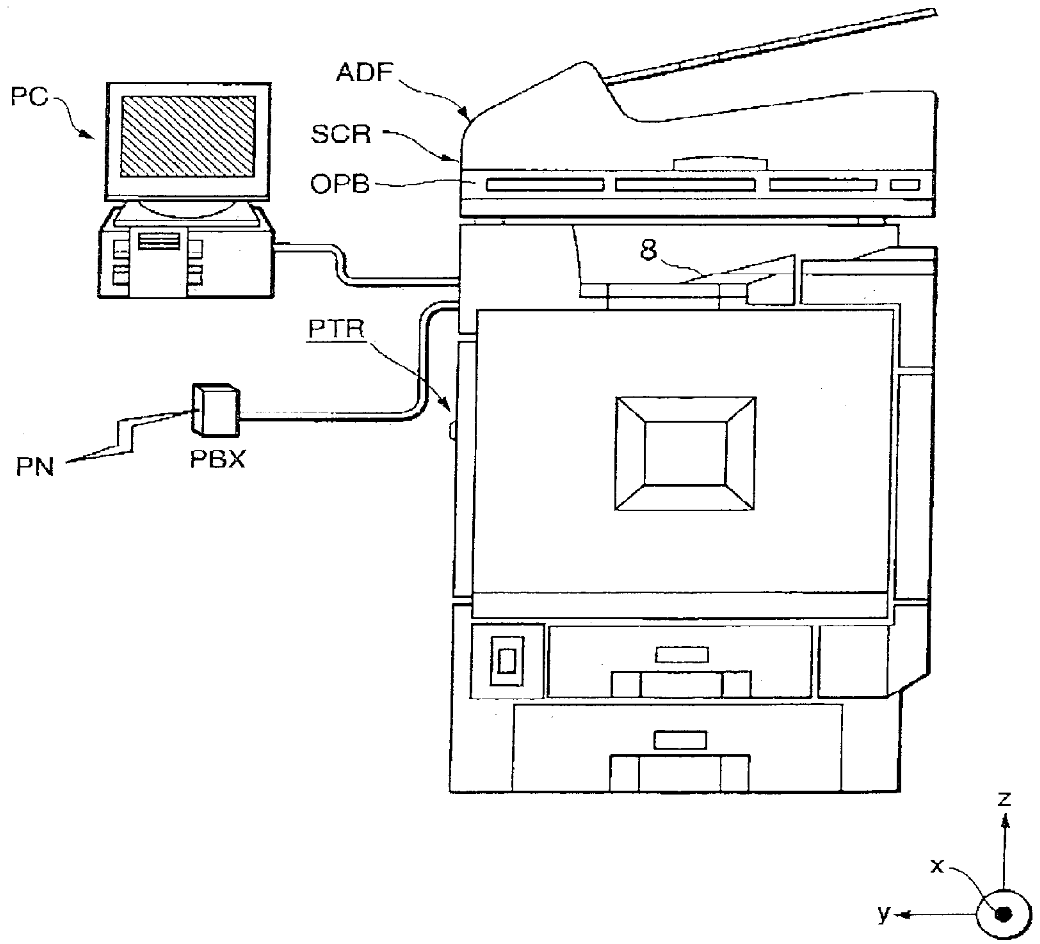
FIG. 1 is a diagram illustrating one preferred embodiment in the multifunctional full color digital copier according to the current invention.

Referring now to the drawings, wherein like reference numerals designate corresponding structures throughout the views, and referring in particular to FIG. 1, a diagram illustrates one preferred embodiment in the multifunctional full color digital copier according to the current invention. The full color digital copier generally includes an automatic document feeder ADF, an operation board OPB, a color scanner SCR and a color printer PTR. The full color digital copier further includes a color image data processing device or ACP, which will be later described with respect to FIG. 3. The ACP is connected to a personal computer PC via local area network LAN and or a telephone line PN for a facsimile communication line via a telephone switch PBX. As will be described with respect to FIG. 3, the switch PBX is connected to a facsimile board of a facsimile control unit FCU. The printed sheets from the printer PTR are outputted on a sheet tray 8.

Figure 2:
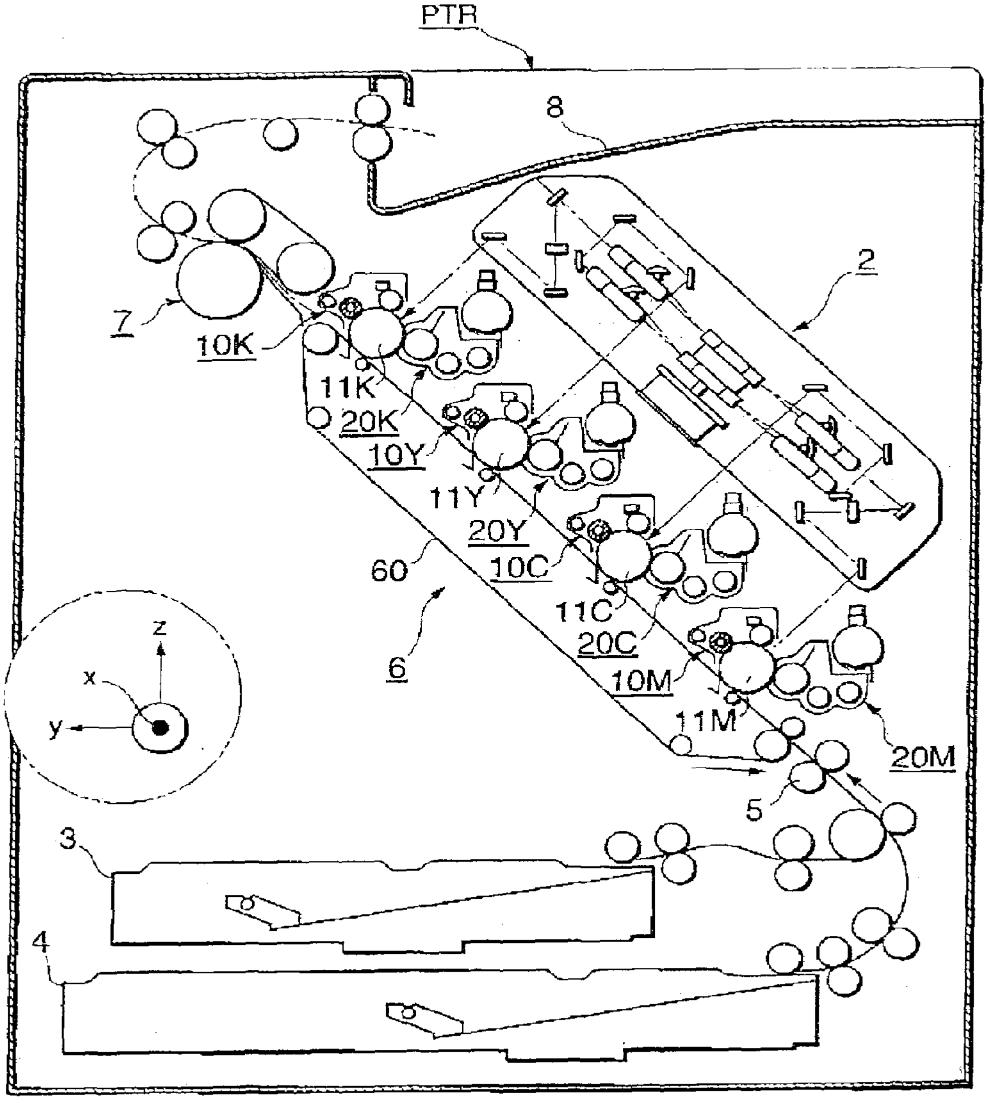
FIG. 2 is a diagram illustrating one preferred embodiment in the color printer according to the current invention.

Now referring to FIG. 2, a diagram illustrates one preferred embodiment in the color printer according to the current invention. The color printer PTR is a laser printer and includes four toner image forming units for forming a magenta image (M), a cyan image (C), a yellow image (Y) and a black image (K). An image recording medium such as paper travels from a lower right comer to an upper left comer of the diagram. The image forming device includes a set of the four full color drum image forming units. The M, C, Y and K image forming units respectively further include photosensitive units 10M, 10C, 10Y and 10K and developing units 20M, 20C, 20Y and 20K. The photosensitive units 10M, 10C, 10Y and 10K respectively further include photosensitive drums 11M, 11C, 11Y and 11K. The photosensitive drums 11M, 11C, 11Y and 11K are placed so that the rotational axis of the photosensitive drums 11M, 11C, 11Y and 11K is parallel to the X axis in the diagram. The image forming medium or paper path is designed to have an approximately 45 degrees with respect to the Y axis on the Y-Z plane. The photosensitive drums 11M, 11C, 11Y and 11K each have a photosensitive drum in the diameter of 30 mm with a layer of organic photosensitive material (OPC).

Still referring to FIG. 2, the laser printer PTR additionally further includes an optical writing unit 2 in a laser main scanning direction, a paper cassette 3, a pair of roller 5, a transfer belt unit 6 having an image transfer belt 60 for transferring the image recoding sheet to each toner image transfer position of the toner image forming units, a fixing unit 7 for a belt fixing method and an output paper tray 8. Although it is not shown in the diagram, the laser printer PTR also includes a manual feed tray, a toner filling container, a used toner bottle, a double side printing unit and a power source unit. The optical writing unit 2 further includes a light source, a polygon mirror, f-θ lens and a reflector mirror. The optical writing unit 2 projects laser towards the surface of the photosensitive drums 11M, 11C, 11Y and 11K in the X direction according to the image data. The single dotted line in the diagram indicates a paper path or an image recording medium path. An image recording medium from the paper cassette 3 and 4 is guided by undisclosed transfer guides and transferred by undisclosed transfer rollers towards the register roller 5. At a predetermined timing, the image recording medium is transferred onto the image transfer belt 60 by the register roller 5 for passing at the image transfer position of each of the toner image forming units. The toner image formed on the photosensitive drums 11M, 11C, 11Y and 11K is transferred onto the image recording medium that is held and transferred by the image transfer belt 60. Each of the toner image is superimposed on the image recording medium or the image transfer sheet. Then, the image transfer sheet is sent to the fixing unit 7. As the image transfer sheet passes the fixing unit 7, the image is fixed on the image transfer sheet. The image fixed transfer sheet is outputted in the output tray 8. As described above, the transfer method in the above example is a direct transfer method where a toner image is directly transferred onto an image transfer sheet.

The toner image forming units are essentially identical except for the color of the toner. For example, as described above, the yellow toner image forming unit further includes the yellow photosensitive unit 10Y and the yellow developing unit 20Y. The yellow photosensitive unit 10Y further includes a brush roller for placing lubricant over the photosensitive drum surface, a cleaning blade for cleaning the photosensitive drum surface, a cleaning lamp for lighting the photosensitive drum surface and a non-contact charging roller for uniformly charging the photosensitive drum surface in addition to the photosensitive drum 11Y. The yellow photosensitive drum 11Y is uniformly charged by the AC-charged charging roller, and the optical writing unit 2 forms a static image on the surface of the photosensitive drum 11Y by laser L projected by the polygon mirror that is modulated based upon the print data. The yellow developing unit 20Y develops the static image on the surface of the photosensitive drum 11Y into a yellow toner image. The yellow toner on the photosensitive drum 11Y is transferred onto the image transfer sheet at a predetermined yellow developing position on the transfer belt 60. After the toner is transferred, the photosensitive drum surface 11Y is brushed with the lubricant by the brush roller, then cleaned by the cleaning blade and further cleaned by the removing lamp for a next static image formation.

Still describing the yellow unit, the yellow developing unit 20Y stores magnetic carrier and negatively charged toner and further includes a developing roller, a transfer screw, a doctor blade, a toner concentration censor and a powder pump. The above components are placed in such a way to expose through an opening from the photosensitive drum side in the developing case. The developer in the developing case is frictionally charged by agitation and transfer that is caused by the transfer screw. A portion of the charged developer is retained on the developer roller surface. The doctor blade uniformly controls the thickness of the developer layer on the developer roller. The toner in the developer on the developer roller surface then is transferred onto the photosensitive drum surface so that the toner image appears according to the static image on the yellow photosensitive drum surface 11Y. The toner concentration in the developer case is monitored by the toner concentration sensor, and the toner is supplied by the powder pump when the concentration is detected to be low.

The transfer belt unit 6 includes the transfer belt 60, which is an edgeless single layer having high resistance volume ratio of $10^9$–$10^{11}$ Ωcm. The material is poly vinyl fluoride (PVDF). The transfer belt 60 is held by four rollers so that the transfer belt 60 travels through each of the transfer positions that contact the photosensitive drums 11M, 11C, 11Y and 11K. Among the four rollers, two of them near the entry of the image transfer sheet path as indicated by the double-dotted line are also opposed with a static controlled roller that is charged at a predetermined voltage level. The image transfer sheet that passes through these two charged rollers is statically clung onto the transfer belt 60. The other two rollers near the output along the image sheet transfer path frictionally drive the image transfer belt 60. Although it is not shown in the diagram, these two driving rollers are also connected to a driving source. In addition, a bias roller contacts the outer surface of the transfer belt 60, and the bias roller is biased by a voltage source for cleaning the residuals such as toner from the transfer belt surface. The transfer belt 60 also includes a transfer bias voltage material on the inner or back surface where the photosensitive drums 11M, 11C, 11Y and 11K oppose. The transfer bias voltage material is a fixed brush for biasing at a predetermined transfer bias voltage from a bias voltage source. The transfer bias voltage through the transfer bias voltage material adds the transfer voltage to the transfer belt 60 and forms a predetermined strength of electric field for the corresponding transfer between the transfer belt 60 and the photosensitive drum at the transfer position.

Figure 3:
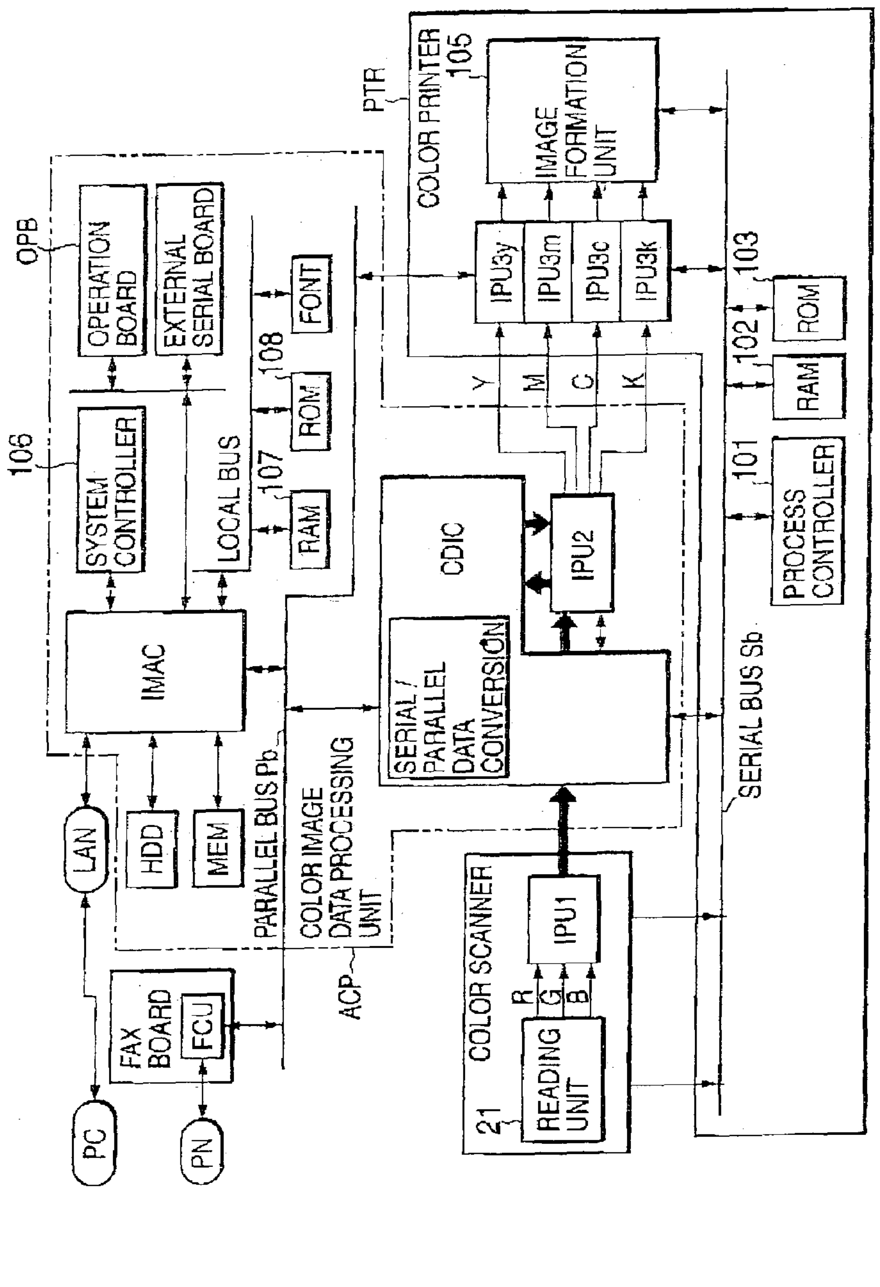
FIG. 3 is a diagram illustrating one preferred embodiment of the main electric system of the multifunctional digital copier as shown in FIG. 1 according to the current invention.

Now referring to FIG. 3, a diagram illustrates one preferred embodiment of the main electric system of the multifunctional digital copier as shown in FIG. 1 according to the current invention. A color scanner SCR optically reads an original document, and a reading unit 21 focuses the reflected light from the original document onto photosensitive elements such as CCD's via a reflector mirror and lenses. The CCD's are located on a sensor board unit (SBU) of the reading unit 21, and the SBU converts the RGB image signals from the CCD's into 8-bit RGB multi-value digital signals. The SBU then sends the RGB digital signals to a first image processing unit IPU1. The IPU1 performs the reading correction processes on each color component of the RGB image input data. The reading correction processes include CCD between-line correction, a main scanning register adjustment, shading correction, dot correction, vertical stripe correction and γ correction. Other processes also include an area separation process where an edge or inside of binary lines and characters are determined. The area separation also separates dot image such as photographs. Lastly, the area separation separates chromatic elements from achromatic elements. Another process is to distinguish certain duplication prohibited material such as currency notes and stock holding certificates based upon the RGB image data.

Still referring to FIG. 3, the IPU1 adds the image area data Fd indicative of the area separation results to the corrected 8-bit multi-value RGB image data and outputs the resulted data to a compression decompression color data interface control (CDIC) unit. For example, if the area separation indicates that the original document is prohibited from duplication, the ICU1 reports the result to a system controller 106. In response to the report, the system controller 106 substantially changes the color duplication scheme or the scanner γ conversion in the IPU1 by referring to the image process conditions that are associated with scanning a document image by the color scanner SCR. The CDIC unit transfers the RGB data, the YMCK image data and the associated image area data Fd among a second image processing unit IPU2 and a parallel bus Pb. The CDIC unit also communicates to control the image data transfer and other control signals mainly among the reading unit 21, a process controller 101 for controlling an image forming process in the color printer PTR and the system controller 106 for controlling the digital copier as shown in FIG. 1. The process controller 101 and the system controller 106 communicate with each other via the parallel bus Pb, the CDIC and a serial bus Sb. The CDID internally performs a data format conversion for interfacing the serial bus Sb and the parallel bus Pb.

The RGB data with the area separation data Fd from the IPU1 of the color scanner SCR will be hereunder simply referred to as the RGB data. The RGB data is outputted or transferred via the CDIC to the IPU2 or the parallel bus Pb. The RGB data on the parallel bus Pb is written to an image memory (MEM) unit by an image memory access control (IMAC) unit. The RGB data is then read from the MEM unit, and it is outputted to a facsimile control unit (FCU) in case of facsimile transmission otherwise to the IPU2. The IPU2 converts the RGB data into 8-bit multi-value YMCK image data and performs a number of image processing steps prior to and subsequent to the above conversion. The YMCK image data is outputted to the CDIC via the parallel bus Pb, and the IMAC stores it in the MEM unit. Alternatively, the IPU2 directly outputs the respective element of the Y, M, C and K image data to a corresponding third image processing unit IPU3*y*, IPU3*m*, IPU3*c* and IPU3*k*. The IPU3*y*, IPU3*m*, IPU3*c* and IPU3*k* respectively performs a corresponding printer γ conversion on the Y, M, C and K image data and further binarizes the γ-converted Y, M, C and K image data by a gradation process for outputting the binarized data to an image formation unit 105 of the color printer PTR.

As described above, the CDIC performs a first job of storing the RGB image data or the YMCD image data in the MEME unit and reusing the stored data and a second job of directly converting the RGB image data without storing into the YMCK image data by the IPU2 for outputting to IPU3*y*, IPU3*m*, IPU3*c* and IPU3*k* for the print out. An example of storing in the MEM unit is a situation where one image document is duplicated into a plurality of copies. The reading unit 21 reads the document only once, and the RGB image data of the IPU1 or the converted YMCK image data from the IPU2 are stored in the MEM unit. The stored data is read a desired number of times for the multiple duplications. An example for without storing is a situation where the document is copied once. The RGB image data from the IPU1 is outputted the IPU2 as is, and the IPU3 processes the YMCK image data for the print out. It is not necessary to write the data in the MEM unit. When the MEM is not used, the image data in the CDIC unit from-the IPU1 is sent to the IPU2 from the CDIC unit. The IPU2 performs on the RGB image data the intermediate processes including filtering, background removal, color mapping such as mapping to CMYK image data, color removal, main scanning sizing, main scanning shift, main scanning mirroring, sub scanning sampling, masking and digitization for monochromatic output.

The IPU3*y*, IPU3*m*, IPU3*c* and IPU3*k* respectively performs the corresponding printer y conversion and gradation process on the Y, M, C and K image data. The binarized YMCK image data is sent to a laser modulator of Y, M, C and K at image formation unit 105 of the laser printer PTR. Consequently, a binary static image for each color component is formed on the photosensitive drums 11Y, 11M, 11C and 11K. The gradation process includes an intensity conversion, a dithering process and an error diffusion process, and the main process is an area approximation of the gradation information.

When the image data is stored in the MEM unit and an additional process such as rotation and composition of the image is performed on the data that is read from the memory, the data directly transferred to the CDIC unit from IPU1 is initially compressed for the bus transfer at the CDIC and is transferred to the IMAC unit via the parallel bus Pb. Based upon the control by the system controller 106, the additional processes at the IMAC include the image data and the image MEM access control, the print data generation for an external PC by character code/character bit conversions and the image data secondary compression for efficient memory use. The secondarily compressed image data at the IMAC unit is stored in the image MEM unit, and the stored data is read as necessary. The read data is decompressed unit for the secondary compression at the IMAC unit to obtain the initially compressed data. The initially compressed data is transmitted from the IMAC unit to the CDIC unit via the parallel bus Pb. At the CDIC, the transferred data undergoes another decompression process to obtain the original image data, and the original data is further transferred to the IPU2. If the further transferred data is the RGB image data, it is converted into the CMYK image data. The CMYK data is compressed as described above and is written in the MEM unit. Otherwise, the CMYK data of the IPU2 is immediately transferred to the IPU3*y*, IPU3*m*, IPU3*c* and IPU3*k*, and the image formation unit 105 forms an image.

In the above described data flow, the preferred embodiment of the digital copier according to the current invention implements the multiple functions based upon the read/write control of the image data over the image memory MEM and the parallel bus Pb of the IMAC unit as well as the bus control among the CDIC, the IPU1 and the IPU2. One copier function, the facsimile transmission function performs at the IPU1 the reading error correction on the RGB image data from the reading unit 21 such as a color document scanner SCR. As necessary, the facsimile transmission function performs at the IPU2 the conversion on the RGB image data into the YMCK image data and transfers the converted YMCK image data to a facsimile control unit (FCU) via the CDIC and the parallel bus Pb. At the FCU, the image data is converted into data for a public line network (PN), and the converted data is sent to the PN. For the facsimile reception, the FCU converts the data from the PN into the image data and transfers the image data to the IPU2 via the parallel line Pb and the CDIC. If the received data is in the RGB data format, the IPU2 converts the RGB data into the CMYK data. On the other hand, if the received data is in the CMYK data format, the IPU2 performs no intermediate process and transfer the CMYK data to the IPU3*y*, IPU3*m*, IPU3*c* and IPU3*k* for image formation at the image formation unit 105. As a plurality of jobs such as copier functions, fax reception/transmission functions and printer output functions is concurrently run, the system controller 106 and the process controller 101 control the priority or the right of use for the color document scanner SCR, the color printer PTR, the parallel bus Pb and the IPU2.

The process controller 101 controls the image data flow while the system controller 106 controls the system as a whole and also manages the activation of each resource. The function selection of the multi-function digital color copier is inputted through the operation board OPB in order to specify a process such as a copier function and a facsimile function. In response to a print command from the PC, the process for the printer output function is specified by the print command. Since the corrected RGB image data from the color document scanner SCR is temporarily stored in the MEM unit, various restored images are confirmed as necessary when the process is changed in the IPU3*y*, IPU3*m*, IPU3*c* and IPU3*k* as well as the IPU2. For example, the γ conversion characteristics are changed. Another example is that the intensity of the reproduced image is changed. Yet another example is that the number of rows is changed in a dithering matrix. The reproduced image reflects the above changes. For each of the above changes, it is not necessary to scan the document through the color document scanner SCR since the same image data is read from the MEM unit for performing the processes with a change on the image data.

Figure 4A:
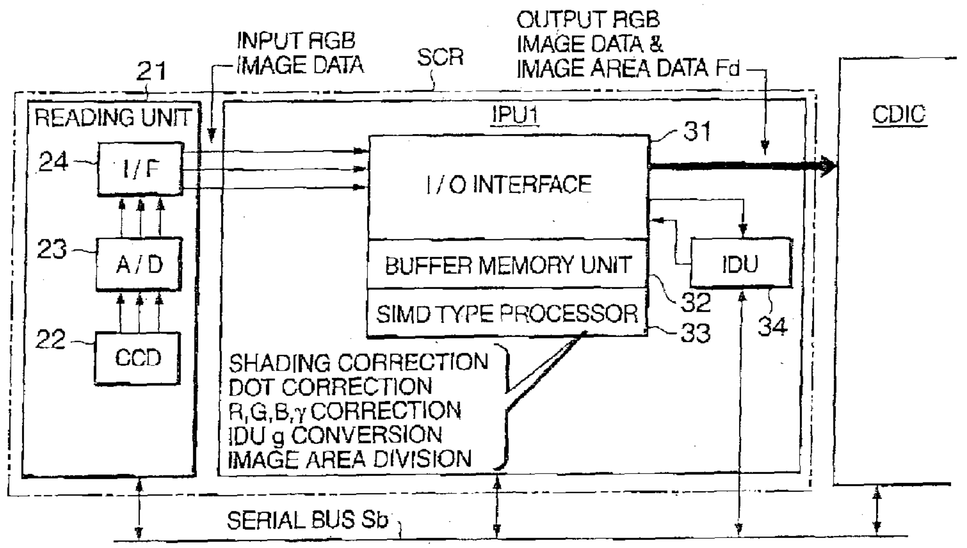
FIG. 4A is a diagram illustrating one preferred embodiment of the color document scanner according to the current invention.

Now referring to FIG. 4A, a diagram illustrates one preferred embodiment of the color document scanner according to the current invention. CCD's 22 generate RGB image signal, and an analog-to-digital (A/D) converter 23 converts the RGB image signal into 8-bit multi-color RGB image data. The converted RGB image data is transferred to the IPU1 via an interface (I/F) unit 24. The main component of the IPU1 is a color image processing unit that combines an input/output (I/O) I/F 31, a buffer memory device 32 and a data processing device or SIMD-type processor 33.

Figure 5:
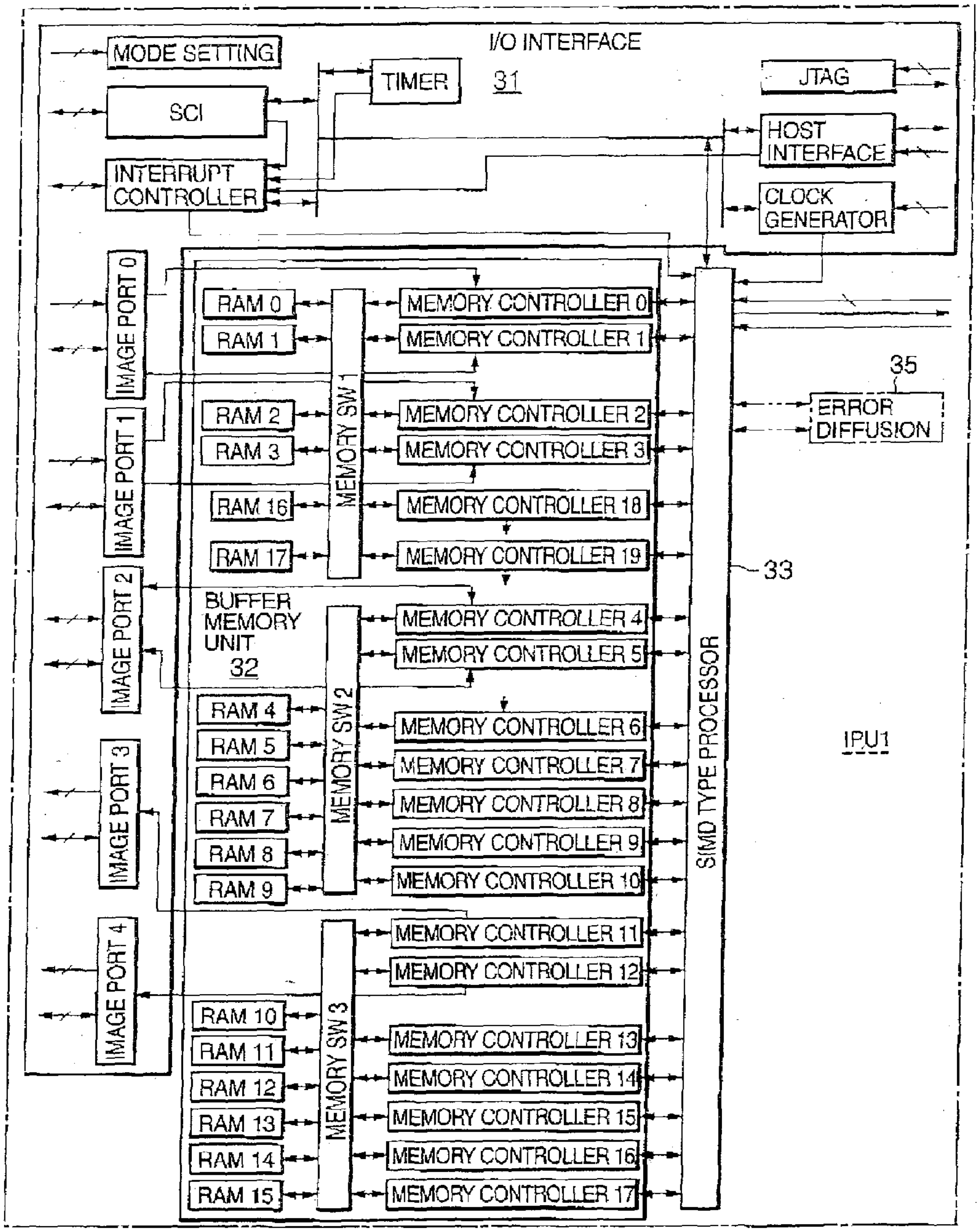
FIG. 5 is a diagram illustrating the components of one preferred embodiment of the color image processing unit of FIG. 4A according to the current invention.

Now referring to FIG. 5, a diagram illustrates the components of one preferred embodiment of the color image processing unit of FIG. 4A according to the current invention. As described above with respect to FIG. 4A, the color image processing unit combines the components 31, 32 and 33. The I/O I/F 31 further includes image ports 0 through 4 for inputting and outputting the image data, a mode setting device or mode specifying decoder for dealing control data, control signals or synchronization signals, a system control interface (SCI), an interrupt controller, a circuit automatic tester JTAG, a host I/F unit, a clock generator and a timer. The image ports 0 and 1 are exclusively for inputting image data while the image ports 3 and 4 are exclusively for outputting image data. The image port 2 is for both inputting and outputting image data. Each of the image ports 0 through 4 has a first port and a second port, and the first port and the second port concurrently inputs and outputs a byte of data. Thus, the image ports 0 through 4 each input and output two bytes of data in parallel. The RGB and YMCK color image data is multi values, 8-bit to be read for monochromatic printing and reading or to be outputted for printing. For monochromatic mode processes, two sets of image data or two-pixel image data is inputted or outputted in parallel. For color mode processes, one pixel of each color component of the RGB image data is inputted and outputted in parallel.

Random access memory (RAM) 0 through 15 of the buffer memory device 32 each have eight kilo bytes of memory capacity. The eight K bytes store multi-value data for one line at 600 dots per inch (dpi) along a short edge of A3 paper for one color component of the RGB data or the CMYK data. The RAM's 0 through 15 are used as a line buffer for inputting or outputting the image data. Alternatively, the RAM 0 through 15 are also used as a look-up table (LUT) for the image data. There are sixteen of RAM units of this type for each optionally reading and writing two bytes or one byte at a time. Two RAM units 16 and 17 respectively have two-byte capacity and are used for image data circulating shift registers. When an image data transmission source and an image data reception source have a discrepancy in processing speed for serial data transmission, the image data circulating shift registers absorbs the speed discrepancy by buffering the unprocessed image data. The RAM units 0 through 17 are each connected to one of memory switches (SW) 1 through 3.

Among the image ports 0 through 4, the memory switch SW1 through SW3 and the SIMD-type processor 33, memory controllers 0 through 17 are interconnected. The memory controllers 0 through 5, 11 and 12 that are connected to the image ports 0 through 4 perform data input/output functions according to the input/output mode from the SIMD-type processor 33. For the above memory controllers, the image ports, the SIMD-type processor 33 and the RAM units 0 through 17 become a data transmission source as well as a data reception source. Other memory controllers 6 through 10 and 13 through 19 also has a data selection function for the data transmission direction according to the input/output mode from the SIMD-type processor 33. For these memory controllers, the SIMD-type processor 33 and the RAM units 0 through 17 become a data transmission source as well as a data reception source. However, these memory controllers do not have a function for connecting the image ports. Any one of the memory controllers 0 through 19 sets the memory SW1 through SW3 to connect to one of the RAM units 0 through 17 according to the RAM selection from the SIMD-type processor 33. Each one of the memory controllers 0 through 19 further includes a direct memory access controller (DMAC), a setting register for storing memory setting information from the SIMD-type processor 33, a management register for storing the RAM connection information from the SIMD-type processor 33. The DMAC units further includes an address counter for storing an address for reading and writing in the connected RAM units 0 through 17, a starting address latch, an ending address register, a use mode register for storing information indicative of buffer memory or LUT use and a memory input/output control circuit. The starting address latch, the ending address register and the use mode register each store a plurality of the corresponding information for each of multiple memory areas in the RAM units.

The memory input/output control circuit includes a decoder for decoding the data group in the above setting register and the above management register. The decoder further generates a control signal to the data reception side and a timing signal in synchronization with the data transfer timing signal for the data transfer side. The 8K-byte RAM units 0 through 15 further include a ½ frequency divider for dividing the pixel synchronization pulse which is used to generate odd or even pixel synchronization signals. The odd or even pixel synchronization signals are used to separate and to consolidate one line of odd-numbered pixel data and even-numbered pixel data. When data is written to or read from the buffer memory RAM units 0 through 17, the above decoder of the memory input/output control circuit compares the pixel address in the address counter to the beginning address in the starting address register and the ending address in the ending address register to determine the current RAM access memory area. The above decoder then reads the use mode information from the use mode register for the determined RAM access memory area and decodes the use mode information into an operation mode control signal. Finally, the memory input/output control circuit controls the read and write operation with respect to the RAM units 0 through 17 based upon the operation mode control signal.

By the memory controller setting information, one memory controller of the memory controllers 0 through 19 is selected as a selected memory controller A for connecting with a RAM unit a that is selected from the RAM units 0 through 17, assuming that the buffer memory is selected for the use mode, the selected memory controller A sets the data selector in the memory switch SW1 through SW3 so that the selected memory controller A accesses the selected RAMa unit. In this case, for example when the memory controller setting information specifies an input color image data read operation, the color image data from the specified image port is written to the RAMa unit that is selected by the processor 33. When the use mode of the RAM units is LUT or the conversion table and the memory controller setting information is LUT or write LUT data to the RAM, a selected memory controller B from the memory controllers 0 through 19 writes the γ conversion data from the SIMD-type processor 33 in one RAMb unit selected by the processor 33 from the RAM units 0 through 15 in the memory area raging from the beginning address and the ending address that are specified by the processor 33. When the memory controller setting information specifies the color image data gradation conversion such as a 7 conversion using a LUT, one memory controller C selected from the memory controllers 0 through 19 outputs the input image data from one RAMc unit of the RAM units 0 through 15 or one of the image ports that the processor 33 specifies as address data. The above memory controller B accesses the RAMb unit containing the LUT based upon the address data. The memory controller B reads the corresponding 7 conversion data for the input image data and writes the γ conversion data in one RAMd unit of the RAM units 0 through 15 that the processor specifies. Alternatively, the memory controller B outputs the γ conversion data to the image port. If the use mode in the memory controller setting information is the transfer of the color image data, the processor 33 outputs to the image port the color image data in one RAMe unit selected from the RAM units 0 through 15.

Figure 6A:
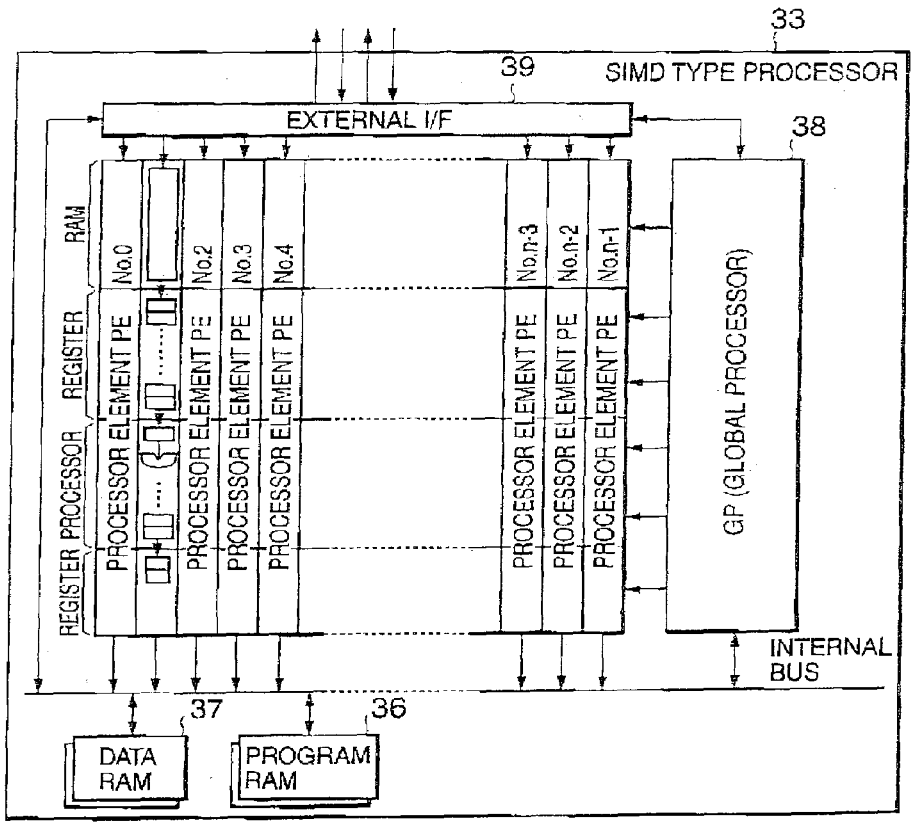
FIG. 6A is a diagram illustrating the components of one preferred embodiment of the SIMD-type processor of FIG. 5 according to the current invention.
Figure 6B:
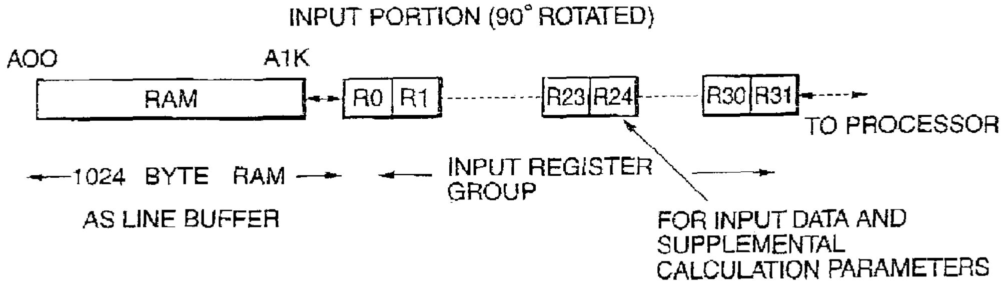
FIG. 6B is a diagram illustrating the components of one preferred embodiment of the processor element PE of FIG. 6A according to the current invention.

Now referring to FIG. 6A, a diagram illustrates the components of one preferred embodiment of the SIMD-type processor of FIG. 5 according to the current invention. FIG. 6B is a diagram illustrating the components of one preferred embodiment of the processor element PE of FIG. 6A according to the current invention. As will be described with respect to FIG. 8, the processor element PE group is a data process device.

The SIMD-type processor 33 is a data processing device. The data processing device further includes a processor element PE local RAM-based memory group and controls a memory area and a data path according to a data bus control in a global processor 38. The input data and the output data are stored in the local memory RAM groups as a buffer memory and are outputted to an external element via an external interface (I/F) 39. The global processor 38 simultaneously offers the same command to the three-hundred twenty processor elements PE which concurrently perform an identical image process on at least 8-bit image data in the local memory RAM units. The computation results from the processor element PE is again stored in the local memory RAM unit and is outputted to the memory controller through the external I/F 39. The process operation of the processor element PE and the associated parameters are transferred between a program RAM 36 and a data RAM 37. For the program RAM 36 and the data RAM 37, the programs and data in a hard disk HDD are downloaded via the IMAC, the parallel bus Pb, the CDIC and the serial bus Sb in response to a command from the system controller 106. The DMAC in the external I/F 39 performs the above data transfer in response to a command from the system controller 106. A processor controller 101 sets the data flow in response to a demand from the DMAC. The system controller 106 selects the data set to be transferred from the HDD to the program RAM 36 and the data RAM 37. When the image process or the image combination as called for by the system is changed, the above system controller selection is correspondingly changed by the instruction from the operation board OPB or the PC. Alternatively, the data set to be transferred from the HDD to the program RAM 36 and the data RAM 37 is rewritten in response to the above changes.

Figure 7:
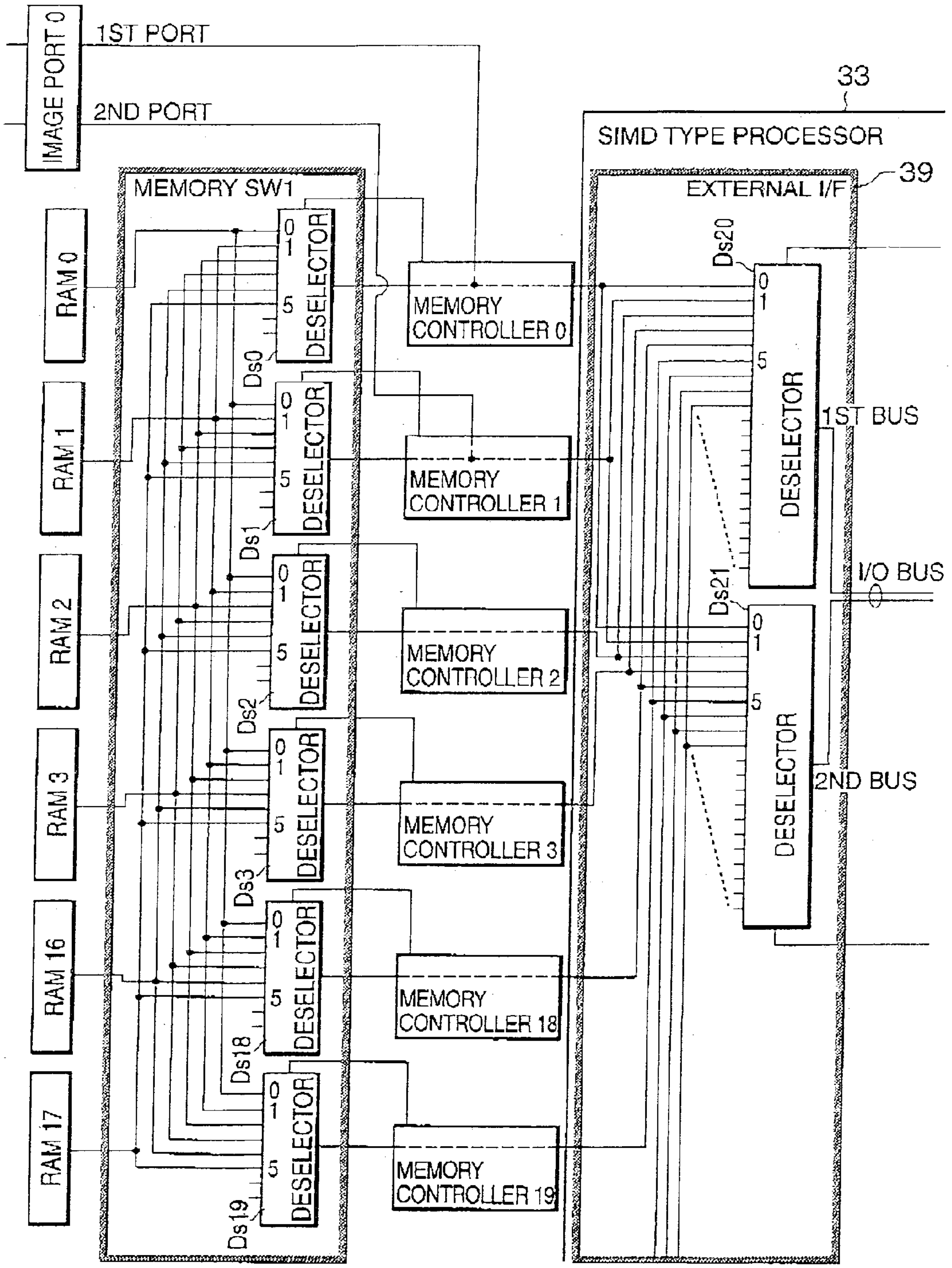
FIG. 7 is a diagram illustrating data lines for one preferred embodiment between the SIMD-type processor 33 and the RAM units 0 through 3, 16 and 17 of FIG. 5 according to the current invention.

Now referring to FIG. 7, a diagram illustrates data lines for one preferred embodiment between the SIMD-type processor 33 and the RAM units 0 through 3, 16 and 17 of FIG. 5 according to the current invention. A single line indicates a pair of bus lines for transferring 8-bit data in parallel. The first memory switch SW1 includes a first group of data selectors Ds 0 through Ds 3, Ds 18 and Ds 19 that are respectively connected to a first group of memory controllers 0 through 3, 18 and 19 for accessing the above RAM units. A common port for each of the first group of the six data selectors is connected to the contact port on the buffer side of the memory controller in the first group. The $0^{th}$ through $5^{th}$ selection ports of the data selectors in the first group are respectively connected to the RAM units 0 through 3, 16 and 17. The connection ports on the data processing side of the memory controllers in the first group are respectively connected to $0^{th}$ through $5^{th}$ selection ports of a pair of data selectors Ds 20 and Ds 21 in the external I/F 39 in the SIMD-type processor 33. The common ports in the first and second data selectors Ds 20 and Ds 21 in the external I/F 39 are connected to a first and second input/output bus lines in the external I/F 39 in the SIMD-type processor 33. The selection ports and the common ports of the above data selectors Ds 20 and Ds 21 both input and output 8-bit data in bit parallel. As shown in FIG. 5, the data line connections are the same with that for the above first group for the second and third groups of the RAM units 4 through 9 and 10 through 15, the second and third group of the memory switch SW2 and SW3 and the data selectors Ds 20 and Ds 21 in the external I/F 39.

The global processor 38 of the SIMD-type processor 33 as shown in FIG. 6A gives the first data selector Ds 20 port selection data or control data specifying one memory controller such as the memory controller 0. The global processor 38 also gives the second data selector Ds 21 control data specifying one memory controller such as the memory controller 1. In the above case, the common ports of the first and second memory controllers 0 and 1 are respectively connected to the first and second input/output bus lines in the external I/F 39 in the SIMD-type processor 33. When the global processor 38 gives the memory controllers 0 and 1 setting information respectively specifying the RAM units 0 and 1 as shown in FIG. 6B, the memory controller 0 gives the data selector Ds 0 the port selection data for specifying the $0^{th}$ port or the RAM unit 0, and the data selector Ds 0 connects the RAM unit 0 to the memory controller 0. Similarly, the memory controller 1 gives the data selector Ds 1 the port selection data for specifying the $1^{st}$ port or the RAM unit 1, and the data selector Ds 1 connects the RAM unit 1 to the memory controller 1. Thus, the first input/output bus line in the external I/F 39 in the SIMD-type processor 33 is connected to the RAM unit 0 while the second input/output bus line is connected to the RAM unit 1.

Since the memory controllers 0 and 1 receive data from the $1^{st}$ and $2^{nd}$ port of the input image port 0, when the global processor 38 gives the setting information specifying the $1^{st}$ or $2^{nd}$ port of the input image port 0 in stead of specifying RAM unit 0 or 1, the memory controller 0 connects the $1^{st}$ port of the input image port 0 to the $0^{th}$ port of the data selector Ds 20. Similarly, the memory controller 1 connects the $0^{th}$ port of the input image port 0 to the $1^{st}$ port of the data selector Ds 21. Thus, the first input/output bus line in the external I/F 39 in the SIMD-type processor 33 is connected to the $1^{st}$ port of the input image port 0 while the second input/output bus line is connected to the $2^{nd}$ port of the input image port 0.

The global processor 38 of the SIMD-type processor 33 selectively connects the first and second input/output bus lines in the external I/F 39 to one 8-bit data input/output port from the RAM units 0 through 17 and the image port 0 through 4 by the control according to the information data to the above data selectors Ds 20 and Ds 21 and the memory controllers 0 through 19. That is, the input/output bus lines in the external I/F 39 concurrently input and output two pairs of data in parallel. For these inputs and outputs, any one of the RAM units 0 through 17 is used. The input/output bus lines in the external I/F 39 is connected to a RAM unit in each processor element PE group as shown in FIG. 6B, which is a data processing device. The global processor 38 sets in the memory controller a read/write DMA transfer of each of the RAM units in the processor element PE group. The global processor 38 writes in the RAM of the each element PE data from the outside of the SIMD-type processor 33. Similarly, the global processor 38 outputs data from the RAM of the each element PE to the outside of the SIMD-type processor 33. That is, data is transferred among the image ports 0 through 4 of FIG. 5, the RAM units 0 through 17 and the processor element group (PEG) of the SIMD-type processor 33.

Referring back to FIG. 4A, the image processing function of the color image process unit of the IPU1 is defined by the read process program that is written in the RAM unit or the program memory 36 in the SIMD-type processor 33. The read process program performs a CCD between-line correction, a main scanning register adjustment, shading correction, dot correction, vertical stripe correction and γ correction on the input RGB image data in the above specified order. Based upon the process RGB data even with the vertical stripe correction, the image is divided, and the area data Fd is generated. The output RGB image data has completed a read process after the identical point is identified on the image. The output RGB image data is outputted to the CDIC and the currency note recognition unit 34 that is an external unit. The scanner γ correction includes steps of providing the six RAM units 0 through 17 of the buffer memory device 32 with the RGB image data as a start address for reading the γ conversion tables for each of the RGB color component, reading the LUT corresponding to the given image data and providing the read LUT with the SIMD-type processor 33.

In further detail, the γ conversion table LUT-R is written in two of the RAM units 0 through 17 for the R image data. The even-numbered pixel R image data and the odd-numbered pixel R image data are simultaneously provided to the γ conversion table LUT-R, and the corresponding data is read from the γ conversion table LUT-R. The information data is concurrently outputted to the SIMD-type processor 33. Similarly, other two of the RAM units 0 through 17 is used for the G image data while yet other two of the RAM units 0 through 17 is used for the B image data. Based upon the 7 conversion table LUT-G and the γ conversion table LUT-B, the G and B image data is respectively converted before the G and B image data is outputted to the SIMD-type processor 33. However, since the SIMD-type processor 33 is able to accept only two bytes at a time and two bytes mean the γ-converted pixel data for two pixels of the same color component, the γ conversion of the RGB image data is performed separately for the color components. The LUT generation process for the γ conversion of the RGB image data will be later described with respect to FIGS. 18, 19 and 20.

Now referring to FIG. 8*a* diagram of one preferred embodiment of illustrates the data conversion device which combines the SIMD-type processor 33 and the buffer memory 32 of FIG. 5 according to the current invention. The data conversion device further includes a buffer memory group BM having the RAM units 0 through 17 as well as a buffer controller BC for reading and writing data and having a memory switch SW, memory controllers 0 through 19, an external I/F 39 and a global processor 38. The buffer controller BC controls the data transfer among the image ports 0 through 4, the buffer memory BM and the processor elements PE group PEG. The global processor 38 determines the data transfer mode among the above three components as well as the data process for the processor element PEG based upon the data program in the program RAM 36. The data program in the program RAM 36 includes transfer mode data for specifying the data transfer mode and process mode data for specifying the data process in the data process device PEG. The data transfer mode data and the process mode data are both high level control data.

The global processor 38 decodes the transfer data upon reading the transfer mode data and reads from the data RAM unit 37 memory controller specifying data for selecting the data selector to corresponding to the decoded transfer mode and control information data that corresponds to the selected memory controller. The memory controller specifying data and the control information data are both low level control information. The above information is outputted to the external IF 39 and to the memory controller. Furthermore, upon decoding the transfer mode data, the global processor 38 reads from the data RAM unit 37 the corresponding data process program, reference data and the setting data for the data processing device PEG and writes them in the RAM units of each processor element of the data processing device PEG. Although the detail of the conversion data will be later provided, the control memory CM consisting of the program RAM unit 36 and the data RAM unit 37 stores the control information memory including the control information data for the buffer memory BM including the RAM units 0 through 17 and the conversion table data or computation correction data.

The buffer memory BM stores the temporarily inputted data, and a predetermined number of the stored data is simultaneously outputted to data processing device PEG. The buffer memory BM also temporarily stores a predetermined number of the processed data and outputs the same. The data processing device PEG concurrently inputs the predetermined number of the data from the buffer memory BM for processing and also concurrently outputs the already processed data. The buffer controller BC adjusts the connection between the buffer memory BM and the data processing device PEG in order to accommodate the parallel input and output operations. Based upon the conversion data in the above control information memory CM, the buffer controller BC generates a plurality of the identical conversion table in the above buffer memory BM. After a portion or entire RAM units 0 through 17 in the buffer memory BM is set for the parallel input and output operations in the data processing device PEG, the data processing device PEG concurrently inputs the predetermined number of the data from the buffer memory BM for processing and also concurrently outputs the already processed data. Alternatively, without providing the details, the data processing device PEG associates non-converted data with each of the plurality of the conversion tables and concurrently reads the converted data and the corresponding non-converted data. The data transfer among the buffer controller BC the image ports 0 through 4, buffer memory BM and each processor element in the data processing device PEG will be later described with respect to FIG. 16.

Figure 9A:
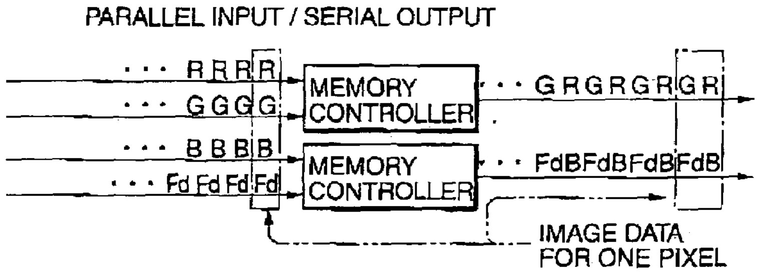
FIG. 9A is a diagram illustrating one memory controller consolidates two lines of data into a single line by combining the area data Fd and the color component data of the RGB image data from the image ports 0 through 4, the RAM units 0 through 17 or the SIMD-type processor 33.

Now referring to FIGS. 9A through 9 E, diagrams illustrate types of parallel and serial conversions by one preferred embodiment of the memory controllers 0 through 19 according to the current invention. FIG. 9A shows that one memory controller consolidates two lines of data into a single line by combining the area data Fd and the color component data of the RGB image data from the image ports 0 through 4, the RAM units 0 through 17 or the SIMD-type processor 33. The RGB data includes three lines of data, and each line represents a value in one of the three color components of the RGB data. On the other hand, the are data Fd includes a single line of data. As a result of the above consolidation, two lines of parallel/serial data are generated. In this example, the double-line input data for the R image data and the G image data is converted into a single data by alternate pick up consolidation. Similarly, the B image data and the area data Fd are converted into a single line of data by alternate pick up consolidation.

Figure 9B:
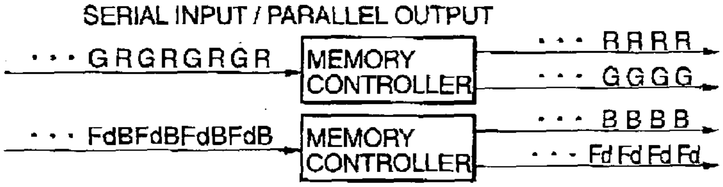
FIG. 9B is a diagram for illustrating a process of reconfiguring the above converted two single-line data of FIG. 9A back to the original two double-line data or four lines of parallel data.
Figure 9C:
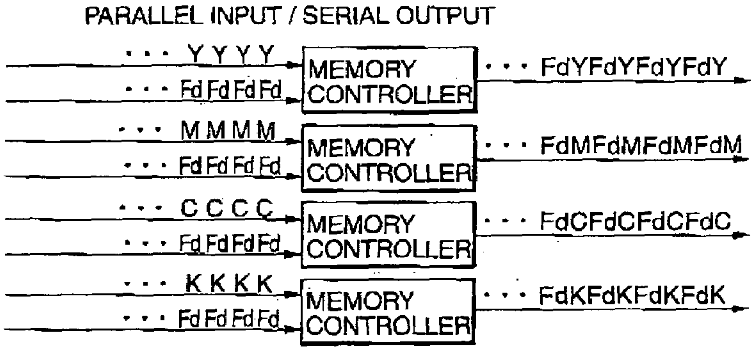
FIG. 9C is a diagram for illustrating a process of parallel-to-serial conversion of the YMCK image data output to the IPU3*y*, IPU3*m*, IPU3*c* and IPU3*k* in the buffer memory of the IPU2.
Figure 9D:
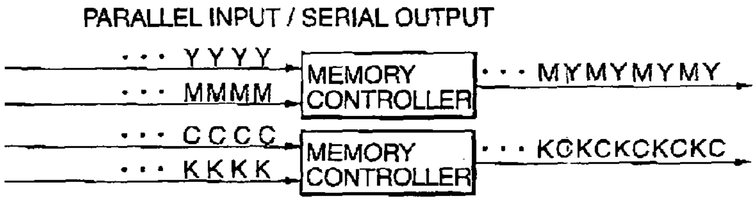
FIG. 9D is a diagram for illustrating a process of parallel-to-serial conversion of the YMCK image parallel data that is generated by the SIMD-type processor to serially output to the parallel bus Pb in the buffer memory of the IPU2.
Figure 9E:
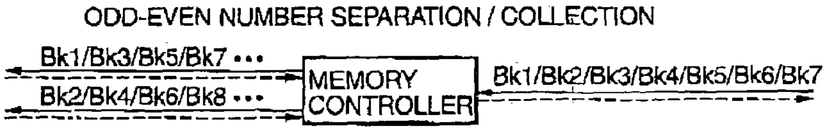
FIG. 9E is a diagram for illustrating a process of separating one line of image data into an odd-numbered pixel data row and an even-numbered pixel data row as indicated by the solid lines.

FIG. 9B is a diagram for illustrating a process of reconfiguring the above converted two single-line data of FIG. 9A back to the original two double-line data or four lines of parallel data. In other words, each line of serial data is picked up in the standing order and alternately distributed between two lines of an odd-numbered line and an even-numbered line. FIG. 9C is a diagram for illustrating a process of parallel-to-serial conversion of the YMCK image data output to the IPU3*y*, IPU3*m*, IPU3*c* and IPU3*k* in the buffer memory of the IPU2. This conversion is not practiced in the buffer memory device 32. Five lines of parallel data including four lines for the Y, M, C and K image data and a single line of the area data Fd are converted into four lines of serial data. Each of the serial data is transferred to the IPU3*y*, IPU3*m*, IPU3*c* and IPU3*k*. The IPU3*y*, IPU3*m*, IPU3*c* and IPU3*k* converts the four lines of the serial data into a pair of one color component image data Y, M, C or K and the area data Fd by a reverse conversion or serial-to-parallel conversion. FIG. 9D is a diagram for illustrating a process of parallel-to-serial conversion of the YMCK image parallel data that is generated by the SIMD-type processor to serially output to the parallel bus Pb in the buffer memory of the IPU2. This conversion is not practiced in the buffer memory device 32. This conversion is not practiced in the buffer memory device 32 of the IPU1. Four lines of parallel data including four lines for the Y, M, C and K image data are converted into two lines of serial data. To receive these two lines of the serial data, the IPU2 reconfigures back to the original four lines of the Y, M, C and K image data by a reverse conversion or serial-to-parallel conversion. FIG. 9E is a diagram for illustrating a process of separating one line of image data into an odd-numbered pixel data row and an even-numbered pixel data row as indicated by the solid lines. In contrast, the odd-numbered pixel data row and the even-numbered pixel data row are consolidated into a single data line as indicated by dotted line. Although FIG. 9E illustrates a process of separation and consolidation of the monochromatic image data BK that is outputted from the reading unit 21, the same process is applicable to the color image data. The SIMD-type processor 33 includes an output port for concurrently inputting and outputting two-byte data with an external memory controller. Not only the two-byte data, but also each of the two byte data is concurrently inputted and outputted.

Now referring to FIGS. 10A through 10G, diagrams illustrate types of parallel and serial conversions by the memory controllers 0 through 19 as well as numerical examples A through G of the data input and output mode by the IPU1, the IPU2, IPU3*y*, IPU3*m*, IPU3*c* and IPU3*k* according to the current invention. Now referring particularly to FIG. 10A, an image data flow as indicated by an arrow and a solid line Af is for “one line input separation mode.” For example, in the one line separation input mode, one line of image data from the reading unit 21 is given to one selected memory controller A from the memory controllers 1 through 19 in the IPU1. The one line of the image data is either black-and-white image data in monochromatic mode or one color component of the RGB image data in a color mode. The memory controller A separates the image data of the single line into an odd-numbered pixel data row and an even-numbered pixel data row, and the odd-numbered pixel data row and the even-numbered pixel data row are concurrently transmitted to the SIMD-type processor 33. The SIMD-type processor 33 concurrently inputs and processes both of the pixel data. The SIMD-type processor 33 outputs the processed image data to one selected memory controller B from the memory controllers 1 through 19. The memory controller B consolidates the image data from the-odd-numbered pixel data row and the even-numbered pixel data row to generate a single line of the image data and transfers the single line of the image data to the CDIC.

Still referring to FIG. 10A, as necessary, one of the RAM units 1 through 17 or a LUT is provided as a line buffer at an input or output side of the memory controller A or B. The memory controller A, B or C refers to the same or different memory unit in the above and the following modes. Another exemplary data flow is “one line input separation mode” as indicated by a dotted line Bf. One line of image data from the CDIC or the IPU2 is given to one selected memory controller B from the memory controllers 1 through 19 in the IPU2 or IPU3*y*, IPU3*m*, IPU3*c* and IPU3*k*. The memory controller B separates the image data of the single line into an odd-numbered pixel data row and an even-numbered pixel data row. The SIMD-type processor 33 concurrently inputs and processes both of the pixel data. The SIMD-type processor 33 outputs the processed image data to one selected memory controller A from the memory controllers 1 through 19. The memory controller A consolidates the image data from the odd-numbered pixel data row and the even-numbered pixel data row to generate a single line of the image data and transfers the single line of the image data to the IPU3*y*, IPU3*m*, IPU3*c* and IPU3*k* or the image formation unit 105.

Now referring to FIG. 10B, an image data flow as indicated by an arrow and a solid line Bf is for “odd-even pixel separation input mode.” For example, in the odd-even pixel separation input mode, an odd-numbered pixel data row and an even-numbered pixel data row from one line of image data from the reading unit 21 is given to the SIMD-type processor 33 via one selected memory controller A from the memory controllers 1 through 19. The one line of the image data is either black-and-white image data in monochromatic mode or one color component of the RGB image data in a color mode. The odd-numbered pixel data row and the even-numbered pixel data row are concurrently transmitted to the SIMD-type processor 33. The SIMD-type processor 33 concurrently inputs and processes both of the pixel data. The SIMD-type processor 33 outputs the processed image data to one selected memory controller B from the memory controllers 1 through 19. The memory controller B consolidates the image data from the odd-numbered pixel data row and the even-numbered pixel data row to generate a single line of the image data and transfers the single line of the image data to the CDIC.

Still referring to FIG. 10B, another exemplary data flow is “one line separation output mode” as indicated by a dotted line Br. One line of image data from the CDIC or the IPU2 is given to the memory controller B. The memory controller B separates the image data of the single line into an odd-numbered pixel data row and an even-numbered pixel data row. The SIMD-type processor 33 concurrently inputs and processes both of the pixel data. The SIMD-type processor 33 outputs the processed image data to the memory controller A. The memory controller A concurrently transfers the two lines of the odd-numbered pixel data row and the even-numbered pixel data row to the IPU3*y*, IPU3*m*, IPU3*c* and IPU3*k* or the image formation unit 105.

Now referring to FIG. 10C, an image data flow as indicated by an arrow and a solid line Cf is for “multi color concurrent process mode.” For example, in the multi color concurrent process mode, two R and G color components of the RGB image data from one line of image data from the reading unit 21 is given to the SIMD-type processor 33 via one selected memory controller A from the memory controllers 1 through 19. The two R and G color components of the RGB image data is concurrently transmitted to the SIMD-type processor 33. The SIMD-type processor 33 concurrently inputs and processes both of the RGB data. The SIMD-type processor 33 outputs the processed RGB image data to one selected memory controller B from the memory controllers 1 through 19. The memory controller B consolidates two R and G color components of the RGB image data to generate a single line of the image data and transfers the single line of the image data to the CDIC.

Still referring to FIG. 10C, another exemplary data flow is “multi color separation output mode” as indicated by a dotted line Cr. One line of alternate R and G image data from the CDIC is given to the memory controller B. The memory controller B separates the image data of the single line into two lines of the R and G color components of the RGB image data. The SIMD-type processor 33 concurrently inputs and processes both of the R and G image data. The SIMD-type processor 33 outputs the processed image data to the memory controller A. The memory controller A concurrently transfers the two lines of the image data to the CDIC.

Now referring to FIG. 10D, an image data flow as indicated by an arrow and a solid line Df or Dr corresponds the data flow as indicated by the direction Cf and Cr as described with respect to FIG. 10C. However, since the color scanned RGB image data is three-line, another line of data X is added. The data X is either dummy data or the image area data Fd.

Now referring to FIGS. 10E and 10F, an image data flow as indicated by an arrow and a solid line Ef or Ffis for "multi color concurrent process mode." For example, in the multi color concurrent process mode, two lines of the Y-M and C-K components of the YMCK image data from is concurrently given to the SIMD-type processor 33 via the memory controller A. The SIMD-type processor 33 concurrently inputs and processes both of the YMCK data. The SIMD-type processor 33 outputs the processed YMCK image data to one selected memory controller B from the memory controllers 1 through 19. The memory controller B consolidates two lines of the Y-M and C-K components of the YMCK image data to generate a single line of the image data and transfers the single line of the image data to the CDIC.

Still referring to FIGS. 10E and 10F, another exemplary data flow of the one line input separation mode as indicated by a dotted line Er or Fr is that one line of alternate Y-M and C-K components of the YMCK image data from the CDIC is given to the memory controller B. The memory controller B separates the image data into two line of the Y-M and C-K components of the YMCK image data. The SIMD-type processor 33 concurrently inputs and processes both of the Y-M and C-K components of the YMCK image data. The SIMD-type processor 33 outputs the processed image data to the memory controller A. The memory controller A concurrently transfers the two lines of the image data to the IPU3*y*, IPU3*m*, IPU3*c* and IPU3*k*.

Now referring to FIG. 10G, an image data flow as indicated by an arrow and a solid line Cf is for "black-and-white multiple line process mode." For example, in the black-and-white multiple line process mode, two lines of black-and-white image data is given to the SIMD-type processor 33 via one selected memory controller A. The two lines of black-and-white image data are concurrently transmitted to the SIMD-type processor 33. The SIMD-type processor 33 concurrently inputs and processes both lines of the black-and-white image data. The SIMD-type processor 33 outputs the processed black-and-white image data to one selected memory controller B. After processing at the memory controller B, the processed data is sequentially stored in line memory units or RAM 0 through 17. After completing the storage, each line of the processed data is sent to the CDIC.

Still referring to FIG. 10G, another exemplary data flow is "black-and-white multiple line output mode" as indicated by a dotted line Gr. Two lines of the image data from the CDIC or IPU2 is given to the memory controller B at the IPU2 or IPU3*k*. The memory controller B stores the image data in the line memory from the RAM units 0 through 17. The SIMD-type processor 33 concurrently inputs and processes the two lines of the image data. The SIMD-type processor 33 outputs the processed image data to the memory controller A. The memory controller A concurrently transfers the two lines of the image data to the IPU3*k* or the image forming unit 105.

The memory controller or the SIMD-type processor 33 input, output or process a single line of the image data. Each memory controller alone as shown in the memory controller B or C has functions for performing a serial or parallel conversion for a single line input/double line output format (parallel conversion) or for a double line input/single line output format (serial conversion). The memory controller A is shown in FIG.S 10B through G. The memory controller B is shown in FIGS. 10B through F without the SIMD-type processor 33. Using the above functions to transfer the RGB image data with the area data Fd, the R and G image data is outputted to the CDIC after the data is serially converted into a double line input/single line output format as shown in the data flow Cf in FIG. 10C. On the other hand, the B image data with the area data Fd are converted into a double line input/single line output format as shown in the data flow Df in FIG. 10D before the single line data is transferred to the CDIC. When the YMCK data and the area data Fd is transferred from IPU2 to the IPU3*y*, IPU3*m*, IPU3*c* and IPU3*k*, respective color component of the YMCK and the area data Fd are converted into a double line input/single line output format as shown in the data flow Cf in FIG. 10C at each of four memory controllers of the IPU2. Each of the converted single line of the image data is respectively transferred to the IPU3*y*, IPU3*m*, IPU3*c* and IPU3*k*. Each memory controller of the IPU3*y*, IPU3*m*, IPU3*c* and IPU3*k* performs the single line input/double line output format conversion to generate two lines of data from each color component of the CMYK image data and the area data FD.

In this example, since the image port of the buffer memory device 32 inputs and outputs two bytes or sixteen bits in parallel, two lines of the image data are concurrently inputted or outputted. Between the image port and the SIMD processor 33 via the memory controller, two lines of the image data are simultaneously and concurrently inputted and outputted. In this case, in any data flow as shown in FIGS. 10A through 10G, the image data is inputted to the memory controller A from the image port. In case of the data flow in FIG. 10A, a single line of the image data is inputted while in case of the data flows in FIGS. 10B through 10G, a double line of the image data is inputted. The memory controller separates the image data into two lines of data and concurrently transfers the data to the SIMD-type processor 33. The SIMD-type processor 33 concurrently processes the two lines of the image data. The SIMD-type processor 33 concurrently outputs the processed image data. The memory controller A or any other memory controller outputs the two lines of the image data as they are through the image port.

The memory controller A outputs the two lines of the image data through the image port. In this case, it is preferred that the image data is transferred to the SIMD-type processor 33 in the right flow direction as indicated by a solid line from the image port of the upper left corner as shown in FIG. 10. The SIMD-type processor 33 outputs the processed data in the left flow direction as indicated by a dotted line to the image port. When the image port is one byte on eight-bit, two bytes or more, as long as the output or input uses one line of the image data, one line of the image data is inputted from the image port to the memory controller B for the data conversions as shown in FIGS. 1, 10A though 10F or to the memory controller C for the data flow as shown in FIG. 10G. The memory controller B separates the image data into two lines and concurrently outputs to the SIMD-type processor 33. The SIMD-type processor 33 concurrently processes the image data and outputs the two lines of the processed image data to the memory controller B, where the image data is combined into one line of the image data for output. In this case, the image data is outputted to the SIMD-type processor 33 from the upper right image port in the left data flow direction as shown in the dotted arrow lines Ar through Gr in FIG. 10. The SIMD-type processor 33 outputs the processed image data in the right data flow direction as indicated by the soled arrow lines Af through Gf. That is, one preferred embodiment the buffer memory device 32 according to the current invention selects and sets any one of the data flows as shown in FIGS. 10A though 10G, including the left-to-right data flow directions, the right-to-left data flow direction, the left-to-left via the SIMD-type processor data flow direction, and the right-to-right via the SIMD-type processor data flow direction. In the above data flows, the memory controllers A, B and C are optionally the same or they may be different. The line buffer memory of the RAM units D through 17 is placed at the input side or the output side of the memory controller as necessary.

Figure 4B:
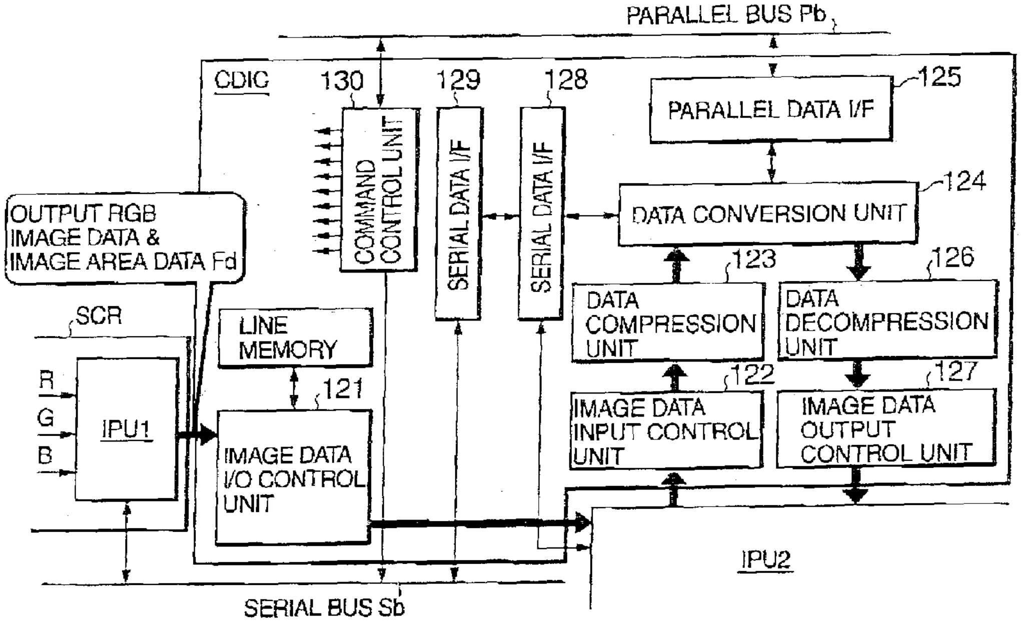
FIG. 4B is a diagram illustrating one preferred embodiment of the CDIC according to the current invention.

Referring to FIG. 4B, a diagram illustrates one preferred embodiment of the CDIC according to the current invention. The IPU 1 receives the RGB image data and the area data Fd, and the RGB image has been serially converted as shown in FIG. 9A. The IPU1 outputs the received data to the IPU2. The IPU2 performs the parallel-to-serial conversion as shown in FIG. 9B and separates the RGB data from the area data Fd. The IPU2 further generates 8-bit multi-value YMCK image data from the RGB data. When the image formation or printout is specified, the parallel-to-serial conversion of FIG. 9C is performed and is outputted to the IPU3*y*, IPU3*m*, IPU3*c* and IPU3*k*. When it is specified to output to the parallel bus Pb, the parallel-to-serial conversion as shown in FIG. 9D is performed and is outputted to the image data input and output control 122 of the CDIC. The received data at the image data input output control 122 is compressed for the first time by the data compression unit 123 in order to increase the transfer rate in the parallel bus Pb. The data conversion unit 124 converts the compressed data into parallel data and outputs the parallel data to the parallel bus Pb via a parallel I/F 125. The image data from the parallel bus Pb is converted to serial data by the data conversion unit 124. Since the data has been initially compressed for the bus transfer, the data is decompressed by the data decompression unit 126. The decompressed data is the two-line serial data at the memory controller output as shown in FIG. 9D. The image data output control 127 outputs the decompressed data to the IPU2, where the image data is separated into the Y, M, C and K color image data by the parallel conversion. The CDIC has both conversion functions for the serial data from the parallel bus Pb and the serial data from the serial bus Sb. The system controller 10*b* transfers the data to the parallel bus Pb, while the process controllers 101 and 106 perform the parallel or serial conversion respectively at the data conversion unit 124 and the serial data I/F 129 for communication. The serial data I/F 129 is for IPU2, and the IPU2 serially transfers the image data.

Figure 11A:
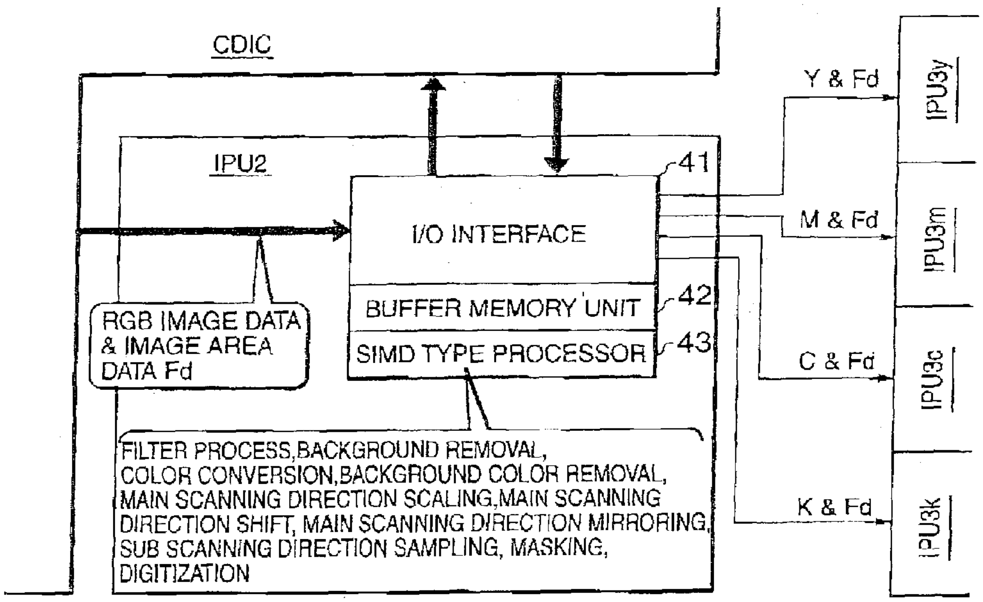
FIG. 11A is a diagram illustrating one preferred embodiment of the IPU2 according to the current invention.

Now referring to FIG. 11A, a diagram illustrates one preferred embodiment of the IPU2 according to the current invention. The IPU2 further includes an input/output I/F 41, a buffer memory 42 and a SIMD-type processor 33 and is a color image processing unit that combines the above components. The IPU2 has the substantially identical components 31, 32 and 33 of the IPU1 as shown in FIG. 5. However, in IPU2, the data stored in the program RAM and the data RAM in the SIMD-type processor 33 is intermediately processed for filtering, back ground removal, color conversion to YMCK, back ground color removal, scanning size change, scanning shift, scanning mirroring, subscanning sampling, masking and binarization for monochromatic character output.

Figure 11B:
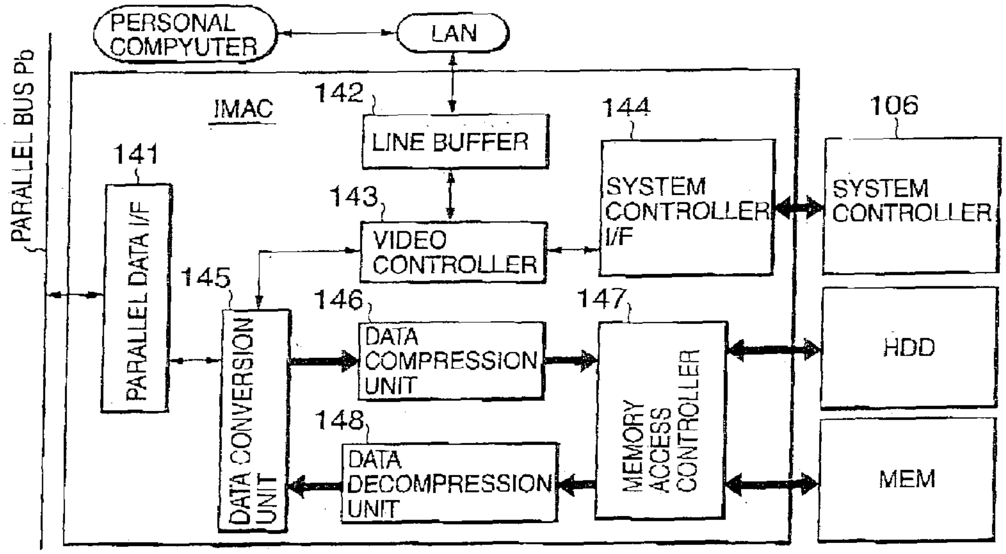
FIG. 11B is a diagram illustrating one preferred embodiment of the IMAC according to the current invention.

Now referring to FIG. 11B, a diagram illustrates one preferred embodiment of the IMAC according to the current invention. The parallel data I/F 141 manages the image data input and output for the parallel bus Pb. The parallel data I/F 141 further controls the write/read of the image data to and from the MEM unit and the formatting of the code data mainly from an external PC to the image data. The code data from the PC is stored in the line buffer 142. That is, it is locally stored in a local area, and the code data in the line buffer 142 is formatted into the image data by a video controller 143 based upon a formatting command from the system controller 106 that is inputted via the system controller I/F 144. The image data from the parallel bus Pb via the parallel data I/F 141 or the formatted image data is stored in the MEM. In this case, the data conversion unit 45 selects the image data to be stored. The data compression unit 46 compressed the image data for the second time to increase the memory utilization efficiency. The memory access controller 147 stores the secondarily compressed data in the MEM unit while the memory controller 147 manages the address for the storage. The memory access controller 147 manages the stored address for reading the stored data, and the data decompression unit 148 decompresses the read image data. The decompressed image data is still the initially compressed image data for the parallel bus transfer and is transferred to the parallel bus Pb via a parallel data I/F 141 for data transfer.

The facsimile control unit FCU for FAX transmissions as shown in FIG. 3 converts the image data to its transmission format and transmits to the external line circuit PN. The FCU also outputs to the image forming unit 105 via external I/F unit or the parallel bus Pb after converting the data from the external line circuit PN to the image data. The FCU further includes a FAX image process, an image memory, a memory control, a facsimile control unit, an image compression/decompression unit, a modem and a network control device. The IMAC or MEM covers a part of the buffer output function for the image data. In the FAX transmission/reception unit, the facsimile control unit FCU sends a command upon initiating the image information transfer and sequentially reads the stored image information from the image memory. The sequentially read image information is restored to the original signal by the FAX image process in the FCU. The density conversion or scaling are also performed, and the converted information is given to the facsimile control unit. The image information in the facsimile control unit is compressed by coding in the image compression unit and modulated by a modem for outputting to a destination via a network control device. The transmitted image information is removed from the memory. Upon reception, the received image is temporarily stored in the memory in the FCU. If the received image is ready for outputting for record, it is outputted upon receiving the information sufficient for one sheet of a recording medium.

Figure 12:
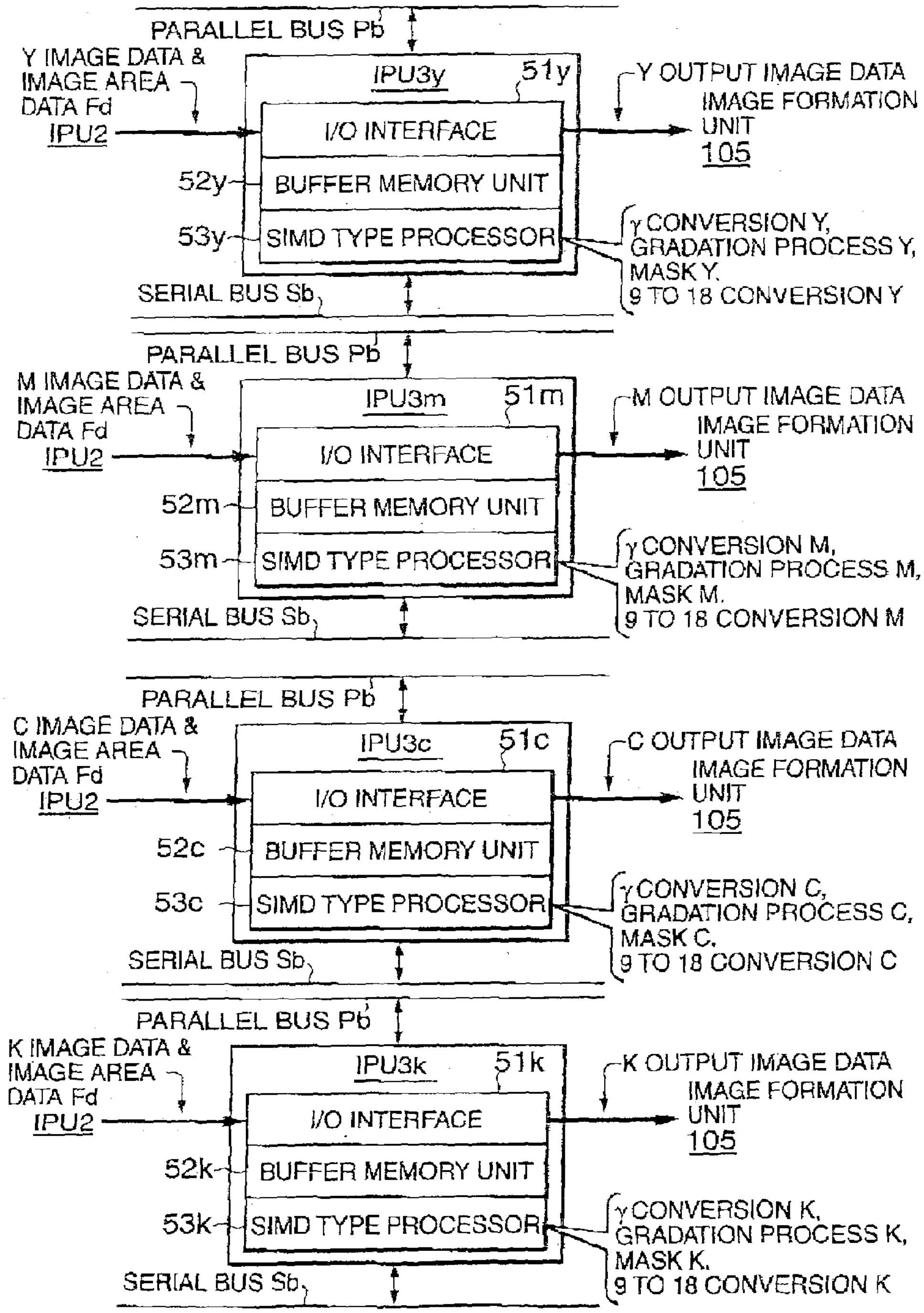
FIG. 12 is a diagram illustrating one preferred embodiment of the IPU3*y*, IPU3*c*, IPU3*m* and IPU3*k* according to the current invention.

Now referring to FIG. 12, a diagram illustrates one preferred embodiment of the IPU3*y*, IPU3*c*, IPU3*m* and IPU3*k* according to the current invention. The IPU3*y*, IPU3*c*, IPU3*m* and IPU3*k* are substantially identical with each other and perform the substantially identical output correction processes such as a printer γ conversion and a gradation process. In the following, IPU3y will be described in details. The IPU3y is a color image process unit that combines an input/output I/F 51y, a buffer memory 52y and a SIMD-type processor 53y. The IPU3y is substantially identical to the color image process unit of the IPU1, which includes the components 31, 32 and 33 as shown in FIG. 5. However, the data stored in the program RAM and the data RAM of the SIMD-type processor 33y is converted and binarized by gradation for a printer output in the IPU3y. The gradation generally includes intensity gradation process, a dithering process and an error diffusion process. Although one of these is selected based upon the image process mode or the area data Fd in the IPU3y, an error diffusion unit 35 is connected to the SIMD-type processor 53y as shown in FIG. 5. In FIG. 12, the above error diffusion unit 35 is not shown. The description of the IPU3c and the IPU3k will not be further provided since it is inferred by replacing the above description of Y(y) with M(m), C(c) or K(k). When the IPU3y, IPU3m IPU3c and IPU3k receive serial data including the area Fd from the output side of the memory controller as shown in FIG. 9C, the above units perform a reverse process of the parallel-to-serial conversion and the separation of the image data from the area data Fd. For example, the IPU3y performs the parallel conversion on a single line of serial data that alternates the Y image data and the area data Fd to generate a single line of only Y image data and a single line of only area data Fd. When the image data is concurrently received for the even-numbered pixel image data and the odd-numbered pixel image data, the IPU3y, IPU3c, IPU3m and IPU3k concurrently process the above two pixel image data. The two lines of the processed image data to be outputted to the image forming unit 105 is consolidated into a single line of serial data for a print output image data row as shown by the dotted line in FIG. 9E. The consolidated single line of the image data is outputted to the image forming unit 105. When the even-numbered and odd-numbered pixels are separately exposed by separate laser light or separate running line in the image forming unit 105, the two lines of the even-numbered pixel image data row and the odd-numbered pixel image data row are outputted to the image forming unit 105 without any further process. Although FIG. 9E indicates only the Bk image data that is processed by the IPU3k, the process is substantially the same for the Y, M and C image data. In the above example, the CDIC as an image data control means and the IMAC such as an image memory control means are connected by the parallel bus Pb. Since each of the stand alone color document scanner SCR, the second color image processing unit IPU2 and the color printer are not directly connected to the parallel bus Pb but connected to the CDIC or the IPU2, the CDIC and the IPU2 manages the utilization of the parallel bus Pb. For this reason, the mediation and the transfer control of the parallel bus Pb are facilitated and efficient.

Figure 13A:
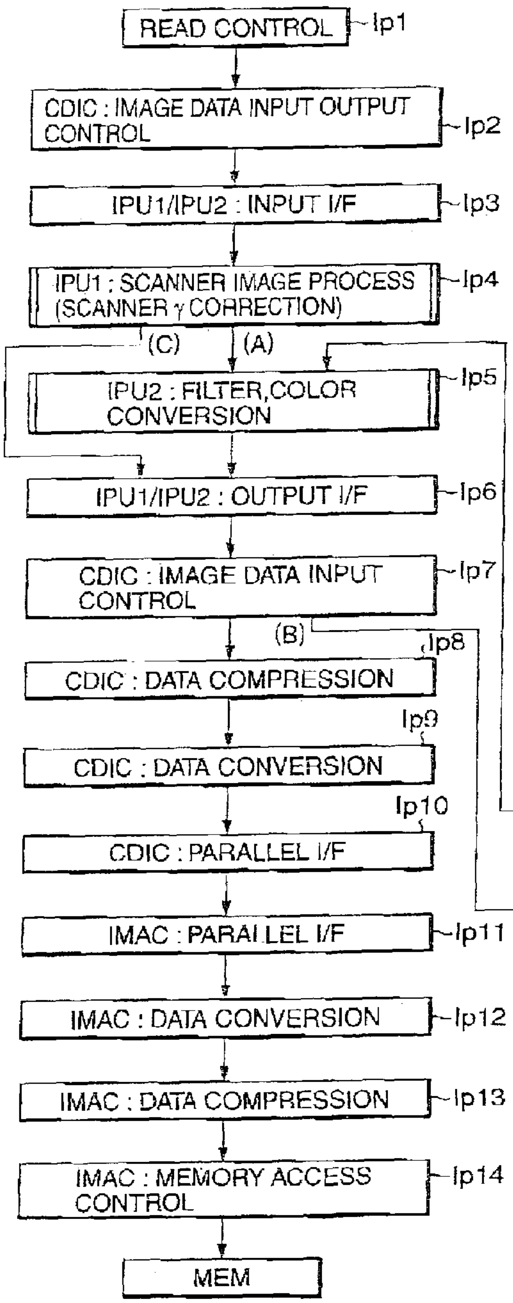
FIG. 13A is a flow chart illustrating steps Ip1 through Ip14 of writing in the MEM the YMCK image data that the IPU2 has converted or the RGB image data that the color document scanner SCR has generated.
Figure 13B:
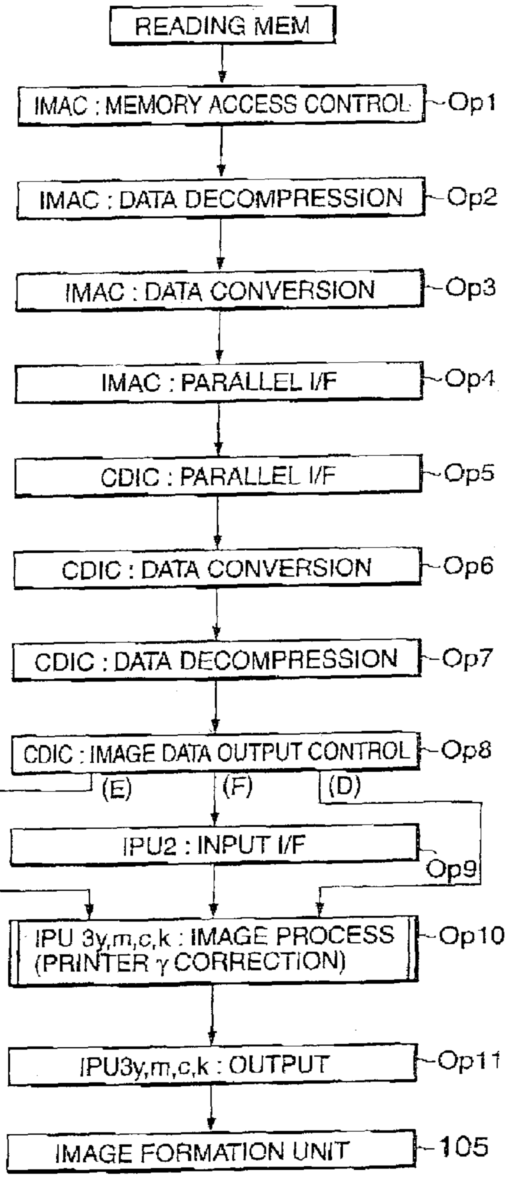
FIG. 13B is a flow chart illustrating steps Op1 through Op13 of outputting the image data read from the MEM to the image forming unit 105 of the color printer PTR and writing in the MEM the YMCK image data that has been converted from the RGB image data by the IPU2.

Now referring to FIGS. 13A and 13B, flow charts illustrate steps involved in a preferred process of storing and reading the image to and from the image memory MEM according to the current invention. FIG. 13a is a flow chart illustrating steps Ip1 through Ip14 of writing in the MEM the YMCK image data that the IPU2 has converted or the RGB image data that the color document scanner SCR has generated. FIG. 13B is a flow chart illustrating steps Op1 through Op13 of outputting the image data read from the MEM to the image forming unit 105 of the color printer PTR and writing in the MEM the YMCK image data that has been converted from the RGB image data by the IPU2. The CDIC controls the above data flows between the bus and the associated units. When the RGB data from the color document scanner is written to the MEM, the CDIC selects a route or path (A) for the steps Ip4 through Ip6. When the IPU2 converts the RGB image data from the color document scanner SCR into the YMCK image data and prints out the YMCK image data without processing, the CDID selects a path (B). Lastly, when the CDIC temporarily writes the YMCK image data of the IPU2 in the MEM, the CDIC selects a path (C) for the steps Ip4 and Ip5.

When the CDIC reads the YMCK image data from the MEM, the CDIC selects a path (D) for the steps Op8 through Op10. When the YMCK data is again rewritten to the MEM after the RGB image data is read and converted, the CDIC selects a path (E) for the steps Op8 through Op10. When the RGB data is read and printed out, the CDIC selects a path (F) for the steps Op8 and Op9. Among the above described RGB image data reading correction, the intermediate process including the conversion to the YMCK image data at the IPU2 and the output correction for the printer output at the IPU3y, IPU3c, IPU3m and IPU3k, an image process of the same kind is generally performed on the image data having pixels distributed over one line. Although the details are modified in the process in response to the area data Fd, if the area data Fd is the same, the same image process is performed. Therefore, a large number of processor elements PE increases the color image processing speed in all of the above reading correction process, the intermediate process and the output correction process by performing the same image process concurrently on each of the multi-value color image data using the SIMD-type processors 33, 43, 53y, 53m, 53c and 53k in the color image process unit IPU1 through IPU3. The SIMD-type processors 33, 43, 53y, 53m, 53c and 53k each have a total of 320 processor elements PE, which each process more than 8-bit of multi-value image data and concurrently process image data for 320 pixels. For example, a matrix used in a dithering process has a size of 4×4, 6×6, 8×8 or 16×16. To be applicable to any one of these matrixes and to concurrently process a plurality of the matrixes in parallel, a multiple of a minimal common multiple number of ninty-six of processor elements is necessary since eight is a quotient of a number sixteen. In the preferred embodiment, three hundred twenty processor elements are used since an offset of 32 is added to 96×3. When 96×3 pixel groups of image data are processed, the offset is used for intermediate computation, image data keeping or supplying computation or for referencing the image pixel group at both sides of the rear pixel image data.

In the matrix where a plurality of pixels exists in two dimensional directions from a current pixel, when a filtering process such as edge emphasis or smoothing known as MTF correction is performed on the image data of the current pixel or when an edge detection of the current pixel by comparing the matrix image data distribution to the edge pattern matrix, it is necessary to provide the performing element with the result of the sum of the product or a pattern comparison. The sum of the product or a pattern comparison is performed by the image group data of adjacent pixels in both sides of 96×3 pixel groups as well as an offset of sixteen processor elements at both sides of the 96×3 performing processor elements for outputting the computational data. Thus, depending upon an image process, more than 96×3 processor elements are used for the concurrently parallel image data processes. For the interpolation of linear approximation for generating the above described γ-conversion LUT, since the adjacent pixels for the image data are not needed for reference in interpolating the current pixel, all of the three hundred twenty processor elements PE are used for the concurrent interpolation computation of the image data of the three hundred twenty pixels. However, the color image data for the γ-conversion is 8-bit multi-gradation data. Since it is interpolation of 256-gradation data ranging from 0 to 255, all of the two hundred fifty-six processor elements PE are used concurrently. For example, when a number of multi-gradation data exceeds 320, 512, 1024 or 2048 pieces of 9, 10, 11 or 12 bit, gradation data is used. For example, when 512 pieces of gradation data is used, the first 319 pieces of the multi-gradation group data is interpolated all at once, and the γ-converted results are written to the γ-conversion LUT RAM. Subsequently, the remaining $320^{th}$ to $511^{th}$ pieces of multi-gradation data is interpolated at once, and the γ-converted results are written to the γ-conversion LUT RAM. In other words, the γ-conversion by interpolation is repeated for a number of times.

The LUT generation will be described. The LUT is used for γ-conversion in numerous image processes which the same process is concurrently performed on a large number of image data by the IPU2 or the IPU3*y*, IPU3*c*, IPU3*m* and IPU3*k*. For example, the scanner 7-conversion is performed in the IPU1 while the printer 7-conversion is performed in the IPU3*y*, IPU3*c*, IPU3*m* and IPU3*k*. The image processing program or data is contained in a hard disk HDD, and the image processing program or data is respectively loaded in the program RAM and the data RAM of the SIMD-type processor 33, 43, 53*y*, 53*m*, 53*c* and 53*k*. When the system controller 106 initializes the system in response to power on or a reset signal from the operation board OPB or a host PC, the above described program and data in the hard disk HDD are designated for each of the processors 33, 43, 53*y*, 53*m*, 53*c* and 53*k* and are loaded to the above designations by the data transfer via the IMAC, the parallel bus Pb, the CDIC, the serial bus 5*b* and the process controller 101.

Figure 14:
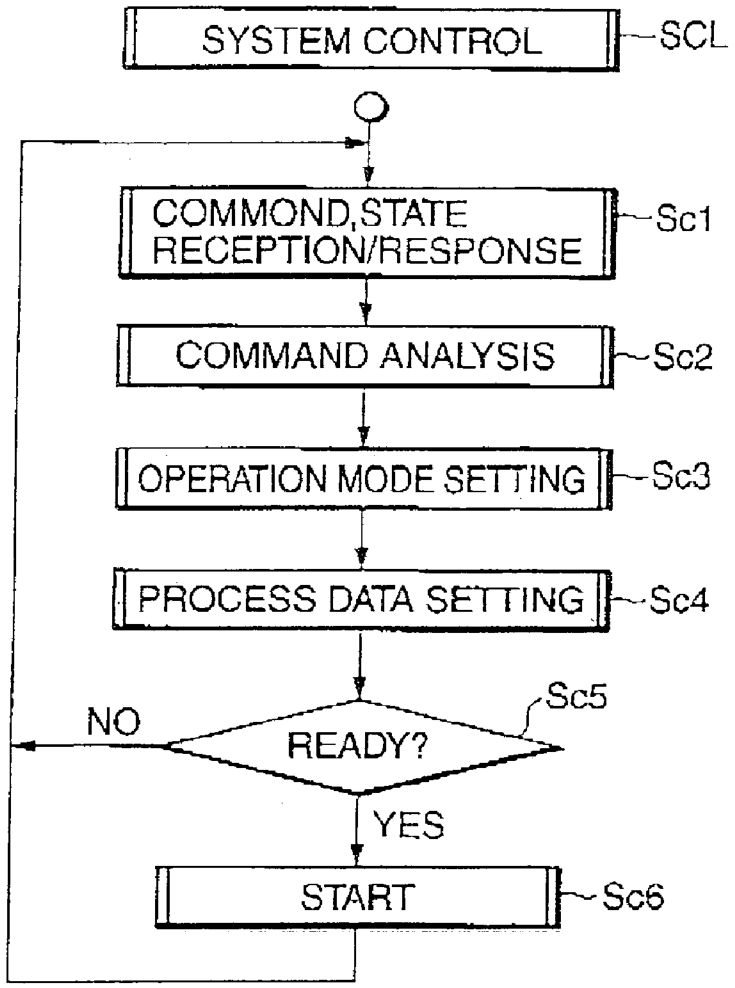
FIG. 14 is a flow chart illustrating steps involved in a preferred process of setting the system according to the current invention.

Now referring to FIG. 14, a flow chart illustrates steps involved in a preferred process of setting the system according to the current invention. The system controller 106 sets the system in response to an image processing instruction from a host PC or the operation board POB. Among the system controller 106, the operation board OPB, the personal computer PC, the facsimile control unit FCU, the color document scanner SCR and the color printer PTR, a command, a response and state information are exchanged. In a step Sc1, a command or an instruction for image processing is received from the operation board OPB, the personal computer PC or the facsimile control unit FCU. The received command is analyzed in a step Sc2, where the command data is decoded. Subsequently, the system controller 106 determines an operation mode for each element or component in the system as shown in FIG. 3 based upon the command analysis result in a step Sc3, The corresponding image processing data for the operation mode is transferred in a step Sc4. The system components each set the received operation mode and the received image processing data for themselves. If the specified command is ready to be performed by the system component, the system component sends a ready signal to the system controller 106. When the system controller 106 determines that all of the components related to the specified operation mode are ready in a step Sc5, the system controller 106 instructs each of the above system components to initiate the image process in a step Sc6.

Figure 15:
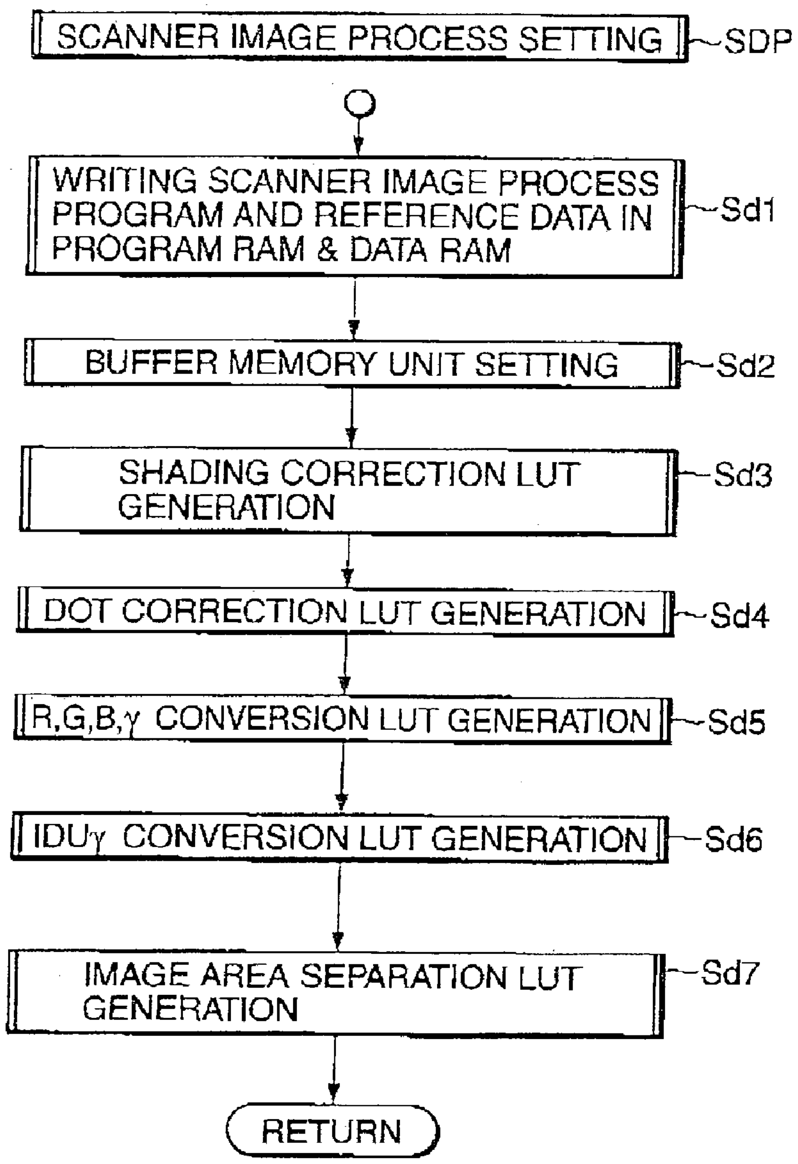
FIG. 15 is a flow chart illustrating steps involved in a preferred process of initializing the SIMD-type processor 33 in the IPU according to the current invention.

Now referring to FIG. 15, a flow chart illustrates steps involved in a preferred process of initializing the SIMD-type processor 33 in the IPU according to the current invention. When the system controller 106 instructs the initialization, the SIMD type processor 33 in the IPU1 receives the transfer addresses for the image processing program and the image data in the hard disk HDD as well as the down load instructions. The DMAC of the external I/F 39 in the SIMD-type processor 33 writes the address specified program in the program RAM 36 and the image process data in the data RAM 37 in a step Sd1. After the above program and data transfer, the SIMD-type processor 33 performs according to the initialization program in the program RAM 33 the following steps. In a step Sd2, the buffer memory device 32 is initialized. In a step Sd3, a LUT is generated for shading correction. In a step Sd4, a LUT is generated for dot correction. In a step Sd5, a LUT is generated for γ conversion for each of the R, C and B color components. In a step Sd6, a LUT is generated for IDU γ conversion. In a step Sd7, various LUT's are generated for area separations. Upon completing the generation of the above LUT's, a ready signal is generated. In details, the buffer memory device 32 in the step Sd2 sets the control functions of twenty memory controllers 0 through 19 as shown in FIG. 5 according to the memory controllers and memory allocations in the initialization program as well as sixteen RAM's 0 through 15 and two RAM's 16, 17 for use allocations. The main use includes an input line buffer for temporarily storing the input image data, an output line buffer for temporarily storing the output image data, an intermediate line buffer for temporarily storing the image data in process, LUT or data delay or delay memory for synchronization. The control function for the memory controller is the RAM access control.

The above settings are implemented by outputting to a corresponding memory controller the management information for the RAM 0 through 17 contained in the setting information and the memory controller setting information for twenty memory controllers as shown in FIG. 5. The global processor 38 of the SIMD-type processor 33 reads the memory controller setting information and the management information from the data RAM 37 and writes the above information in the memory controller setting register and the buffer memory management register in the global processor 38 prior to outputting to the corresponding memory controller.

The initialization information in the memory controller setting information is read from the data RAM 37 by the SIMD-type processor 33 based upon the initialization program and is written to the memory controller setting register and the buffer memory management register. Subsequently, upon initiating the image processing, the memory controller setting information and the RAM management information are updated as the image process progresses. For example, in RAMS as specified by the input line buffer for controlling read/write of data, "write" is contained at the timing for the input image data, but "read" is contained after the write is completed and at the timing for reading a predetermined number of the image data for image processing.

Now referring to FIG. 16A, a diagram illustrates exemplary memory allocation for the memory controller setting information in a memory controller setting register to be used in the current invention. Similarly, FIG. 16C illustrates exemplary memory allocation for buffer memory management to be used in the current invention. The memory controller setting register and the buffer memory management register is a pair, and a plurality of the pairs is written in the data RAM from the hard disk HDD. Each pair corresponds to the data processing mode of the IPU1, and a pair of the global processors 38 corresponding to the data processing mode reads and outputs to the corresponding memory controller each of the memory controller setting information and the linked buffer memory management information. FIG. 16B illustrates one major item of the memory controller setting information in the memory controller setting register. The major item includes a transfer mode, From (data transmission source element ID), To (data reception source ID) and a control mode. Major transfer mode values include the following:

(TM1) Storing image port input data in buffer RAM's 0 through 17;

(TM2) Direct transmitting image port input data to processor elements PE in the SIMD-type processor 33;

(TM3) Transmitting to the processor elements PE from RAM's 0 through 17;

(TM4) Outputting to buffer RAM's 0 through 17 from the processor elements PE;

(TM5) Direct outputting to image port for the processor element PE;

(TM6) Outputting to image port from buffer RAM's 0 through 17;

(TM7) Outputting to the address line of RAM's 0 through 17 setting LUT image port input data;

(TM8) Outputting to RAM's 0 through 17 setting LUT image data in buffer RAM's 0 through 17;

(TM9) Outputting to the processor elements PE reading data in RAM's 0 through 17 setting LUT;

(TM10) Storing in buffer RAM's 0 through 17 reading data in RAM's 0 through 17 setting LUT; and (TM11) Outputting to image port reading data in RAM's 0 through 17 setting LUT.

In the From item, the following information is written: a data output port a transmission source element including image ports, RAM's 0 through 17 and processor elements No. 0 through 17 n−1 of SIMD-type processor 33. In the To item, the following information is written: on data image ports, RAM's 0 through 17 and processor elements No. 0 through n−1 of SIMD-type processor 33.

The control mode has the following major values:

(CM1) Master transfer 1 (direction transfer between image ports 0 through 4 and processor elements PE);

(CM2) Master transfer 2 (writing RAM's 0 through RAM's 17);

(CM3) Master transfer 3 (reading RAM 0 through RAM 17);

(CM4) Line divided block transfer 1 (reading from RAMO'S 0 through 17);

(CM5) Line divided block transfer 2 (writing to RAM'S 0 through 17);

(CM6) Odd/even consolidation; and (CM7) Odd/even separation.

One of eighteen RAM'S 0 through 17 as shown in FIG. 5 is specified as a line buffer for inputting image data, and the memory controller is specified for reading and writing in the above line buffer. To write input image data, the global processor 38 of the SIMD-type processor 33 provides the memory controller 0 with the following setting information and management information read from the RAM'S 36 and 37:

| Setting information | |
|---|---|
| Transfer mode: | the above (TM1) |
| From: | the first input port of the image port 0 |
| To: | RAM 0 |
| Control mode: | the above (CM1) |
| Management Information | |
| Starting Address: | Ex O |
| Ending Address: | Ex 204T |
| Use mode: | buffer memory |

The memory controller O sets the data selector of the memory switch SW1 to be "writing" data from the memory controller O to RAM O based upon the above information. The memory controller O serially arrives at the first input port of the image port 0 in the raster scanning and writes one line or 2048 pixels of 8-bit/pixel image data in RAM O. The specified writing area is from the beginning address to the ending address. After writing in RAM O, when less then one line of but a predetermined number of the image data is read from th-+e RAM O and is outputted to the processor elements No. o–k, the SIMD-type processor 33, the global processor 38 of the SIMD-type processor 33 initially provides the memory controller O with the following setting information:

| The setting information | |
|---|---|
| Transfer mode: | the above (TM 3) |
| From: | RAM O |
| To: | Processor Element No. o |
| Control mode: | the above (CM 4) |
| Management information | |
| Starting address: | (Ex: 0) |
| Ending address: | (Ex: 7) |
| Use mode: | buffer memory |

Figure 8:
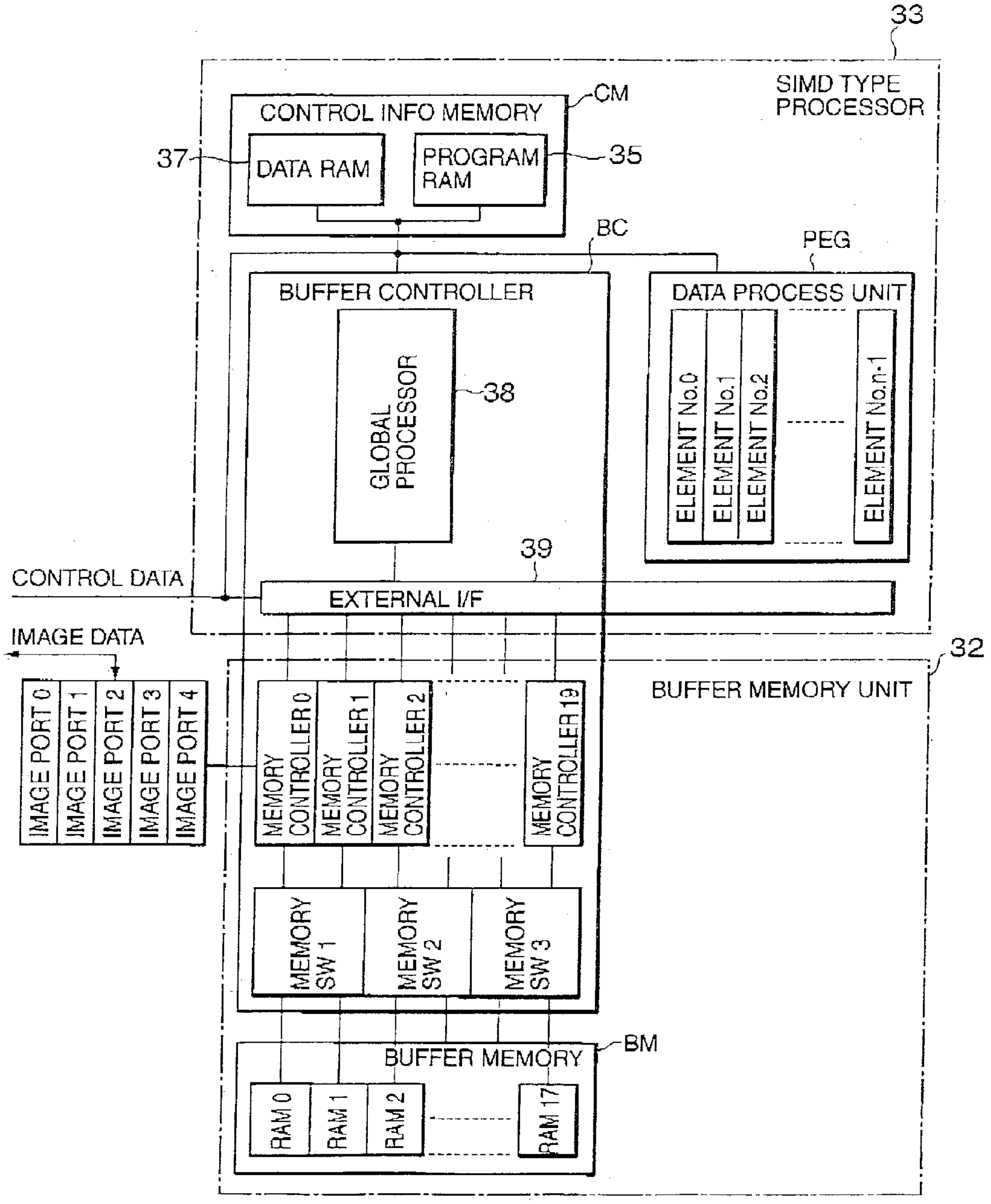
FIG. 8 is a diagram of one preferred embodiment illustrating the data conversion device which combines the SIMD-type processor 33 and the buffer memory 32 of FIG. 5 according to the current invention.

The memory controller O sets the data selector of the memory switch SW1 to be "decoding" data form RAM O to the memory controller O based upon the above information. That is, the image data from the starting address (0) to the ending address (7) is serially read and inputted to the processor element No. o. The reading area is from the beginning address to the ending address. The global processor 38 sequentially provides with the processor element No. o through k a block of predetermined number such as eight of the image data by adding eight to the address and by incrementing the processor element number. The control mode is set to the above (CM3) while the beginning ad ending addresses are respectively set to 0 and 2047 of one line. To is also set to the image port 4. In the above settings, one line of the image data is serially outputted to the image port 4 in a raster scanning fashion. By combining the above block transfer to the SIMD-type processor 33 via the memory controller o and another block transfer using another RAM and memory controller, image data is inputted to the SIMD-type processor 33 in an image data group in a plurality of pixel matrixes in a main and sub scanning directions. In the above manner, for example each RAM 0 through 17 is assigned to a memory controller, and each block of the image data for each line is transferred to all of the processor elements No. o through k fro each of the memory controllers. In another manner, each memory controller o through k is assigned to each processor element o through k, and each block of the image data group is sequentially read and transferred to each processor element o through k from a plurality of the RAMs at each memory controller. That is, there are three manners for the data transfer between the buffer memory and the data processor device PEG. The three manners include the above first manner in which each memory RAM o through 17 is assigned to each memory controller, the above second manner in which each processor element PE is assigned to each memory controller and a combination of the first manner and the second manner. For example, when a 3xe pixel matrix of the image data is inputted to the processor element No. o through k of the SIMD-type processor 33, after the image data from each line of the lines 1 through 3 is written to the RAM's 0 through 2, the block transfer is set with the beginning address 0, the ending address 2 and to processor element No. o in the order of the memory controller 0(RAM O), the memory controller 1(RAM 1) and the memory controller 2(RAM 2). The three pixel image data from the RAM 0 through 2 is read and written to the processor element No. o. That is, one set of 3×3 image data that has one current pixel in the center is written. When the image data in a next 3×3 pixel matrix is similarly read and written, the block transfer is set with the beginning address 1, and the ending address 3 and the processor element No. 1 in order of the memory controller 0 (RAM 2), the memory controller 1(RAM 1) and the memory controller 2(RAM 2), each three pixel image data is read from the RAMs 0 through 2 and is written to the processor element No. 1. The beginning address is incremented by one, and the To value is sequentially charged to a next processor No. Each pixel in one line is sequentially designated a current pixel, and a 3×3 pixel matrix of the image group is made with the current pixel in the caster of the matrix. The 3×3 matrix image group is than sequentially outputted to the SIMD-type processor 33. Based upon LUT data computational program in the RAM's 36 and 37 of the SIMD-type processor, the data processing device PEG computes LUT data for γ converting 8-bit 256-gradation image data. The RAMs 36–37 are control information memory CM as shown in FIG. 8. As shown in FIG. 5, when LUT is generated and written in one of eighteen RAMs 0 through 17 such as RAM 6 at an address A through A+255, the global processor 38 provides the memory controller 6 with the following setting information and management information that are read from the RAM 36 or 37 of the SIMD-type processor 33. The RAM 36 or 37 is control information memory as shown in FIG. 8.

| | |
|---|---|
| The Setting Information: | |
| Transfer mode: | The above (TM 4) |
| From: | Data processing |
| To: | RAM 6 processing device PEG (PE Group) |
| Control: | The above (CM 1) |
| The Management Information: | |
| The Beginning Address: | A |
| The Ending Address: | A+255 |
| Use Mode: | LUT (write) |

The memory controller 6 sets "data write" in the data selector of the memory switch SW2 for writing from the memory controller 6 to RAM 6. The memory controller 6 writes each LUT data from each PE of the data processing device PE from the beginning address A to the ending Address A+255 in the RAM 6. When the even-numbered pixel image data and the odd-numbered image data are concurrently γ-converted; the following information is set:

| | |
|---|---|
| Setting information | |
| Transfer Mode: | the above (TM10) |
| From: | RAM 6 |
| To: | RAM 7 |
| Control Mode: | the above (CM3) |
| Management Information | |
| Beginning Address: | A |
| Ending Address: | A+255 |
| USE Mode: | LUT (write) |

The LUT in the RAM 6 is transferred or copied to the RAM 3. For example, while the Ram 6 is set for the γ conversion of the odd-numbered pixel image data, the RAM 7 is set for the γ-conversion of the even-numbered pixel image data.

When the LUT in the RAM 6 is used for the gamma conversion of the image data, the memory controller 4 is set with the following exemplary information:

| | |
|---|---|
| Setting information | |
| Transfer Mode: | the above (TM7) |
| From: | Image Port 2 |
| To: | RAM 6 |
| Control Mode: | the above (CM3) |
| Management Information | |
| Beginning Address: | A |
| Ending Address: | A+255 |
| USE Mode: | LUT (read) |

With the above settings, the image data arrived in the image port 2 is converted at the beginning address A and the ending address A+255 in the RAM 6 and is given to the address bus of the RAM 6. The data read from the RAM 6 is the γ-conversion data. The image data arrived in the image port is temporarily stored in a RAM such as the RAM 4 and is optionally converted to address data for accessing the RAM 6. In this case, the memory controller 4 is used for writing the image in the RAM 4 while the memory controller 6 is used for transferring image data read from the RAM 6. The transfer of the γ-converted data from the Ram 2 has the transfer mode (TM9), (TM10) or (TM11). For example the memory controller 6 is used, and the γ-converted image data is transferred to the data processing device PEG, another RAM such as the RAM 8 or the image port 2. When the odd-numbered pixel image data and the odd-numbered pixel image data are concurrently γ-converted, the LUT of the RAM 6 is used for the γ-conversion of the odd-numbered pixel image data. Similarly, the LUT in the RAM 7, the memory controller 5, RAM 5, the memory controller 7 and the RAM 9 is used.

The SIMD-type processor 33 additionally uses the above setting information and the management information for the data consolidation and separation as shown in FIG. 9, and the RAMs 0 through 17 are used for the LUT. One area of each RAM is used as a one-line buffer for inputting and outputting the image data while another area of the RAMs is used for LUT. However, the use or access to the line buffer and the LUT is time-divided or accessed at a different time.

When the date consolidation as shown in FIGS. 9A, 9C or 9D is performed, from in the above setting information is used twice. The control mode is the above (CM6) for the odd number/even number consolidation. In this case, the above memory controller with the specified process determines an odd-numbered timing and an even-numbered timing based upon the pixel synchronization pulse and ½ frequency pulse. The above memory controller outputs the image data from one of the two "From" specified addresses at the odd-number pixel timing to the "To" address. On the other hand, the memory controller outputs the image data from the other specified address at the even-numbered pixel timing to the "To" address.

When the data separation as shown in FIG. 9E is performed, to in the above setting information is two places, and the above control mode is the odd/even consolidation of the above (CM7). In this case, the memory controller specifying this process determines the odd-number timing and the even-number timing based upon the pixel synchronization pulse and the ½ frequency pulse. At the odd-number pixel timing the image data from the From is outputted to one of the two addresses in To while the other image data is outputted to the other address at the even-numbered pixel timing. In the above example, the area and function specifications of each memory RAM 0 through 17 in the buffer memory BM includes the beginning address, the end address and the use mode (data buffer/LUT) for each area as shown in FIG. 16D. That is, the memory management information data in the control information data includes the beginning address, the end address and the use mode.

Another example is that the memory management information in the control information data is characteristic information to determine whether a functional area is an original buffer area or another functional area. The above functional area is the LUT area defined by a beginning address and an ending address. For example, if all of the memory RAMs 0 through 17 are used as a data buffer, the beginning and ending addresses for the use are contained in the memory management information. However, the characteristic column is left blank in the initialization stage. On the other hand, if a partial or whole area of the memory RAMs 0 through 17 is used as LUT or non-data-buffer, the beginning and ending address as well as characteristic information indicative of functional switch are contained in the management information. When a data buffer area, a LUT area or another data buffer area are sequentially defined in the above sequence, the data buffer area management information includes the first and second addresses with blank characteristic information while the second LUT area and the third original data buffer area both include the beginning address, the ending address and the characteristic information indicative of a functional change. The memory area function is initially assumed to be a data buffer. The areas until the characteristic information are automatically designated as a data buffer. When the characteristic information indicative of a functional switch appears, the corresponding area is designated as a LUT or non-data-buffer function, and its characteristic information is reset to designate a data buffer.

Now referring to FIGS. 17A through 17F, diagrams illustrate the use of the RAMs 0 through 17 in the current invention. FIG. 17A illustrates a data read write area in one of the RAMs 0 through 17 when the one RAM is used as a line buffer for one line of image data for a short side of the A3 size output image. The line buffer memory functions as an input buffer an intermediate buffer or an output buffer. FIG. 17B illustrates two-line buffer for one line of image data for a short side of the A4 size output. FIG. 17C illustrates a one-line buffer for the A3 size output and a LUT. FIG. 17D illustrates a single LUT while FIG. 17E illustrates seven LUTs. For example, each of the seven LUTs is for a single color component, and depending upon the area separation result and based upon the operation board or instructions from a personal computer, one of the LUT is selected in real time. FIG. 17F illustrates LUTs read from the HDD or the LUTs generated by the SIMD-type processors 33 in a part of the RAMs 0 through 17 that is used as a temporary storage. For example, the SIMD-type processor 33 generates and store three LUT 10, LUT11, and LUT12 for they conversion of the RGB image data. At the time of the RGB γ-conversion, the LUT10 for the R image data is copied into two RAMs from 1 through 17, and the odd-numbered pixel R image data and the even-numbered pixel R image data are concurrently γ-converted using the two LUTs. Similarly, the G image data and the B image data are processed in the described manner. FIG. 15 shows the generation of dot LUT (Sd4), each γ-conversion LUT for R, G and B (Sd5), an IDU γ conversion LUT (Sd6) and an area separation LUT (Sd7). FIG. 14 shows that the SIMD-type processor 33 is activated and updates the corresponding LUT for the specified data in the instruction from the system controller 106 when the operation board OPD or the personal computer PC commands the LUT change or adjustment for the system control SCL.

Figure 18:
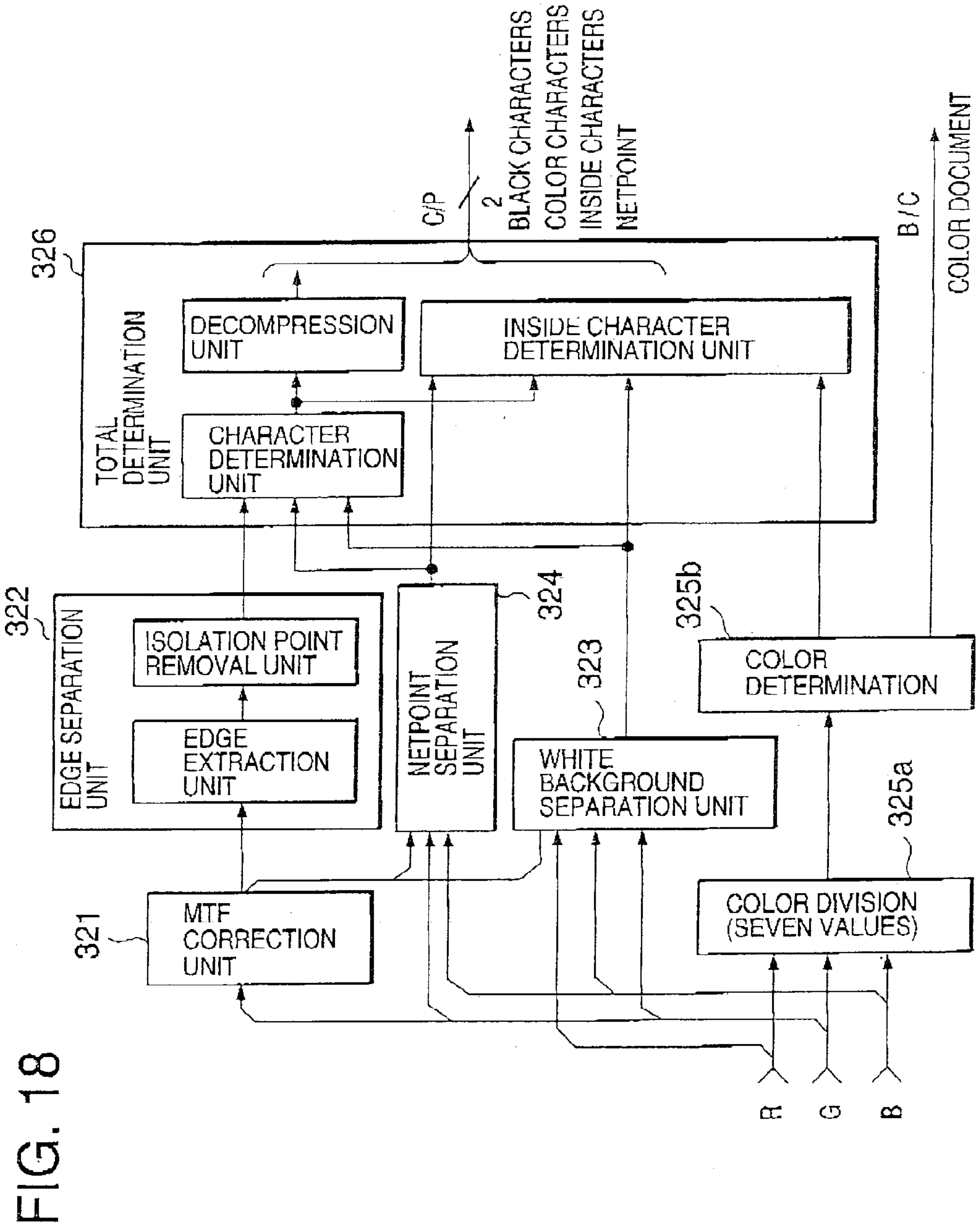
FIG. 18 is a diagram illustrating an image area separation that is implemented by the global processor 38 using the processor element PE and the buffer memory device 32 based upon a scanning process program in the program RAM 36 in the SIMD-type processor 33 of the IPU1.

Referring to FIG. 18, a diagram illustrates an image area separation that is implemented by the global processor 38 using the processor element PE and the buffer memory device 32 based upon a scanning process program in the program RAM 36 in the SIMD-type processor 33 of the IPU1. The above image area separation determines whether the image data is a character area or a picture area based upon the RGB image data. The character area includes characters and the lines while the picture area includes pictures and photographics. Based upon the above determination, a C/P signal is generated for indicating character edge areas, character inside areas and picture areas. Similarly, a B/C signal is generated for indicating chromatic areas or achromatic areas. The "inside character" means an area inside the width of character edge lines. In this preferred embodiment, a 3-bit combination signal of the C/P signal and the B/C signal is the image data Fd.

- C/P signal: two-bit signal, "11" or three indicates a character edge. "01" or one indicates an inside character area while "00" or zero indicates a picture area.
- B/C signal: One-bit signal, H or "1" indicates achromaticity while L or "0" indicates chromaticity.

The area separation generally includes the MTF correction unit 321, the edge separation unit 322, the white background separation unit 323, the net point unit 324, a color division unit 325*a*, a color determination unit 325*b* and a total determination unit 326. The image reading density is 600 dpi by the reading unit 21 of the scanner SCR. The MTF correction unit 321 corrects the G image data from the scanning unit 21 for primarily extracting character edges. Since the data scanned by the scanning unit 21 has some blurring due to the lenses, the edge emphasis filter is used. In this preferred embodiment, the data RAM 37 includes a coefficient group of matrix of weight coefficients a1 through a7, b1 though b7, c1 through c7, d1 through d7 and e1 through e7 for each pixel in a pixel matrix in 7 scanning x direction and 5 sub-scanning y direction. The current pixel coefficient is c4 in a third line of coefficients c1 through c7 in the coefficient matrix. The total sum of products (7×5=35) between each coefficient in the matrix and the image data is the processed image data from the MTF correction unit 321. The processed image data is transmitted to the edge separation unit 322, the white background separation unit 323 and the net point separation unit 324. The current pixel is the currently processed pixel and is sequentially changed to ones in the X direction and the Y direction.

The Edge Separation Unit 322: The character areas have many high intensity pixels and low intensity pixels that are respectively called black and white pixels. The edge portions have continuous black and white pixels. The edge separation unit 322 detects character edges based upon the continuous black and white pixels. Initially, the image data from the MTF correction unit is divided into three groups of values based upon a first threshold value TH1 and a second threshold value TH2. The first and second threshold values TH1 and TH2 are respectively TH1=20 and TH2=80 for the image data ranging from 0 to 255, 0 being white. In the above three-value range, if the input data is less then TH1, the corresponding pixel is considered white to be. If the input data is equal or less than TH2, the corresponding pixel is considered to be middle. If the input data is equal or larger than TH2, the corresponding pixel is considered to be black. The input data is thus considered to be three-value data.

Figure 21A:
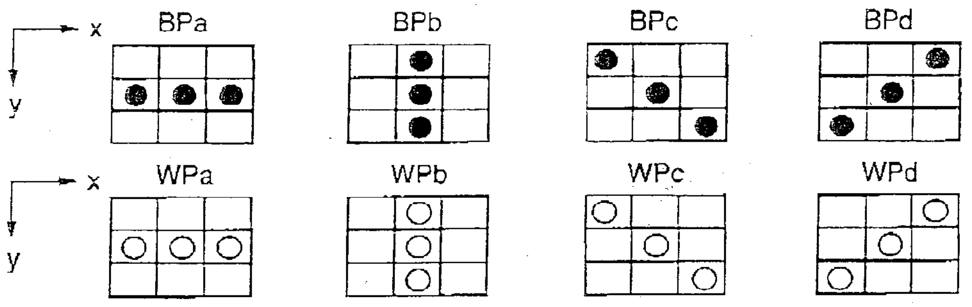
FIG. 21A illustrates 3×3 pixel matrixes of exemplary reference patterns BPa through BPd.
Figure 21B:
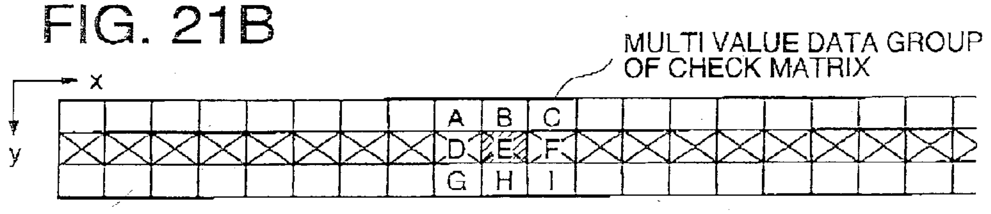
FIG. 21B illustrates how the G-image data 3×3 pixel matrix groups A through I including the current pixel are compared to one of the black or white continuous pixel detection reference pattern groups.
Figure 21C:
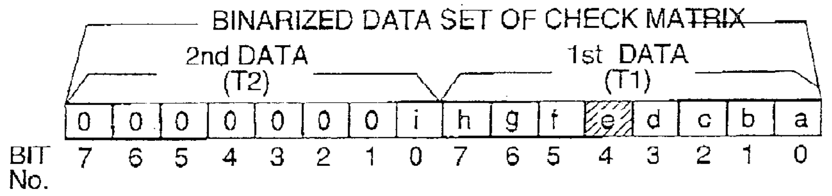
FIG. 21C illustrates exemplary two-byte data including a pixel information data group a through i having one reference pattern such as BPa.
Figure 21D:
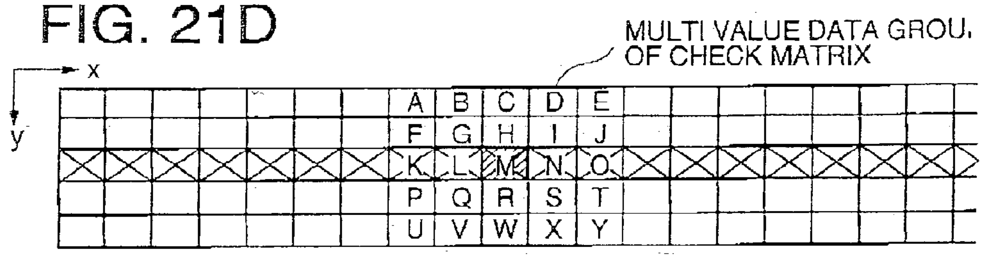
FIG. 21D illustrates how the image data 5×5 pixel matrix groups A through Y including the current pixel are compared to one of the black or white continuous pixel detection reference pattern groups.
Figure 21E:
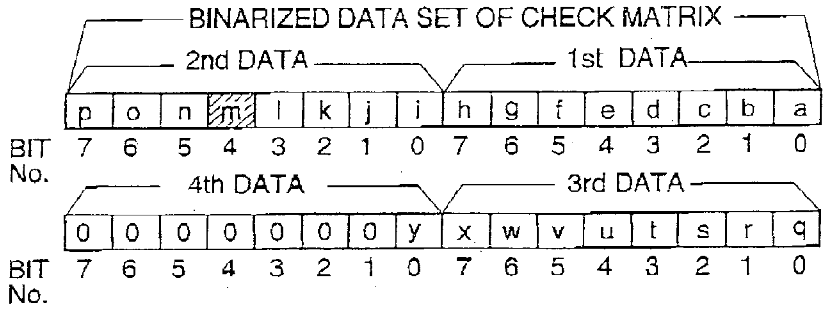
FIG. 21E illustrates exemplary four-byte data including a pixel information data group a through y having one reference pattern such as BPa.

Furthermore, the continuous black and white pixels sections are detected in the G image data based upon a predetermined pattern matching. For extracting continuous black pixel detection, exemplary reference patterns are 3×3 pixel matrixes BPa through BPd as shown in FIG. 21A. Either one of the reference patterns has three black pixels having a value of one in the x, y or diagonal direction. Other patterns that satisfy the above conditions are also reference patterns for extracting continuous black pixels. These reference patterns are called as a continuous black pixel detection reference pattern group. For detecting white continuous pixel patterns, exemplary patterns are 3×3 pixel matrixes WPa through WPd as shown in FIG. 21A. Either one of the continuous white pixel patterns includes the current pixel and three pixels having a value of "0" in an x, y or diagonal directions. Other patterns that satisfy the above condition are also used as reference patterns for detecting white continuous pixel patterns. These reference patterns are called as a white pixel detection reference pattern group. In FIG. 21A, the reference pattern or the black dots indicate a pixel having a value of "1" while the white dots indicate a pixel having a value of "0." The current pixel is a centrally located pixel in the 3×3 pixel matrix. In determining continuous black and white pixel pattern matching by switching reference patterns, if the G-image data 3×3 pixel matrix group A through I in FIG. 21B including the current pixel matches one of the black or white continuous pixel detection reference pattern groups, the matched reference pattern No data is given. To do pattern matching, the data RAM 37 contains the reference data for the above black and white continuous pixel reference pattern groups. One reference pattern data has two-byte data that is serially arranged reference pattern information. For example, the two-byte data as shown in FIG. 21C includes a pixel information data group a through i having one reference pattern such as BPa. In this example, the example includes a=8, c, d=3 and e=2.

Figure 19:
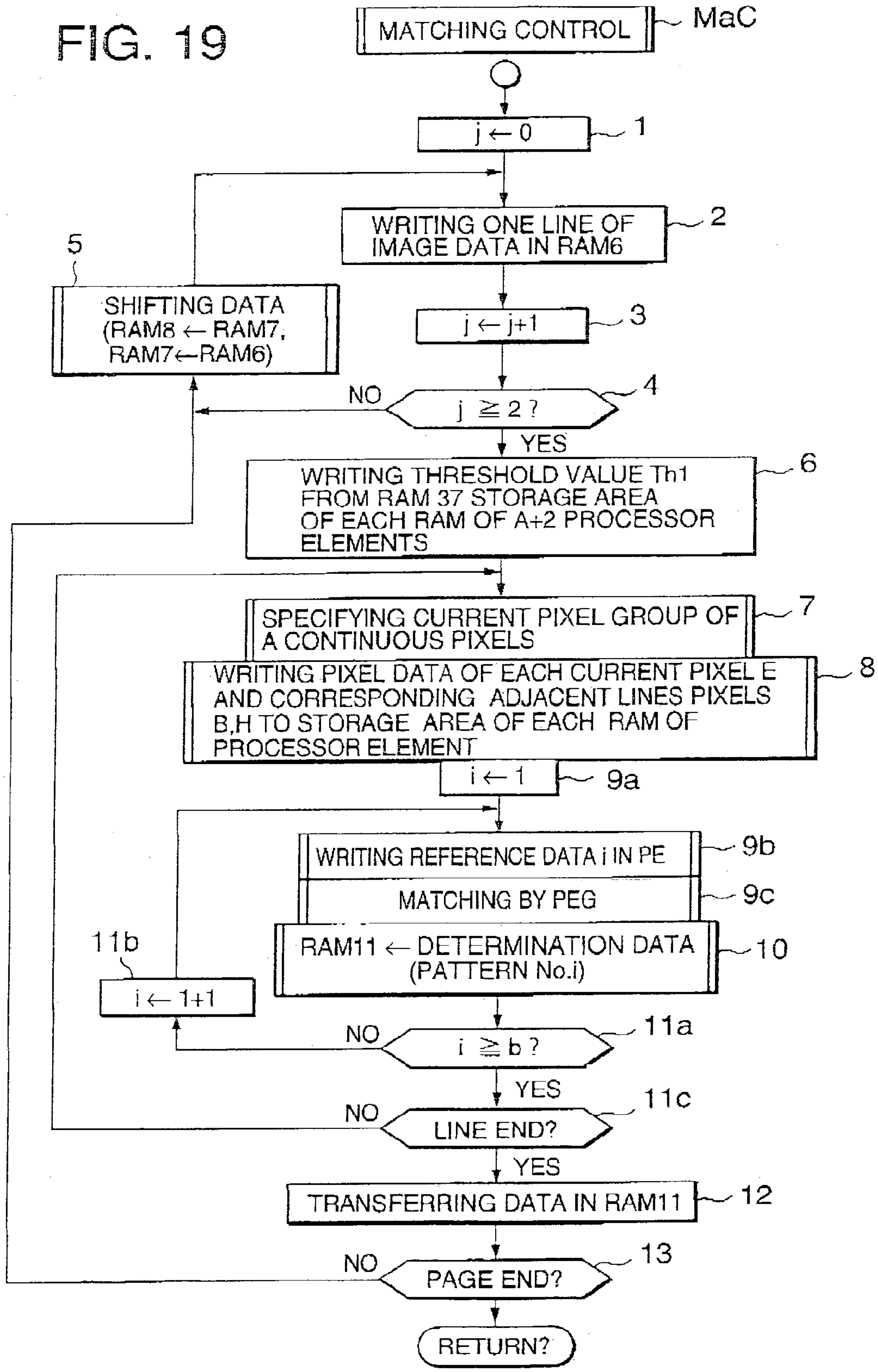
FIG. 19 is a flow chart illustrating the steps in a preferred process of finding a match control MaC between the current pixel matrix and the reference matrix by the global processor 38 in the SIMD-type processor 33 according to the current invention.

FIG. 19 is a flow chart involving the steps in a preferred process of finding a match control process MaC between the current pixel matrix and the reference matrix by the global processor 38 in the SIMD-type processor 33 according to the current invention. For example, for a 3×3 pattern matching of FIG. 21A, the SIMD-type processor 33 sets the RAMS 6 through 8 of the buffer memory device 32 as an input line buffer for 3-line G image data. Similarly, the SIMD-type processor 33 also sets the RAM 11 as a determination result storage buffer for storing the result of determining whether the pixel of the 3×3 matrix containing the middle line matches the reference pattern 0 indicates no match while 1 through 6 indicates a corresponding matched reference pattern. The global processor 38 of the SIMD-type processor 33 in the preferred embodiment starts the area separation upon completing the shading correction of the line of the image data. When the pattern matching of the 3×3 matrix of FIG. 21A is performed, the G image data prior to the pattern matching is written to RAM 6 via the memory controller 6. As each line of the image data is written, the pattern matching is performed on the G image data in the RAM 7. Thus, the pattern matching is performed while other processes are performed between the lines.

Now referring to FIG. 19, a flow chart illustrates the steps involved in a preferred process of the pattern matching of one page of the image data according to the current invention. In a step 3, one line of the image data is written to the RAM 6, and the image data is the G image data that has been processed before the pattern matching in the RAM 6. As one line of the image data is written, the global processor 38 proceeds from the step 3 to a step 4. In the process of writing one line of the data, the global processor 38 remains in the step 3 of matching control MaC, and the global processor 38 performs other processes on the image data beyond the matching process. As the global processor 38 of the SIMD-type processor 33 proceeds to the matching control MaC, the matching process program in the data RAM 37 is initially written in the process program storage area in each RAM of FIG. 7B in the A+2 processor elements. The global processor 38 in a step 1 initializes the data to zero in the register j in a line register and writes the first line of the G image data in the RAM 6 using the memory controller 6. Upon writing one line of the data, the global processor 38 increments by one in the data in the register j in a step 2. As there is not yet data in the RAM 7 or the current pixel memory in a step 4, the data in the RAM 7 is written in the RAM 8 using the memory controller 8. Subsequently, the global processor 38 writes the data from the RAM 6 in the RAM 7 using the memory controller 7. That is, the data is shifted among the three line buffer in a step 5. The global processor 38 writes the next line of the G image data in the RAM 6 in a step 2.

In the data shift in a step 5, one line of the data from the RAM 6 is written to the RAM 7 by the memory controller 7. In writing the above data, a high intensity peak value Dhp is detected in the one line of the image data. Upon completing the writing in the RAM 7, the memory controller 7 compares the detected value Dhp to predetermined intensity values Dth 1 and Dth 2. The information is kept to indicate a low intensity that the detected peak value Dhp is equal to or below the threshold value Dth 1, a standard intensity that the detected peak value Dhp is above the threshold value Dth 1 but below the threshold value Dth 2 or a high intensity that the detected peak value Dhp is equal to or above the threshold value Dth 2. In the data shift in the step 5, the memory controller 7 determines the peak detected value and updates the stored information in order to write one line of data in the RAM 7 from the RAM 6. The global processor 38 respectively writes a first line of the G image data in the RAM 7 and a second line of the G image data in the RAM 6. The global processor 38 instructs the memory controller 7 to transfer the above determination information. If the determination information indicates the low intensity, a low threshold value Th 11 is read from a threshold group Th 1 including threshold values Th 11, Th 12 and Th 13 and is written to a threshold storage area in the RAM of each processor element in order to binarize the image data in the data RAM 37 in a step 6. If the determination information indicates the standard intensity, the threshold value Th 12 is read from the threshold group Th 1 and is written in the threshold storage area in the RAM of each processor element. Lasty, if the determination information indicates the high intensity, the threshold value Th 13 is read from the threshold group Th 1 and is written in the threshold storage area in the RAM of each processor. The threshold values Th 11, Th 12 and Th 13 have the following relationship: Th 11<Th 12<Th 13. These threshold values have multiple value data with the bit width of 12-bit, 10-bit, 8-bit and 6-bit. The value of the threshold values Th 11, Th 12, and Th 13 is that the middle value Th 12 is approximately ½ of the maximal value of the multi values for pattern matching. The threshold values Th 11, Th 12 and Th 13 in the threshold value storage area in the RAM of each processor element are grouped by Th 1 in FIGS. 19 and 20.

Figure 20:
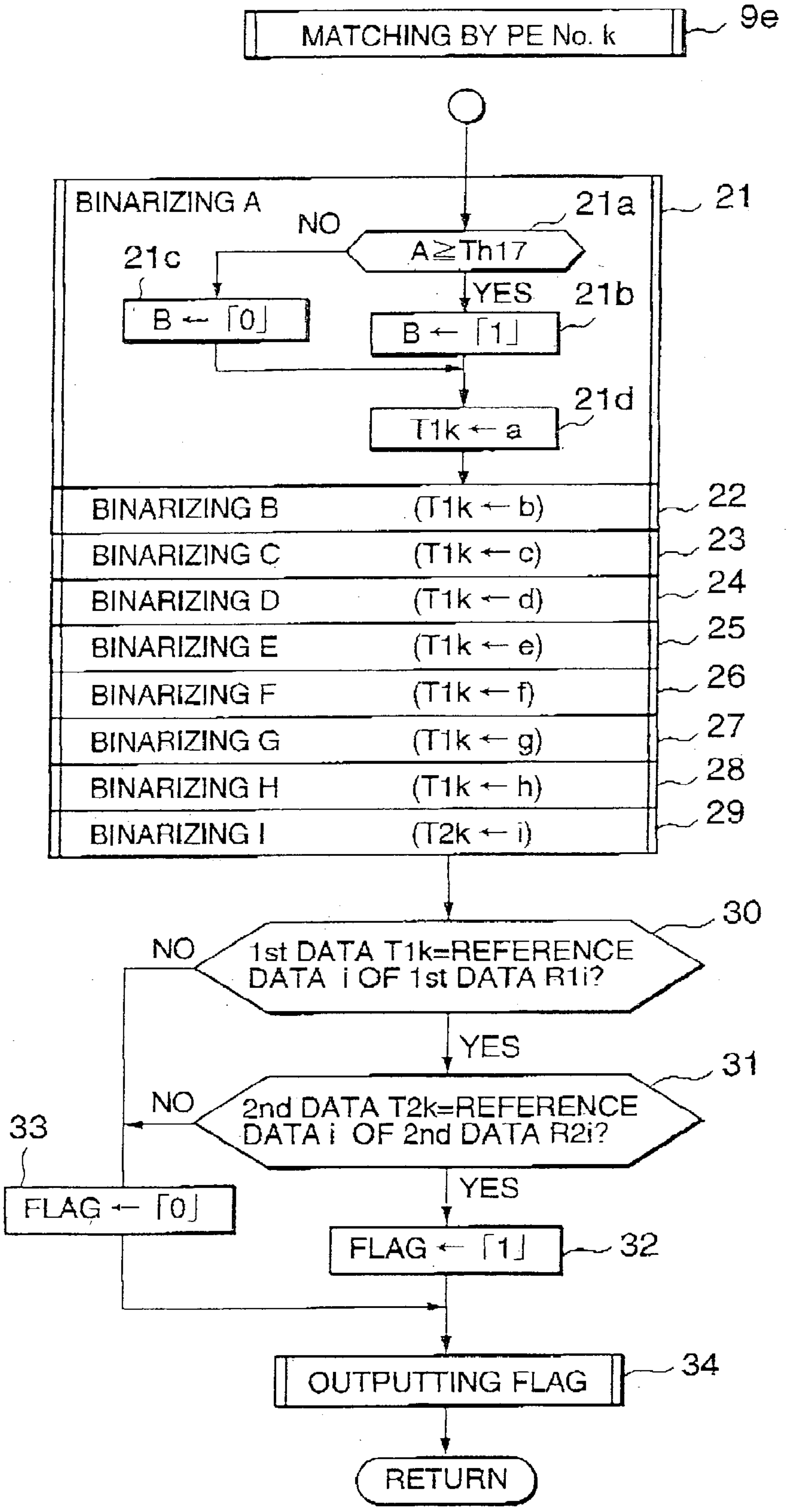
FIG. 20 illustrates the A units of the processor elements PE 1 through A each performing the matching process as the pattern comparison according to the matching process program in each of the RAM.

The processor 38 sets the 1 through A pixel address of the RAM 7 as the current pixel address in a step 7 and reads the image data in the 3×3 (c×d) matrix having the current pixel in the center from the RAMs 7 and 8. The global processor 38 writes the image data in the RAM of the processor element PE No. 1 through (A+1) of the SIMD-type processor 33 in a step 8. That is, the image data of 1 through A+1 pixels of the first line such as al, A (=a2), B (=a3), c (=a4), a5 in FIG. 24 is respectively written in the image data written areas RAM-A0 of each RAM in the processor element PE No. 1 through (A+1). Similarly, the image data of the pixels 1 through (A+1) of the second line such as b1, A (=b2), B (=b3), C (=b4), b5 in FIG. 24B is respectively written to the data writing area RAM-A0 of each RAM of the processor element PE No. 1 through (A+1). Lastly, the image data of the pixels 1 through (A+1) of the third line such as C1, A (=c2), B (=c3), C (=c4), c5 in FIG. 24C is respectively written to the data writing area RAM-A0 of each RAM in the processor element PE No. 1 through (A+1). The first line of the image data is read from the RAM 8 using the memory controller 8 and is written in the A+1 PE No. 1 through (A+1). The second line of the image data is read from the RAM 7 using the memory controller 7 and is written in the A+1PE No. 1 through (A+1). Furthermore, the third lien of the image data is read from the RAM 6 using the memory controller 6 and is written in the A+1 PE No. 1 through (A+1). For the matrix pixel positions without the corresponding addresses in the RAMS 6 through 8, the image data indicative of the intensity level 0 is given. Even if the image address is available, when the G image data is not yet written, the image data indicative of the intensity level 0 is written. When a next block of the image data on the same line is given for the 1 through (A+1) pixels in the line head in the first block, the image data of a second block in the A through (2A+2) pixels is written in processor elements PE No. 0 through A+1. In the block image data transfer for the second block on the one line, the next A+1 image data (total of A+2) is transferred as one block to the PEG, and the image data in the block is respectively written to PE No. 0 through (A+1). The above one block starts at the end of the last block that yielded the determination result. But the processor element PE for outputting the determination result for the current pixel by pattern matching includes A units of the processor elements ranging from PE No. 1 through A. Subsequently, the global processor 38 initializes the reference data specifying information I to "1" in a step 9*a* and reads the reference data No. i from the data RAM 37. When i=1, the first data is R 11 while the second data is R 21. The global processor 38 then writes in a step 9*b* in the reference data writing area RAM-A6 and RAM-A7 of the RAM 1 through A as shown in FIG. 24. The global processor 38 in a step 9*c* instructs the processor elements 1 through A to perform "matching." In response to this instruction, the A units of the processor elements PE 1 through A each performs the matching process as the pattern comparison as shown in FIG. 20 according to the matching process program in each of the RAM. It is determined whether or not the image pattern in the matrix image data group matches the reference pattern No. 1. If it matches, the result indicates "1" in a flag register. If it does not match, the result indicates "0" in the flag register. The flag register is shown as F in FIG. 23 while it is a "flag" in FIG. 22. The matching in FIG. 20 will be later described.

Referring back to FIG. 19, the global processor 38 reads the above determination results from A units of the processor elements PE No. 1 through (A+1). If a particular processor element result is "1", i is written in a step 10 at an address for the current pixel position of the corresponding processor element. Then in a step 11*a*, it is determined whether the above steps 9*c* and 10 have been completed for all of the reference data 1 through 6. If it is determined in the step 11*a* that the steps 9*c* and 10 have not been completed, next reference data is specified in a step 11*b*, and the matching steps 9*c* and 10 are performed. As described above, the matrix image data group is transferred from the RAMs 6 through 8 to the A+2 units of the processor elements PE No. 0 through (A+1), and the determination data from each of the processor elements PE No. 1 through A is written in the RAM 11 by sequentially changing the address read from the RAMs 6 through 8. The steps 7 through 11 are repeated until the line end. When the above matching control is completed for every pixel as the current pixel in one line, the global processor 38 in a step 12 transfers the determination data in the RAM 11 to one buffer memory RAMs 0 through 5 or RAMs 12 through 15 for the next step. Alternatively, the next step to use the determination data is initiated. In this case, after the next process is completed for one line of the data, the preferred process proceeds to a step 13. The global processor 38 performs the data shift step 5 for one line and the writing of one-line G image data in the RAM 6 until the page end. The process after that has been already described. Upon the page end, the global processor 38 completes the matching control MaC.

Referring to FIG. 20, each processor element PE No. k such as PE No. 3 as shown in FIG. 24 binarzes the 3×3 image matrix image data groups A through I with the current pixel as the center of the matrix as shown in E=b3 of FIG. 24 in the image data writing area RAM-A1 in the RAM based upon the threshold value in the threshold writing area RAM-A3 in response to the matching command from the global processor 38. As a result of the binarization, the pixel information data groups a through i are generated, and eight binarized data a through h is used as a first byte (T1=T1*k*). The remaining binarized data i is used as one bit in a second byte (T2=T2K) while other seven bits are used as image components "0." The two-byte data (T1*k*, T2*k*) are generated in steps 21 through 29. The above two-byte data 7(T1*k*, T2*k*) are compared to match the two bytes R1*i* and R2*i* of the reference data i of FIG. 24 as stored by the global processor 38 in the reference data storage areas RAM-A6 and RAM-A7. In the above determination, in a step 30, the first byte of the data and the reference data (T1*k*, R1*i*) are matched. If they are matched, the second bytes (T2*k*, R2*i*) are matched in a step 31. If both bytes are matched, in a step 32, the flag register flag is marked as "1" to indicate that the matrix is matched with the reference pattern No. i. When either the first byte or the second byte is not matched, the processor element PE No. k writes "0" in the flag register flag in a step 33. The global processor 38 reads the flag register data in the step 10 as shown in FIG. 19. In the above described pattern matching, one processor element obtains the determination result as the global processor 38 determines whether one of the reference patterns No. i (1 through 6) as shown in the step 9 b of FIG. 19 for each two-byte data in the binarized data group in the c×d (3×3=9 pixel) matrixes. Since the above determination is based upon the byte data comparison (T1*k* vs R1*i*, T2*k* vs R2*i*), the determination speed is fast. Furthermore, since A units of the processor elements determine the above matching and A matrixes of pattern matching are also concurrently completed, the pattern matching determination is at a high-speed.

Now referring to FIGS. 22, 23 and 24, the data positions and processes in the RAM of the processor element PE will be described with respect to the above described matching.

Figure 22:
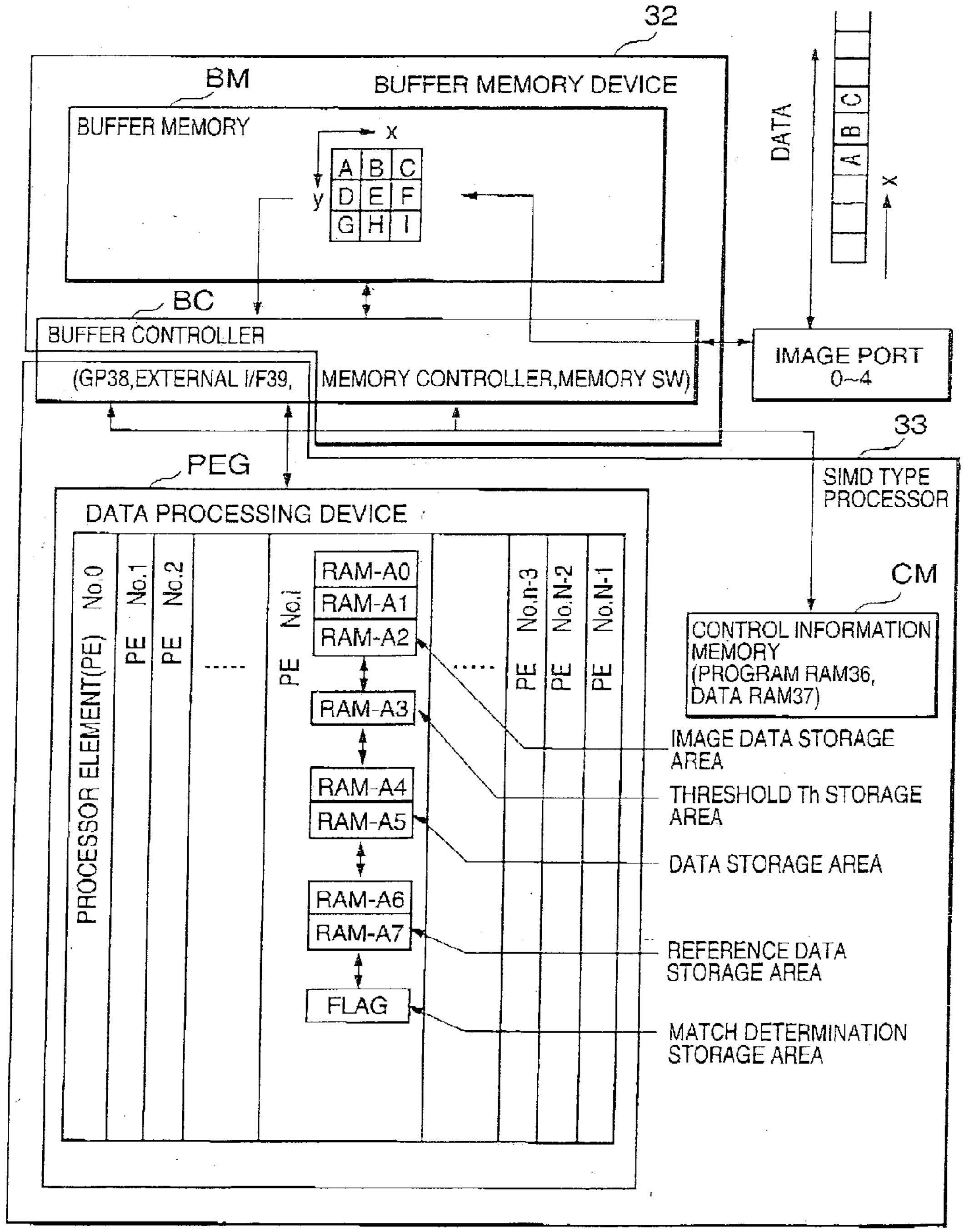
FIG. 22 primarily illustrates the data flow in the image processing unit IPU 1.
Figure 23:
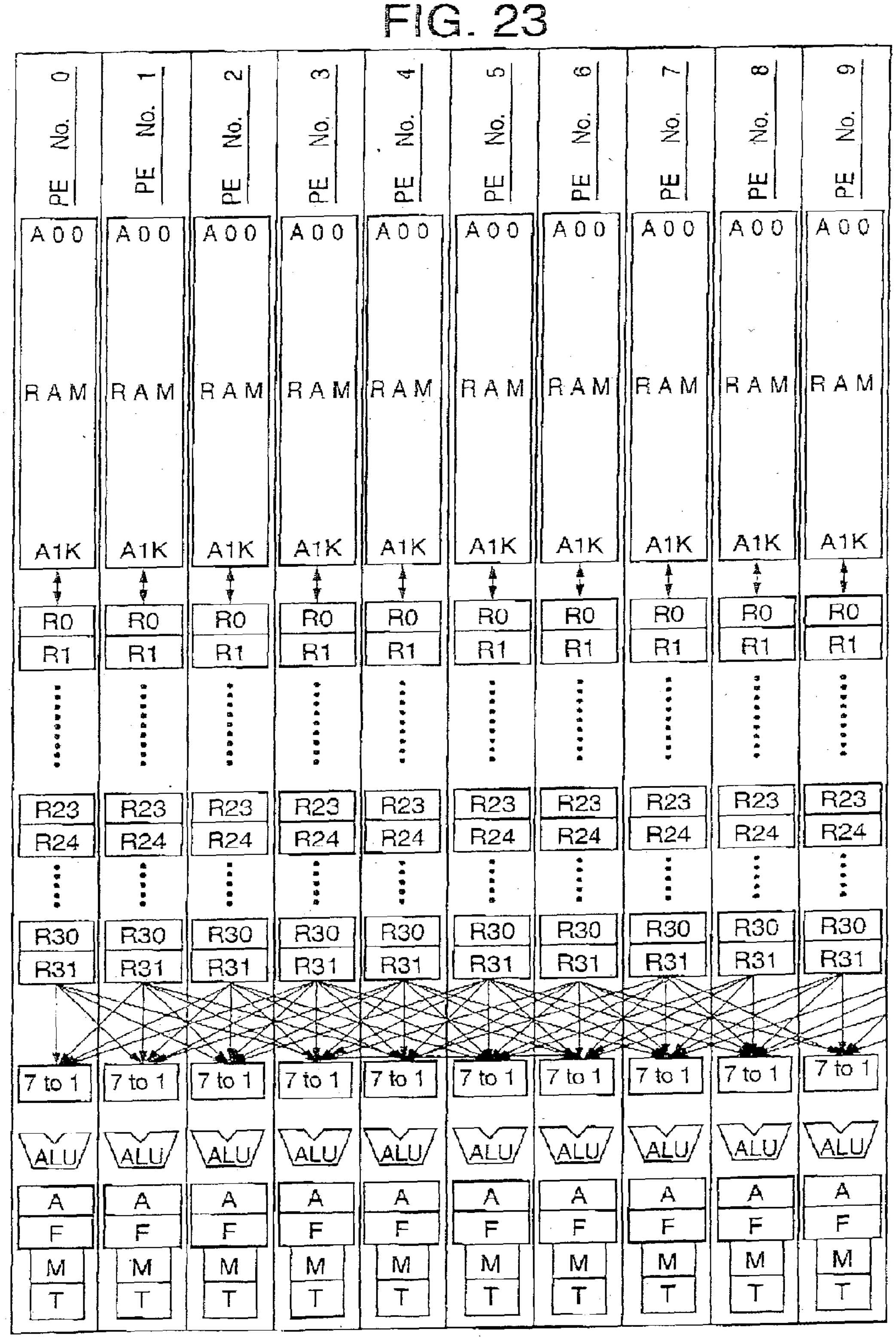
FIG. 23 illustrates data routes between the processor elements PE in the data processing device PEG.

FIG. 22 primarily illustrates the data flow in the image processing unit IPU 1. FIG. 23 illustrates data routes between the processor elements PE in the data processing device PEG. FIG. 24 illustrates the image data distribution in the image data storage areas RAM-A0 through A2 in the RAMs of the processor element PE to be used for pattern matching of the 3×3 pixel matrixes. RAM-A0, RAM-A1 and RAM-A2 are the storage areas for storing the image data group and are also the areas in the RAM in the processor element for storing a 2-dimensional matrix image data group having multiple gradations in the buffer memory unit BM. FIG. 24 illustrates the processor elements PE which store the initial block of the image data in the first line a1, a2 (A), a3 (B), a4 (c), a5; the initial block of the image data in the second line b1, b3 (D), b3 (E), b4 (F), b5 and the initial block of the image data in the third line c1, c2 (G), c3 (H), c4 (I), c5. RAM-A3 is a storage area for a threshold value Th1 for binarization while RAM-A4 and RAM-A5 are each a storage area for two-byte formatted data (T10, T20) through (T1A, T2A) that is binarized from the 3×3 pixel matrix of the image data group based upon the threshold value Th1. The above data (T1A, T2A) is generalized to (T1*k*, T2*k*) where k indicates a processor element PE No. RAM-A 6 and RAM-A 7 are each a storage area for the reference pattern data i or (R1*i*, R2*i*). When the pattern i to be referred is 1 through 6, the reference data patterns 1 through 6 are sequentially written in the RAM -A6 and RAM-A7. The above threshold value Th1 is selected from a threshold value group containing threshold values Th11, Th12 and Th13 for the bit width of the image data. Depending upon the intensity peak of the one line of the image data, an appropriate threshold value is selected. For example, if the intensity peak value is low, the threshold value Th11 is selected. Similarly, if the intensity peak value is middle or high, threshold value Th12 and Th13 are respectively selected. The matching process program in the program RAM 36 selects the above threshold value. Alternatively, the above threshold value group containing the values Th11, Th12 and Th13 is included in the matching program. In the preferred embodiment according to the current invention, the matching program specifies one of the threshold values and reads the specified threshold value. In another preferred embodiment, when the process is switched between the character process and the photographic process based upon a command or the image area separation data indicative of the character or photographic area in the image data, the threshold value Th1 is also switched. In this case, the global processor 38 sets a threshold value in the threshold value Th1 for either the character process or the photographic process depending upon the command from the system controller 106 or the area separation data.

For the reference data 1 through 6, the global processor 38 sequentially provides two bytes at a time to all of the processor elements after one reference data is matched at all of the processor elements. In the pattern matching by the processor PE No. k of the image data group A through I as shown in FIG. 24 in the two-dimensional matrix having nine pieces of the data, 3-pixel image data A, D, G in the left adjacent processor element PE No. K−1, 3-pixel image data B, E, H in the current processor element PE and 3-pixel image data C, F, I in the right adjacent processor element PE No. k+1 are binarized in steps 21 through 29 as shown in FIG. 20. The left adjacent 3-pixels A, D, G and the right adjacent 3-pixels C, F, I have a data selector "7 to 1" as shown in FIG. 23. As shown in FIG. 24, the 8-pixel binary data a through h of the binary data group a through i from the processor element PE No. k based upon the threshold value Th 1 is written as the first data (T1*k*, K=3) in an 8-bit data writing area in the RAM-A4. The first data T1*k* corresponds to the first data T1 in FIG. 21C. The remaining one-pixel binary data in the binary data group a through i is written as the second data (T2*k*) in the 8-bit data writing area of the RAM-A5 as shown in FIG. 24. The T1*k* data corresponds to the second data (T2) in FIG. 21C. Pattern matching is generally performed after pixels are each converted to white, "0" or black, "1" in a binary data format. For this reason, if image data groups A through I in the pixel matrix are stored in multiple values such as 256-gradation levels, the pattern matching accuracy is raised. For example, if the 256-gradation levels are used, the central gradation of 128 is used as a threshold value to determine white and black. By changing the threshold value, white or black is more easily obtained in the binarization process. Based upon the above characteristics, pattern matching is also manipulated for the matching frequency to broaden or narrow the application range. When the gradation level changes depending upon the process among the 256-gradation level, the 128-gradation level and the 64-gradation level, the threshold value is freely changed to flexibly deal with various kinds of the data. When one particular threshold value is used for binarization, as the intensity level of the original image as a whole changes, since the data changes, there is a possibility for missing a match in the pattern. By binarizing the same image data group and determining the match between the reference data and the data corresponding to a threshold value, the missing pattern matching is substantially reduced. In other words, the pattern matching precision has increased.

Figure 25:
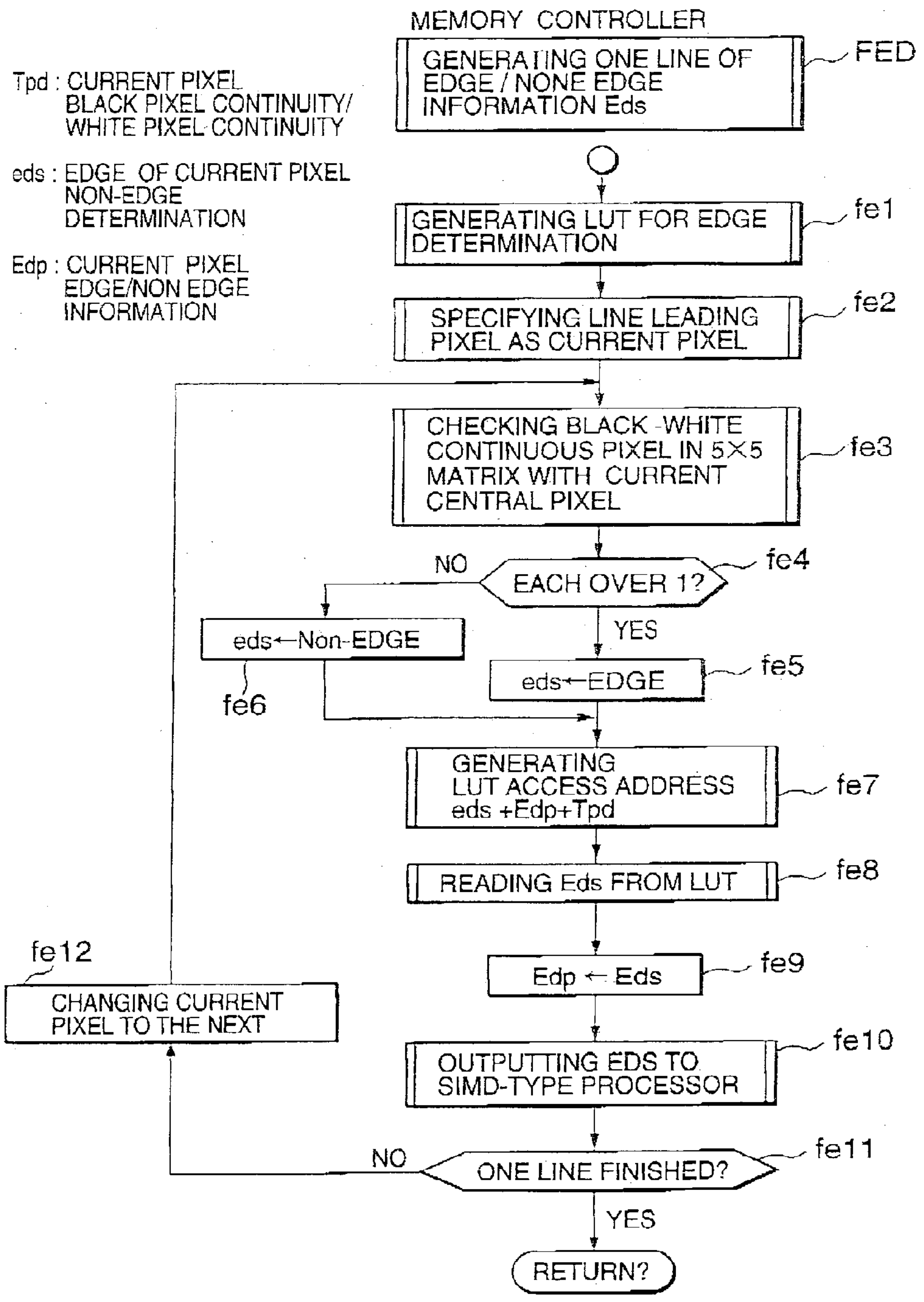
FIG. 25 illustrates data processing steps FED of determining edge/non-edge areas by the memory controller in a preferred process according to the current invention.
Figure 26A:
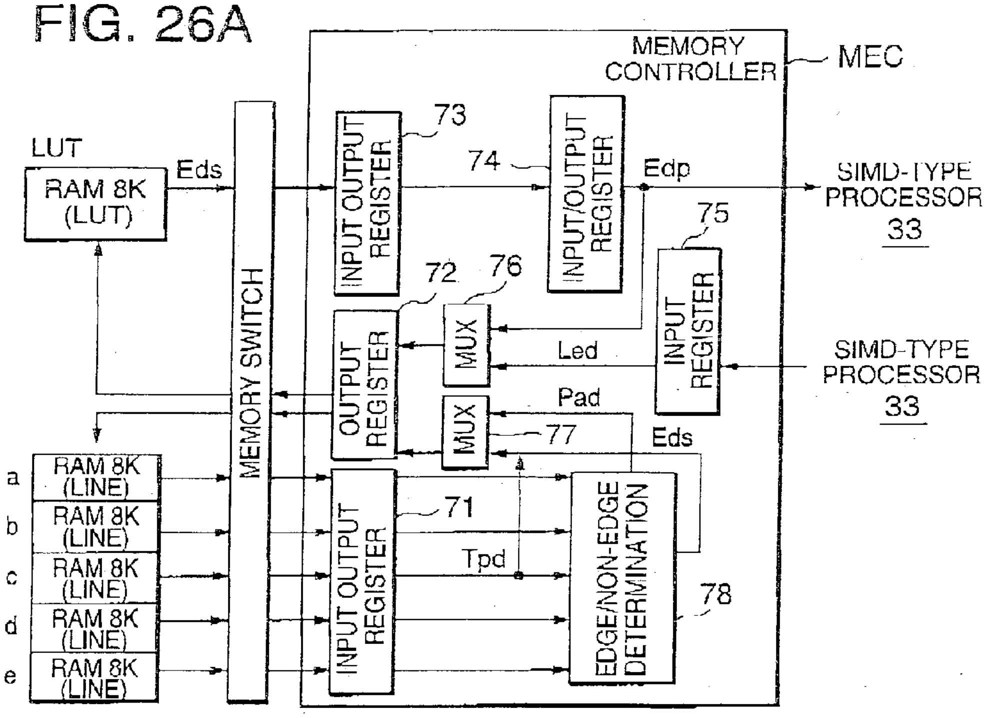
FIG. 26A illustrates an internal feedback loop in the memory controller in determining the edge/non-edge areas.

FIG. 25 illustrates data processing steps FED of determining edge/non-edge areas by the memory controller in a preferred process according to the current invention. FIG. 26A illustrates an internal feedback loop in the memory controller in determining the edge/non-edge areas. The memory controller MEC in FIG. 26A is an aggregate of six memory controllers that is selected from the memory controllers 0 through 19 of FIG. 5. If the processing speed does not have to be high, only a single memory controller is necessary. In FIG. 26A, the RAMs a through e are each 8*k* used as LUT and are selected from the RAM 0 though 15 of FIG. 5. The memory switch SW in FIG. 26A is selected from the memory switches SW1 through SW3 of FIG. 5 and is connected to the above memory controllers and the above RAMs. After the continuous black and white pixel detection, the global processor 38 of the SIMD-type processor 33 reads the edge/non-edge determination LUT from the data RAM 37 and transfers it to the RAM 8K via the memory controller MEC. The RAM 8*k* is indicated as an edge/non-edge RAM 8*k* (LUT). The memory controller MEC receives the LUT address Lad or input conversion data from the SIMD-TYPE processor 33 in an input register 75 and outputs it through a multiplexor 76, an output register 72 and the memory switch SW to an address line. The memory controller MEC also receives the LUT data or conversion output data in an input/output register 74 from the SIMD-type processor 33 and outputs it through an input/output register 73 and a memory SW to a data line of the RAM 8*k* (LUT) to write in the RAM 8*k* (LUT). The global processor 38 determines whether the current pixel exists in the edge area or the non-edge area by investigating the existence of any black or white continuous pixels near the current pixel in the black and white continuous pixel detection results from the RAM 8*k* (LUT) and the memory controller MEC. Concretely speaking, in the preferred embodiment, when at least one black continuous pixel group and at least one white continuous pixel group exist in a 5×5 pixel matrix block, the block is considered to be an edge area, and the centrally located current pixel is given the corresponding edge area information. On the other hand, when the above conditions do not exist, the block is considered to be a non-edge area, and the current pixel is given the corresponding non-edge area information.

Now referring to FIG. 25, in a step fe 1 the memory controller MEC sets in the buffer memory device 32 more than five lines of line memory (RAM 8$k$ (LINE)) and a LUT (RAM 8$k$ (LUT)) in response to the instructions from the SIMD-type processor 33 as shown in FIG. 26A. More than five lines of the above black and white continuous pixel detection results are accumulated, and the third line of the five lines is determined as the current line. Each pixel on the current line is selected as the current pixel in a step fe 2. The memory controller MEC reads the above detection result of the 5×5 pixel matrix with the centrally located current pixel. The memory controller MEC outputs the read data to the address line of the line memory RAM 8$k$ (LINE) via a multiplexer 77, an output register 72 and a memory switch SW. The memory controller MEC sequentially takes a 5-pixel row via an input output register 71, and when at least one black and white continuous pixel group exists, the memory controller MEC generates edge/non-edge information eds indicative of an edge area for the current pixel in steps fe 3 through fe 6. The edge/non-edge information Eds for the current pixel, the confirmed edge/non-edge information Edp for an preceding pixel in the x-direction and the image process data of the black and white continuous pixel detection results Tpd are given as LUT access addresses to the RAM 8$k$ (LUT) via the multiplexers 75 and 76 and the output register 72 in a step fe 7. The confirmed edge/non-edge information Edp is read from the edge determination RAM 8$k$ (LUT) in response to the combination of the above three pieces of the data in a step fe 8. The read information is written to an output register 74 of the memory controller and is outputted to the SIMD-type processor 33 in steps fe 9 and fe 10. In a step fe 11, it is confirmed whether or not all of the pixels in one line are completed for the above edge/non-edge determination. If it is determined that the process has not been completed, the current pixel is moved to a next pixel on the same line and the above described steps including fe 3 for pattern matching are performed. The confirmed edge/non-edge information Edp for a preceding pixel is feed-back information. The RAM 8$k$ (LUT) edge/non-edge determination is generally that the confirmed edge/non-edge information Edp is set to edge when the 5×5 pixel matrix with the centrally located current pixel includes at least one black and white continuous pixel group. When the edge/non-edge information Eds is set to non-edge, the confirmed edge/non-edge information Edp for the preceding current pixel is edge.

Furthermore, when the black/white continuous pixel detection result Tpd is either "black continuous pixel" or "white continuous pixel," the confirmed edge/non-edge information Edp is "edge." When the detection result Tpd is not either "black continuous pixel" or "white continuous pixel," the confirmed edge/non-edge information Edp is set to "non-edge." When the edge/non-edge information Eds for the preceding pixel is "non-edge," the confirmed edge/non-edge information Edp for the current pixel is set to "edge" only if the detection result Tpd indicates "black continuous pixel." Otherwise, it is set to "non-edge." The feed back by the confirmed edge/non-edge information Edp for the preceding pixel and the reference to the black and white continuous pixel detection result Tpd are added to the edge/non-edge determination LUT. The above addition controls the frequent oscillation for short-pitched switch between the edge and the non-edge and increases the reliability for the edge/non-edge detection.

Figure 26B:
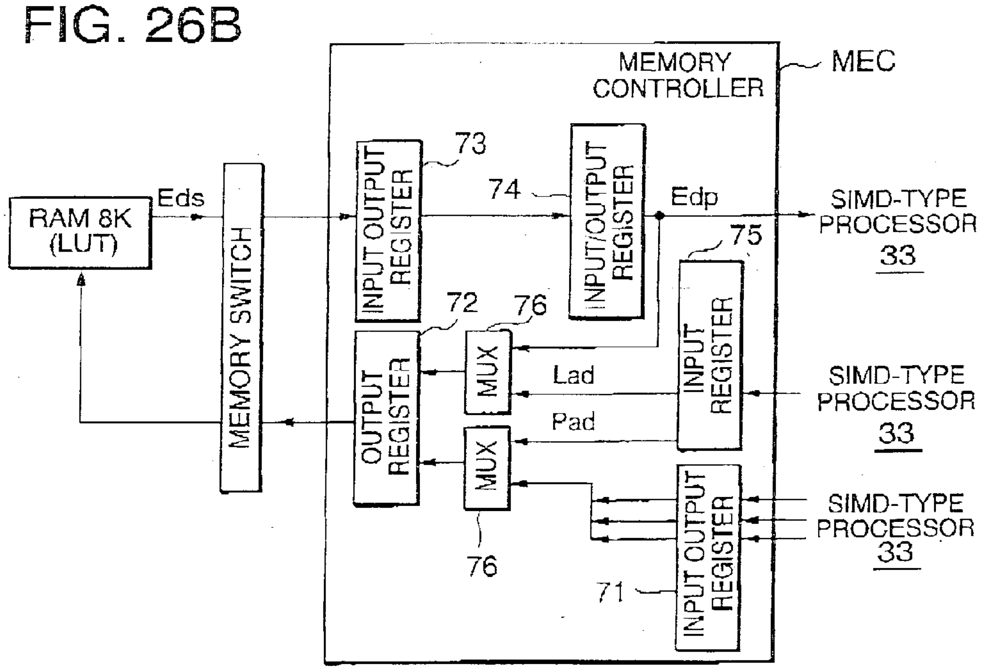
FIG. 26B is illustrating a data feed back group in the memory controller for the above edge/non-edge determination in the appropriate format.

FIG. 26A illustrates the feed back LUT process using the multiplexers 75 and 76. Not only the LUT access data or input data is generated based upon the data in the memory controller from general RAM 8$k$ (LINE), but also the LUT access data is generated based upon more than one pair of data in the memory controller from the SIMD-type processor 33. FIG. 26B illustrates a data feed back group in the memory controller for the above edge/non-edge determination in the appropriate format. From five RAM 8$k$ (LINE) not shown in FIG. 26B, other memory controllers provide the SIMD-type processor 33 with the black/white continuous pixel detection results. When at least one black and white continuous pixel groups exist in the 5×5 pixel matrix, the current pixel is determined to be an edge area. The edge/non-edge information Eds for the current pixel and the black/white continuous pixel detection result Tpd for the current pixel are given to the memory controller as shown in FIG. 26B. The same memory controller outputs to the RAM 8$k$ (LUT) the above information and the confirmed edge/non-edge information Edp for the preceding pixel that are written in the output register 72 via the multiplexer 76. By using the above feedback LUT process, the SIMD-type processor 33 increases its state transition process capability.

Isolation Point Removal (FIG. 18):

Furthermore, since character edges continuously exist, the isolated edges are corrected to non-edge areas by the isolated point removal. For the pixel that is determined to be an edge area, the edge area information of "1" is given, and for the pixel that is determined to be a non-edge area, the edge area information of "0" is given.

Figure 27A:
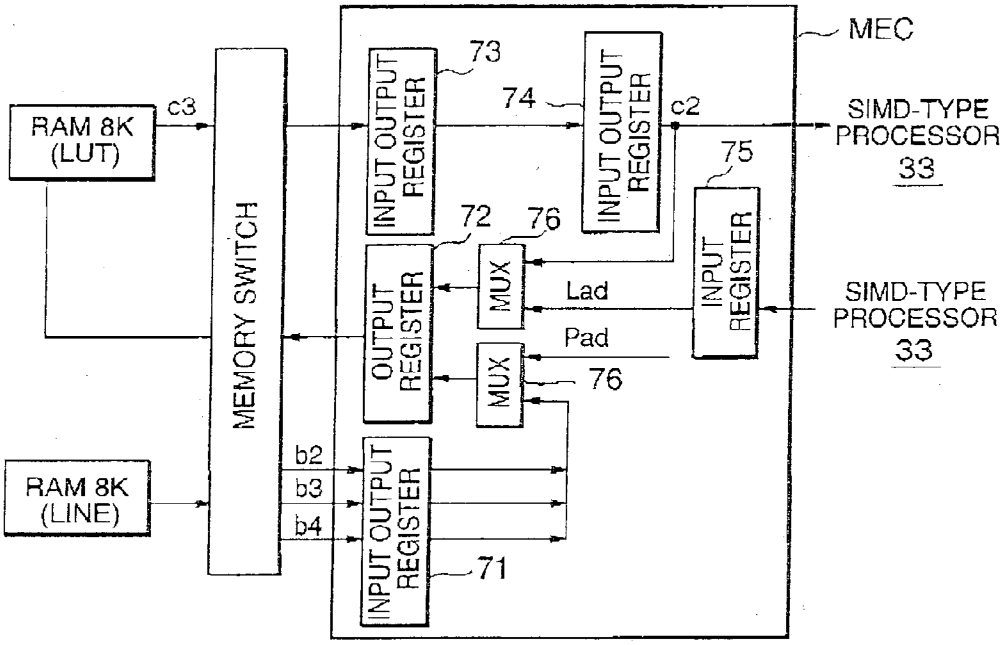
FIG. 27A illustrates one preferred embodiment of the memory controller that includes a feedback loop.
Figure 27B:
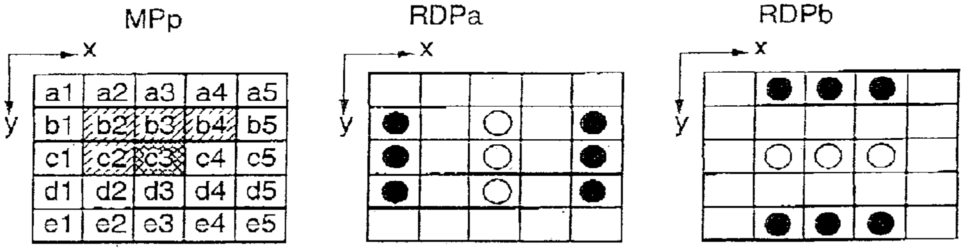
FIG. 27B illustrates white valley pixels in a small white area that are not detected by the above RGB white background distributions RDPa and RDPb of the G image data.

White Background Separation 323 (FIG. 18):

White background separation 323 performs the RGB white extraction, white determination, white pattern matching, black determination, black pattern matching and white correction. In pattern matching, the above pattern matrix data is arranged in a single row by the memory controller. A plurality of the processor elements PE concurrently compares the serial data in the reference patterns and determines the matching of one matrix at the same time. In the RGB white background detection, the white area is detected in the RGB image data, and the white background separation process is activated. Concretely, if the RGB image data in the 3×3 pixel matrix is all below a threshold value thwss, the current pixel is determined to be a white area and the white pattern matching is activated. This detects if a white pixel area extends to a certain extent. Next, to avoid recognizing yellow background as a white background, assumed or virtual white pixels are defined. If the B image data below or equal to the threshold value thwc exists anywhere in the 5×5 image matrix, the current pixel is assumed to be a virtual white pixel, especially since the white determination will be made only based upon the G image data as will be described later. The B image data 65 is used to detect Y which is not detected in the G image data. Furthermore, in the valley white pixel detection, white valley pixels in a small white area that are not detected by the above RGB white background distributions RDPa and RDPb of the G image data as shown in FIG. 27B. Concretely, the lowest intensity miny is extracted from the black pixel group in the 5×5 pixel matrix distribution RDPa. Furthermore, the highest intensity maxy is also extracted from the white pixel group in the 5×5 pixel matrix distribution RDPa. Next, the lowest intensity mint is extracted from the black pixel group in the 5×5 pixel matrix distribution RDPb while the highest intensity maxt is extracted from the white pixel group in the 5×5 pixel matrix distribution RDPb. A positive and larger of (miny-maxy) and (mint-maxt) is selected as a valley detection value OUT. If the valley detection value OUT is equal to or above a predetermined threshold value, the current pixel or the centrally located pixel in the matrix RDPa or RDPb is detected as the valley white pixel. As described above, the valley condition of the image is detected to supplement the detection for the areas that are hard to be detected by the RGB white background detection.

White Determination:

State variables MS, SS [I] for the white determination are generated and updated. The variable MS is for the currently processing line or the current line while the variable SS is for the preceding line or the already processed line. Either of the variables MS and SS expresses 4-bit whiteness information of the white background, and the maximal value is 15 while the minimal value is 0, 15 being the whitest. In other words, the state variables MS and SS indicate a degree of whiteness, and the larger the value, the whiter it is. At the beginning of the process, the state variable MS or SS [I] is initialized to "0." The whiteness information SS for the preceding line in the scanning direction is updated to the value of the pixel next to the current pixel in the x direction and the value is reduced by a lowering rate. The white background information of the current pixel is transmitted to the one line preceding to the current pixel in the x direction. However, this white transmission process is applicable when the white information contains the data whose value is smaller than that of the current pixel. For example, when the preceding line pixel is determined to be a white area by the RGB white background detection, the corresponding white information contains the value of "15." Since the value is maximal, the value is not rewritten. In the transmission of the above white background information SS, the preceding line white information SS is stored in the RAM 8*k*. As shown in FIG. 26B, the feedback loop is formed in the memory controller, and the confirmed edge/non-edge information Edp is read from the corresponding RAM 8*k*. The SIMD-type processor 33 calculates the white transmission process data to be outputted to the memory controller. The above read confirmed edge/non-edge information Edp and the white transmission process data are written via the multiplexers 76 and 77 at an address specified in the data Edp. After the current pixel becomes non-white following an update when the current pixel becomes the virtual white pixel and white background information MS is above the threshold value thw/(13), the white background information MS for the current pixel is incremented by one. That is, the information is updated to indicate one degree whiter. If the white background information value is already the maximal value of "15," the value is maintained at 15 after updating. In this process path, the above white transmission process is performed.

When the current pixel is the virtual white pixel and the white background information MS is below the threshold thw/(13), but equal to or above the threshold thw2(1) with a valley white pixel, the state variable MS is maintained. However, in this process path, the white transmission process is performed. When neither of the conditions is matched, the white background information MS for the current pixel is decremented by one. That is, the degree of whiteness is lowered by one degree. Since the minimal value MIN for the white background information MS is 0, if it is already "0," the value is maintained at 0. Again, in this process path, the white transmission process is performed.

Net Point Separation 324 (FIG. 18):

Using the G image data, a net point peak pixel or a pixel forming a part of the net point dot is detected based upon the pixel intensity information in the two-dimensional area of a predetermined size. When the following two conditions are concurrently satisfied, a central pixel is detected as a net point peak pixel in the area.

Condition 1: the intensity level of the central pixel is either maximal (peak) or minimal (valley) in the selected area.

Condition 2: for pairs of all pixels that are symmetrical with respect to the central pixel, the difference between the average intensity value of the pair and the central pixel is above or equal to a predetermined threshold value th in absolute value.

The net point peak pixel in the valley and peak is determined for each of the predetermined two-dimensional small areas, and the total of the net point peaks is a total value P. When the total value P exceeds a predetermined threshold value Pt, the pixels in the small areas are determined to be a net point area. When the process unit is a pixel, the central pixel of the small area is considered to be a net point area. The above small area determination also increases its reliability as in the case of the edge/non-edge determination by using the feedback in the memory controller as shown in FIGS. 26A and 26B because the frequent oscillation between net point and non-net-point is controlled. The above high reliability is also dependent upon the confirmed net point/non-net-point feedback of the preceding pixel and the net point peak or valley detection result that are added to the net point/non-net-point determination LUT.

7-Level Values 325*a* (FIG. 18):

The input RGB data is converted into c, m, y or w (white) signals. One example of color component division defines boundaries for each color component. The RGB difference is defined, and the difference is between the maximal value and the minimal value of each pixel in the RGB image. The color map space is divided into seven areas of space, and the input data is placed in one of the seven spaces. An output signal includes the c, m, y signals, each bit of three-bit data and one-bit w color determination color pixel detection. A threshold value is different for each color area since the threshold is determined based upon the color area having a different range of chromaticity. The above color division is one example, and any equation may be utilized. The c, m, y and w output from the color division 325*a* stores a line in the buffer memory unit 325 for the color pixel determination when the color pixel w exists. The corresponding pixel is corrected to have c=m=y=0. By this correction, the white level of the 5×5 pixel matrix is increased. The current pixel undergoes pattern matching in the 5×5 pixel matrix with a color pixel pattern group to determine whether c, m, y pixels are all "1" (c=m=y=1) or "0" (c=m=y=0). It is determined whether or not the current pixel is a color line pixel surrounded by white based upon a pattern matching using a 5×5 pixel matrix color fine line pattern group. Next, it is detected whether or not the current pixel is a white area pixel by pattern matching a 5×5 pixel matrix white area pattern. Based upon the above extracted pattern matching results, when the white area exists around a color pixel, the color pixel becomes a color pixel candidate. When the white area exists in any other manner, the pixel is not considered as a color pixel. However, when a color pixel pattern match takes place without a white area, the pixel becomes a color pixel candidate.

Color Determination 325*b* (FIG. 18):

The number of pixels or the pixel count is made to "1" for c, m and y data, i.e., (c=1, m=1 and y=1). When the difference between the maximal and minimal pixel count for the c, m and y data is equal to or above a threshold thcnt and the minimal pixel count is below a predetermined value thmin, the pixel becomes a color pixel candidate 1. The predetermined values thcnt and thmin are threshold values that are determined prior to a duplication process. Planes are considered for the y, m and c data. For each plane, the pixel count is made for each N×N matrix, and the minimal value is assumed to be black. By this, even if black pixels are not read by mistake, the correction is possible. Chromatic pixels are determined based upon the difference between the maximal and minimal values. The black pixels correct the pixels that were not read and extract the chromatic pixels. If a chromatic pixel exists in a 5×5 pixel matrix having the centrally located current pixel, the current pixel is considered to be a chromatic pixel. If the current pixel is the color pixel candidate 1 and the color pixel candidate 2, the current pixel is defined to be color pixel 1. In a 4×4 pixel matrix, if more than one color pixel 1 exists, the corresponding 4×4 pixel matrix is designated as a color pixel 1 block as a whole. In the process after the above block, the 4×4 pixels are outputted as one block as a unit. When the color pixel 1 block does not exist adjacent to the current block, the current pixel is removed as an isolated point during the isolated point removable process. In the decompression process, if the color pixel 1 block exists, it is expanded to a 5×5 block. The expansion is meant to avoid the black character process around the color pixels. The B/C information is generated to indicate the color pixel block 1 by L for chromaticity otherwise by H for achromaticity. Subsequently, the number of pixels for c, m, and y data is counted in the 5×5 pixel matrix when c=1, m=1 and y=1. The color pixel 2 and the color pixel 3 are detected according to the difference between the maximal count value and the minimal count value. The block is determined, and the isolated block is removed. Furthermore, the current pixel determines the black pixel candidates 1 and 2 by the pattern matching. If the current pixel is the black pixel candidate 1 as well as the black pixel candidate 2, it is determined as the black pixel. In a 4×4 pixel matrix, if more than one black pixel exists, the 4×4 pixel matrix as a whole is designated as a black pixel block. After the above blocking process, the 4×4 block is outputted as a unit. Within a 3×3 block matrix, if the current block is a black pixel block and the surrounding pixels are non-black pixels, the current block becomes a non-black pixel block.

Combined Color Pixel Determination:

If the current block is determined to be the color pixel 2 by the color pixel determination and is not determined to be a black pixel by the achromaticity determination, the current block is a color block. When the color pixel is determined by the color pixel determination, the current block is also determined to be a color block. For the color block determined by the combined color pixel determination, when even a color single block exists in a 9×9 block matrix with the centrally located current block, the current block is determined to be a color block in order to make the small characters to be continuous. To expand in a significant manner, the space between characters is shrunk.

Continuous Count:

It is determined whether the image is a color document or a black-and-white document based upon the continuity of the color pixel blocks. By counting the continuous color pixels in the above expanded output color pixel block, it is determined whether the image is a color document. When the current pixel exists in the color pixel block, the color pixel continuous number is determined by referring to the continuous color pixels in the upper left, upper, upper right and left of the current pixel. For example, if the current pixel is the c3 pixel in the pixel distribution pattern MPp in FIG. 27B, the upper left, upper, upper right and left pixels are respectively designated as pixels b2, b3, b4 and c2. When the current pixel is not in the color pixel block, the current pixel receives "0" for the color pixel continuous number. In this process, the LUT is read from the data RAM 37 of the SIMD-type processor 33 and is written in the RAM 8K (LUT). The LUT defines the relationship among the color pixel continuous numbers of the current pixel (c3) for the color pixel continuous numbers for the upper left, upper, upper right and left pixels b2, b3, b4 and c2. As shown in FIG. 27A, a feedback loop is formed in the memory controller. The data c2 or the color pixel continuous number for the left pixel c2 from the RAM 8K (LUT) and the color pixel continuous numbers for the upper left pixel b2, the upper pixel b3 and the upper right pixel b4 from the line memory RAM 8*k* (LINE) are combined by the multiplexers 75 and 76 and the output register 72. The combined continuous numbers are given to the address line of the RAM 8*k* (LUT) as the LUT access address via the memory switch SW. The data c3 is read from the LUT, and the number is a color pixel continuous number for the current pixel c3.

The general logic for the color pixel continuous number determination by the LUT is explained here. When the current pixel does not exist in the color pixel block, "0"is given. When the current pixel exists in the color pixel block, the color pixel continuous number of the upper right pixel b4 plus 1 is given to a reference value A. However, when the color pixel continuous number of the upper pixel b is "0," the color pixel continuous number of the upper right pixel b4 is given to the reference value A. Next, the color pixel continuous number of the upper left pixel b2 plus one is given to a reference value B. The color pixel continuous number of the upper pixel b3 plus one is given to a reference value C. The color pixel continuous number of the left pixel c2 plus one is give to a reference value D. The highest value among the reference values A, B, C and D is provided as the color pixel continuous number for the current pixel c3. If the color pixel continuous number for the upper pixel is not "0," the continuous number is used for the current pixel. After giving the color pixel continuous number to the current pixel, it is determined whether the color pixel continuous number is equal to or above a predetermined value thacs. If it is equal to or above the predetermined value thacs, it is determined that the image is a color document, and the continuous count process is completed. On the other hand, if the color pixel continuous number is below the predetermined value thacs, the current pixel is moved to a next pixel in the scanning direction x or y, and the above process is repeated. After the above process is performed on the entire document, if the color pixel continuous number remains below the predetermined value thacs, the document is determined to be black-and-white. The above color pixel continuous number is approximately a sum of the length and the width of the color line. To avoid the double counting, the color pixel continuous number of the upper right pixel is different from others. When any one of the color pixel continuous numbers in the color pixel group is equal to or above the predetermined value thacs on the same document, it is determined whether the image is color or black-and-white.

Total Determination 326 (FIG. 18):

The total determination 326 includes character determination, expansion process and character inside determination. In the character determination, the result of the edge separation 322 is edges. When the net point separation 324 results in no net point and the white background separation 323 results in a white area, it is determined to have character edges. Otherwise, it is determined to be non-character edges, pictures or inside characters.

The expansion process performs the OR process on the 8×8 block of the character determination result and subsequently performs the AND process on the 3×3 block and the 4-block expansion process.

If any of the block is a character edge in the 8×8 block with the centrally located current block, the current block is assumed to be a character edge block. If all of the blocks in the 3×3 block are character edges, the current block is confirmed as a character edge. Finally, the current block and the adjacent three blocks or the total of four blocks are considered character edges. The reason for performing the OR process first and then the AND process is that the appearance may be unnatural due to the process difference when small non-black character areas exist around the black character area. For example, the black appears faded. To avoid the fading, the OR process enlarges the non-black character areas, and the AND process expands to a desired amount. The character inside determination generates a character inside signal indicative of the character inside area based upon the result of the character inside determination, the edge separation 322, the white background separation 323, the net point separation 324 and the color determination 325*b*. The character inside signal is an output from the 5×5 OR block process on the output signal indicative of character edge/non-character edge for the character determination.

A white block black character signal A is activated when the color determination 325*b* result is non-active or achromatic, or when black pixel block or the output from the white block correction in the white background separation 323 is the white block correction data, and the character inside signal is active or indicative of character edge. That is, "white-block black character" is indicated. When the black character is surrounded by white background, it is highly likely a character. The high density black area signal B is activated when the OR in the 3×3 black block in the white background separation 323 is active or black, the color determination 325 result is non-active or achromatic, the net point separation result is non-active or non-net-point, and the character inside signal is non-active or character non-edge. Since the density is high in the black characters, the character inside is determined based upon the combined conditions. The black character signal C is active or indicative of black characters when the character inside signal is active or indicative of character edges and the color determination 325 result is non-active or achromatic. The active black character portions are likely to be character edges, and the surrounding areas are likely to be character inside.

The inside character candidate determination will be described. Using the white block black character signal A, the high density black area signal B and the black character signal C, the inside character candidate signal Q is expressed in the following signal:

$$Q24=(A21\ \&\ A22\ \&\ A23\ \&\ 24)\#((Q13\#Q23\#Q14\#Q15)\&(B24\#C24))$$

Where the first number "2" indicates the current line y2 while the first number, "1" indicates a preceding line y1. The second number indicates a pixel position x on the line. With respect the above equation, if the white block black character signals A continuously exist or A21 through A24 are all active, the current pixel is assumed to be an inside character candidate, and the inside character candidate is confirmed by initiating the confirmation process. That is, if the pixel Q13, Q23, Q14 or Q15 exists for determining the inside character candidate around the high density black area signal B24 or the black character signal C24, the current pixel is also confirmed as the inside character candidate. When the white block character signals A are active and continuously existing, they are used to trigger the determination of the inside character candidates. When the black characters are surrounded by the white background or the white block black character signal A is active, the area is highly likely to be characters. When the white block black character signal A continuously exists or is continuously active, almost all of them are characters. If the black character signal A is active, since it is likely to be a character edge and "inside character" exists around the character edge, it is considered to be an inside character candidate by indicating Q24 to be active. Based upon the inside character candidate signal Q being active, the inside character signal is generated. The inside character signal is not a character edge signal, and if it is an inside character candidate, the inside character signal is activated. The final output C/P signal is like follows:

| C/P Signal | Character Edge Signal | Inside Character Signal | Area Determination Content |
|---|---|---|---|
| 0 | none | none | Picture area |
| 1 | none | active | Inside character area |
| 2 | — | — | — |
| 3 | active | x | Character edge area |

Where there is no case for outputting the signal C/P=2. To the two-bit C/P signal, one-bit is added to generate image area data Fd. The image area data Fd is referred to for a filter process and a background removal process by the IPU2 as well as for a γ-conversion and a gradation process by the IPU3*y*, IPU3*m*, IPU3*c* and IPU3*k*. The filter process in the IPU2 is a filter process to perform the MTF correction on the RGB data. By using a coefficient matrix for the N×N pixel matrix, the weighted average is obtained from the image data. When the C/P signal is 3 for the character edge area, the coefficient matrix for the brightening process is used to generate the weighted average. When the C/P signal is 0 for the picture area or 1 for the inside character area, the coefficient matrix for the smoothing process is used to generate the weighted average. The background removal improves the color reproduction of the image data. The background removal processes the common portions UCR of the Y, M and C data from the color conversion and generates the Bk data to complete the Y, M, C and K data. Whenever the C/P signal is not 3 or not indicative of the character edge area, the skeleton black process is performed. That is, when the C/P signal process indicates the inside character area or the picture area, the skeleton black process is performed. On the other hand, the C/P signal is 3 or indicative of the character edge area, the full black process is performed. Furthermore, when the C/P signal is 3 or indicative of the character edge area and the B/C signal is H or indicative of an achromatic area, the C, M and Y data are erased. In case of the black characters, it is expressed by only black components.

The γ-conversion process by the IPU3*y*, IPU3*m*, IPU3*c* and IPU3*k* modifies the γ-conversion curve in response to the C/P signal or the frequency characteristics of the color printer PTR image forming unit 105. When the C/P signal is 0 for indicating a picture area or 1 for indicating an inside character area, the γ-conversion curve is selected for reproducing an image at a high accuracy level. On the other hand, the C/P signal is 3 for indicating a character edge area, the γ-conversion curve is selected for emphasizing the contrast.

The gradation process by the IPU3*y*, IPU3*m*, IPU3*c* and IPU3*k* performs the dithering process, the error diffusion process and so on in response to the C/P signal or the frequency characteristics of the color printer PTR image forming unit 105. The gradation process of the K image data by the IPU3*k* performs the gradation critical process when the C/P signal is 0 indicative of a picture area. Otherwise, the resolution critical process is performed. When it is forming an image other than a Bk image and the C/P signal is either 0 indicative of a picture area or 1 indicative of an inside character, the gradation critical process is performed. Otherwise, the resolution critical process is performed.

Second Preferred Embodiment:

In a second preferred embodiment according to the current invention, the hardware components are substantially identical to those of the first preferred embodiment. However, the SIMD-type processor 33 in the IPU1 differently performs the pattern matching or comparison based upon the pattern matching control program and the image area separation program in the scanning correction program in the program memory unit 36.

Figure 28:
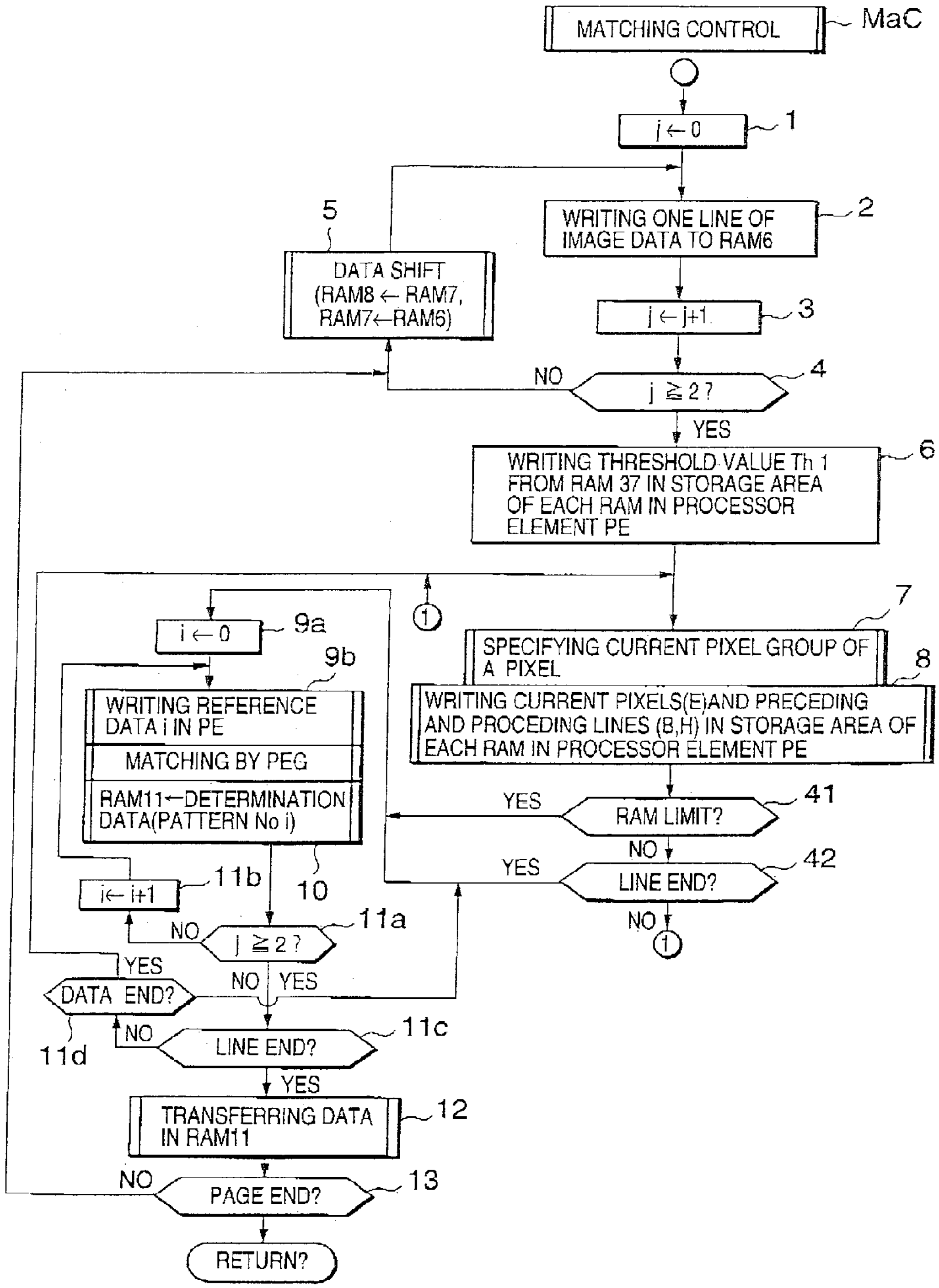
FIG. 28 is a flow chart illustrating steps involved in the content of the matching control process MaCa in the second preferred embodiment according to the current invention.

FIG. 28 is a flow chart illustrating steps involved in the content of the matching control process MaCa in the second preferred embodiment according to the current invention. The above process replaces the one by the first preferred embodiment as shown in FIG. 19. For example, when the pattern matching is the 3×3 reference pattern matrix for detecting the continuous white or black pixels as shown in FIG. 21A, the RAMs 6 through 8 in the buffer memory unit 32 in the SIMD-type processor 33 are defined to be an input buffer for the three-line G image data storage. In addition, the RAM 11 is defined to be a line buffer for the determination result storage for the determination data indicative of a match between the reference patter and the 3×3 pixel matrix image data in the RAM 7. The middle line of the pixel matrix is centrally located in the 3×3 pixel matrix and is compared with the center of the reference pattern. As shown in FIG. 28, the global processor 38 of the SIMD-type processor 22 writes the matching process program in the data RAM 37 in the process program storage area of each RAM in the A+2 units of the processor elements as soon as the global processor 38 advances to the matching control MaCa. Then, the SIMD-type processor 33 writes one line of the image data in the RAMs 6 and 7 as in the first preferred embodiment. The SIMD-type processor 33 also writes a threshold value Th1 for the image binarization from the RAM 37 in the reference data storage area in the RAM of each processor element. The first block image data of each line is written in the processor elements No. 1 through (A+1) as shown in steps 1 through 8. It is determined whether or not image data groups are stored up to near the predetermined maximal memory capacity value of the processor element. In the alternative, the global processor 38 checks whether or not all of the pixels on one line have been sent to the SIMD-type processor 33 in the above matrix image data group in steps 41 and 42. If neither is true, a next pixel group on the same line is defined as the pattern comparison pixels in a step 7, and the image group is written in the processor element PE in the above described step 8.

When the image data is stored in the RAM of the processor element up to the predetermined maximal capacity or when all of the pixels in one line have been written to the SIMD-type processor 33 of the current pixel, the global processor 38 provides reference data i to the processor element in steps 9*a* and 9*b* and instructs the matching of the first block of the image data to the processor element. Each processor element PE No. k performs the matching 9*e* on the first block image data group of FIG. 20 and writes the determination data in the flag register, where k is from 1 to A. The global processor 38 writes the reference pattern i at the address for the PE matching on the RAM and gives the A units of the processor elements the matching command for the next block of the image data group. The above processes as shown in the steps 9*a* through 11*d* in FIG. 28 and the step 9*e* in FIG. 20 are repeated for the number of the blocks in the image data that has been written in the RAM of the processor element PE. After a plurality of the matching is repeated in the step 9*e*, it is determined whether or not all of the pixels on the line have been completed for pattern matching in a step 11*c*. When it is not completed, a next current pixel group on the same line is set to the pattern comparison pixel in a step 7, and the image data group in the above described step 8 is transferred. In the pattern matching in the second preferred embodiment, since each processor element repeats the matching many times so as to simultaneously perform the pattern matching of many pixels on the line as the current pixels, the pattern matching determination is obtained at an even faster speed.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. An image data processing apparatus, comprising:

a buffer memory unit for storing multi-valued image data and for outputting the stored image data on a pixel basis, the image data having image data groups of pixel matrices, each of the pixel matrices becoming a current pixel matrix when a centrally located pixel in the pixel matrix becomes a current pixel;

a processing unit connected to said buffer memory unit including a plurality of processor elements each processing the image data having a range of bit widths, said processor elements concurrently processing the image data; and a control information memory unit connected to said processing unit and said buffer memory unit for storing reference data for pattern matching and control data, each of said processor elements binarizing a corresponding one of the image data groups based upon a predetermined threshold value, said processing unit converting the binarized image data into a one-dimensional serial image data of a predetermined bit width, said processor elements comparing the converted imaged data to the reference data in said control information memory unit to generate a determination result.

2. The image data processing apparatus according to claim 1 further comprises a buffer controller connected to said buffer memory unit and said control information memory unit for reading the reference data and the control data from said control information memory unit, said buffer controller providing the reference data to said processing unit, said buffer controller further reading the image data from said buffer memory unit to said processing unit for the pattern matching based upon the control data.

3. The image data processing apparatus according to claim 2 wherein said control information memory unit further includes a data memory unit, the control data including a threshold value, said data memory unit storing the reference data and the threshold value, said buffer controller reading the reference data and the threshold value from said data memory unit to said processing unit.

4. The image data processing apparatus according to claim 2 wherein said control information memory unit further includes a program memory unit.

5. The image data processing apparatus according to claim 3 wherein the control data includes a plurality of the threshold values, said buffer controller reading one of the threshold values from said data memory unit to said processing unit.

6. The image data processing apparatus according to claim 5 wherein said buffer controller detects a peak value of the image data while the image data is read from and written to said buffer memory unit.

7. The image data processing apparatus according to claim 6 wherein each of said processor elements includes a memory unit for concurrently storing the reference data, the image data for the pattern matching and the determination result.

8. The image data processing apparatus according to claim 5 wherein the control data includes setting information and administrative information, the setting information further including specified memory unit information and control mode information, the administrative information further including specified area information for the specified memory unit information, said buffer controller further including a memory controller for controlling read and write for the specified memory unit information, a memory switch for connecting said memory controller to another memory controller that said memory controller specifies, and a processor for reading the setting information and the administrative information from said control information memory unit to said memory controller.

9. The image data processing apparatus according to claim 8 further comprising plural pairs of input/output busses for concurrently transferring image data in parallel, said buffer controller further includes a selector unit for connecting each of the memory controllers to a selected one of the pairs of the input/output buses in response to a command from said processor.

10. The image data processing apparatus according to claim 7 wherein said memory of each of said processor elements has a capacity to store a plurality of the image data groups, said buffer controller provides said processing unit with a predetermined number A·m of the pixel matrixes of the image data for the pattern matching where a first predetermined number A being a number of said processor elements and a second predetermined number m being an integer, a current pixel position being located at a central location of each of the pixel matrixes, each of said processor elements determining whether the m pixel matrixes of the image data matching the reference data.

11. The image data processing apparatus according to claim 10 wherein the reference data includes a plurality of different contents, said buffer controller sequentially provides said processing unit with the a plurality of the different contents.

12. The image data processing apparatus according to claim 11 wherein said processor element processes a predetermined f-bit length of the image data, the reference data having binary data groups of predetermined c×d pixel matrices of reference patterns, a predetermined e number of the reference patterns being serially arranged in one dimension and each having predetermined a-bit data length, the a-bit length being smaller than the f-bit length, said processor element converting the image data into the predetermined e number of the predetermined c×d pixel matrices each of which is serially arranged in one dimension in the a-bit data length, said processor element determining whether or not the image data and the reference data match for each of the a-bit data length, where the predetermined numbers a, c, d and f are each an integer that is equal to or larger than 2, where the predetermined number e is an integer that is equal to or larger than 1, where a relationship among the predetermined numbers a, c, d and e is $a\times(e-1)<c\times d\leqq a\times e$.

13. The image data processing apparatus according to claim 12 wherein the predetermined numbers f and a are both one byte while a product of the predetermined numbers c and d is equal to or larger than 9, the pixel matrixes of the reference data and the image data being each at least two bytes, each of said processor elements comparing each of the bytes between the image data and the reference data, if all of the bytes being matched, said processor element determining that a match is made between the reference data and the image data.

14. The image data processing apparatus according to claim 13 further comprising a image scanning unit for generating the multi-valued image data, the image data expressing pixels each of the pixel being expressed in a plurality of bits, said control information memory unit further comprising a program memory for an image separation program that includes a pattern comparison program for determining a match between the reference data and the image data.

15. The image data processing apparatus according to claim 14 further comprising an image area determination unit for referring to a preceding pixel area determination result to generate a current pixel area determination result based upon the image data for a current pixel and an adjacent pixel, wherein said buffer controller further comprises an internal register for storing current pixel image processed data and the preceding pixel area determination result, said buffer controller inputting the current pixel image processed data and the preceding pixel area determination result to said image area determination unit and latching the current pixel area determination result in said internal register, said buffer controller outputting the current pixel area determination result to said processing unit.

16. The image data processing apparatus according to claim 14 wherein said program memory contains a scanning correction program including the image separation program.

17. The image data processing apparatus according to claim 16 wherein said buffer controller detects and stores at least one of a maximal value and a minimal value of the image data when said buffer controller inputs the image data, said buffer controller outputs the stored one of the maximal value and the minimal value to said processing unit.

18. A color image forming apparatus, comprising:

a color image scanning unit for scanning a color image to generate scanned color image data and for correcting the scanned color image data to generate color image data;

a buffer memory unit connected to said color image scanning unit for storing the color image data and for outputting the stored color image data on a pixel basis, the color image data having image data groups of pixel matrices, each of the pixel matrices becoming a current pixel matrix when a centrally located pixel in the pixel matrix becomes a current pixel;

a first processing unit connected to said buffer memory unit including a plurality of processor elements each processing the color image data having a range of bit widths, said processor elements concurrently processing the color image data;

a control information memory unit connected to said first processing unit and said buffer memory unit for storing reference data for pattern matching and control data, each of said processor elements binarizing a corresponding one of the image data groups based upon a predetermined threshold value, said first processing unit converting the binarized image data into a one-dimensional serial image data of a predetermined bit width, said first processor elements comparing the converted imaged data to the reference data in said control information memory unit to generate a determination result;

a buffer controller connected to said buffer memory unit and said control information memory unit for reading the reference data and the control data from said control information memory unit, said buffer controller providing the reference data to said first processing unit, said buffer controller further reading the image data from said buffer memory unit to said first processing unit for the pattern matching based upon the control data; and an image forming unit connected to said buffer memory and said buffer controller and further comprising a second processing unit and a third processing unit, said second processing unit converting RGB image data to YMCK image data via a RGB-YMCK conversion program, said third processing unit correcting the YMCK image data for printing via an output correction program, said second processing unit and said third processing unit each further including an image data input/output port, a program memory for a program, a data memory and a plurality of processor elements, said processor elements each processing the color image data having a range of bit widths, said processor elements concurrently processing the color image data, said buffer controller controlling the image data among said buffer memory, said image data input/output port, said second processing unit and said third processing unit according to the program and the image data, said second processing unit and said third processing unit each further including a program writing unit for writing in said program memory of said second processing unit the RGB-YMCK conversion program and for writing in said program memory of said third processing unit the output correction program.

19. The color image forming apparatus according to claim 18 wherein said third processing unit further includes a corresponding number of said third processing units for a number of photosensitive drum units.

20. The color image forming apparatus according to claim 18 further comprising:

a parallel bus for transferring the image data;

an image memory for storing the image data;

an image memory controller connected to said parallel bus and said image memory for inputting the image data from said parallel bus and for outputting the image data to said parallel bus; and an image data controller connected to said second processing unit and said parallel bus for controlling the image data between said parallel bus and said second processing unit.

21. The color image forming apparatus according to claim 20 wherein said image data controller controls compression of the image data from said color image scanner and outputting the compressed image data to said parallel bus.

22. The color image forming apparatus according to claim 20 wherein said image data controller controls transfer of the image data to said second processing unit for processing and compression the processed image data from said second processing unit for outputting the compressed image data to said parallel bus.

23. The color image forming apparatus according to claim 20 wherein said image data controller controls expansion of the image data from said parallel bus and transfer of the expanded image data to said second processing unit.

24. The color image forming apparatus according to claim 21 wherein said image memory controller compresses the image data between an external device and said image data controller connected to said parallel bus.

25. The color image forming apparatus according to claim 21 wherein said image memory controller expands the image data between an external device and said image data controller connected to said parallel bus.

26. The color image forming apparatus according to one of claims 24 and 25 wherein said external device includes a personal computer and a local area network (LAN) and a facsimile machine is connected to said parallel bus.

27. A method of pattern matching comprising the steps of:

storing reference data for pattern matching and control data in a control information memory;

storing a plurality of lines of multi-value image data in a buffer memory;

outputting the image data to a data processing unit from the buffer memory unit; and simultaneously processing the image data in the data processing unit having a plurality of processor elements each processing the color image data having a range of bit widths, each of said simultaneous processing step further comprising additional steps of:

binarizing a corresponding one of the image data groups based upon a predetermined threshold value;

converting the binarized image data into a one-dimensional serial image data of a predetermined bit width; and comparing the converted imaged data to the reference data in the control information memory to generate a determination result.

28. The method of pattern matching according to claim 27 wherein the predetermined threshold value is changed based upon a number of gradation levels of the image data to be outputted to the data processing unit.

* * * * *